US006771381B1

(12) United States Patent
Klein

(10) Patent No.: US 6,771,381 B1
(45) Date of Patent: Aug. 3, 2004

(54) DISTRIBUTED COMPUTER ARCHITECTURE AND PROCESS FOR VIRTUAL COPYING

(76) Inventor: Laurence C. Klein, 1010 Wayne Ave., Silver Spring, MD (US) 20910

( * ) Notice: Subject to any disclaimer, the term of this patent is extended or adjusted under 35 U.S.C. 154(b) by 0 days.

(21) Appl. No.: 09/438,300

(22) Filed: Nov. 12, 1999

Related U.S. Application Data

(60) Provisional application No. 60/108,798, filed on Nov. 13, 1998.

(51) Int. Cl.[7] .............................................. G06K 15/00
(52) U.S. Cl. ....................... 358/1.15; 358/1.1
(58) Field of Search .................... 358/1.1, 1.6, 1.13, 358/1.15, 1.16, 402, 403, 407, 425; 710/8, 14, 15, 33, 62, 63, 64, 65, 72, 73

(56) References Cited

U.S. PATENT DOCUMENTS 5,666,495 A * 9/1997 Yeh ............................ 710/303

* cited by examiner

Primary Examiner—Arthur G. Evans
(74) Attorney, Agent, or Firm—Irah H. Donner, Esq.; Wilmer, Cutter, Pickering Hale and Dorr LLP

(57) ABSTRACT

The purpose of the Virtual Copier invention ("VC") is to enable a typical PC user to add electronic paper processing to their existing business process. VC is an extension of the concept we understand as copying. In its simplest form it extends the notion of copying from a process that involves paper going through a conventional copier device, to a process that involves paper being scanned from a device at one location and copied to a device at another location. In its more sophisticated form, VC can copy paper from a device at one location directly into a business application residing on a network or on the Internet, or visa versa. The VC invention is software that manages paper so that it can be electronically and seamlessly copied in and out of devices and business applications (such as Microsoft Office, Microsoft Exchange, Lotus Notes) with an optional single-step Go operation. The VC software can reside on a PC, LAN/WAN server, digital device (such as a digital copier), or on a web server to be accessed over the Internet.

15 Claims, 44 Drawing Sheets

| IEngineManagement Interface | Arguments | Description |
|---|---|---|
| ActivateEngine | BOOL Activate | Activates or deactivates an engine. This interface element will cause an engine to load itself to or unload itself from memory. |
| IsEngineActivated | | Determine whether the engine has been successfully loaded into memory. |

FIG. 7

| IEngineManagement Interface | Arguments | Description |
|---|---|---|
| SetSetting | DWORD Setting VARIANT Value | Sets the setting Setting to a value of Value. the Setting argument is a unique number that represents a specific setting type. The Value argument is a union argument type that can accept any style argument, including an array of elements. |
| GetSetting | DWORD Setting VARIANT *Value | gets the setting Setting and places the value in Value. the Setting argument is a unique number that represents a specific setting type. The Value argument is a union argument type that can accept any style argument, including an array of elements. |

FIG. 10

| IEngineManagement Interface | Arguments | Description |
|---|---|---|
| Function | DWORD Setting VARIANT * Value | Initiate the function as represented by the Setting argument, using a variable number of arguments in using the Value array. |

FIG. 12

| FILE 1 | FILE 2 | FILE 3 |
| --- | --- | --- |
| ENGINE FUNCTION A | ENGINE DLL A | ENGINE SETTING A |
| ENGINE FUNCTION B | ENGINE DLL B | ENGINE SETTING B |
| ENGINE FUNCTION C | ENGINE DLL C | ENGINE SETTING C |
| ⋮ | ⋮ | ⋮ |

FIG. 9

The Client Module has a fixed set of features that it needs to perform:

DISTRIBUTED COMPUTER ARCHITECTURE AND PROCESS FOR VIRTUAL COPYING

RELATED APPLICATIONS

This application claims priority to U.S. Provisional Application 60/108,798, filed Nov. 13, 1998, incorporated herein by reference.

This application is related to, a continuation-in-part application of, and claims priority to, the following non-provisional applications: Ser. No. 08/950,838, filed Oct. 15, 1997, now U.S. Pat. No. 6,185,590;

Ser. No. 08/911,083, filed Aug. 14, 1997, now abandoned;
Ser. No. 08/950,911, filed Oct. 15, 1997, now abandoned;
Ser. No. 08/950,837, filed Oct. 15, 1997, now abandoned;
Ser. No. 08/950,738, filed Oct. 15, 1997, now abandoned;
Ser. No. 08/950,741, filed Oct. 15, 1997, now abandoned;
all of which are hereby incorporated by reference.

This application is related to, and claims priority to, the following provisional applications by way the claim of priority of the above listed non-provisional applications:

Oct. 18, 1996, Ser. No. 60/028,129;
Oct. 18, 1996, Ser. No. 60/028,522;
Oct. 18, 1996, Ser. No. 60/028,128;
Oct. 18, 1996, Ser. No. 60/028,697;
Oct. 18, 1996, Ser. No. 60/028,639;
Oct. 18, 1996, Ser. No. 60/028,685; all of which are hereby incorporated by reference.

FIELD OF THE INVENTION

The present invention is generally related to a computer architecture and process for stand-alone and/or distributed environment, and more particularly to a computer architecture and process using a substantially uniform management in a stand-alone and/or distributed computing environment including, for example, client server and/or intranet and/or internet operating environments.

BACKGROUND OF THE RELATED ART

A "C" or "C++"- Level API (hereinafter "C" Level), which is the native language and interface for a vast repository of core technologies from small software vendors and research laboratories, are unique to each designer. The designer of a text retrieval "C"-API will generally implement an interface that is completely different than a second inventor creating a "C"-level API for OCR.

Every "C"-level API is unique, both in its choice of API syntax as well as its method for implementing the syntax. Some API's consist of one or two functions that take parameters offering options for different features offered by the technology. Other APIs consist of hundreds of functions with few arguments, where each function is associated with a particular feature of the core technology. Other APIs provide a mixture of some features being combined with one function with many arguments, while other features are separated into individual function calls.

Without any constraints, each designer of a core technology chooses to implement his or her technology with an interface that is suitable to the subject or simply was the most expedient choice of the moment. Since there are no constraints, a "IC"-level API has a totally unpredictable interface that can often be the hindrance to using the core technology.

Additionally, every API manages errors differently further complicating the problems described above. Some APIs return a consistent error code for each function. Error management in this case is very organized and manageable. Other APIs return error codes as one of the parameters passed to the function. There are APIs that mix the choice of error management and have some functions return an error code while other functions pass the error code as a parameter of a function. Errors can also be managed by a callback function, eliminating the need for passing any error code as part of the function. In some instances of a poorly implemented API the errors are not passed back at all.

Every engine, such as a text retrieval or an OCR (Optical Character Recognition) engine, has a unique interface. This interface is generally a "C"-level API (Application Program Interface). Further, an API can at any time be synchronous, asynchronous, manage one or more callbacks, require input, pass back output, carry a variety of different styles of functions, return values or not return values, and implement the unpredictable. This unpredictability in APIs further compounds the problem of developing a sane way of interfacing between components and APIs.

To date, because of the complexities of "C"-level APIs and components interfacing thereto, the only way to create a component out of an existing "C"-level API is to have an experienced programmer in the field to do the work. Humans can intelligently analyze an API, and create a component based on intelligent decisions and experiences. In most cases, the learning curve for understanding and integrating a new engine can be one man-month to several man-years and generally requires highly experienced "IC" programmers. Requiring a human to perform the necessary work is costly, and subject to real-life human constraints.

Since there is no structure or format for implementing "C"-level APIs, the ability to automatically transform a unique API into a standard component would seem impossible, since that would take a nearly-human level of intelligence.

In addition, in spite of the continued automation of business processes, companies are increasing their paper use by 25–30% and spending up to 15% of their total budget on managing paper. Companies are often running dual processes—a computerized process along with the corresponding paper filing system—and paying an extraordinary price for it. Just a few examples will illustrate the problem: 1) accounting clerks are maintaining paper invoices with information that is also being re-keyed into accounting systems, 2) administrative assistants are filing incoming correspondence in cabinets for customers whose records are also being electronically maintained by contact management systems, 3) help desk operators are storing complaints sent in on paper while also tracking those complaints in a computerized system. Additional industry trends include the following:

For every $100M in increased revenues, a company will use 8.8 million additional pages of paper The Document Management market is expected to grow at 30% per year The digital device market is growing at 20% per year Estimates show the web-based document imaging market growing at 50% per year The digital device manufacturers, especially the copier companies, are heavily promoting the ability to connect their devices to networks, but have not been able to deliver an effective software solution to date.

Businesses continue to automate more processes, but managing the associated paper is often ignored, resulting in inefficiency and higher costs.

I have determined that a component factory, if it is to be truly automated or manually expedited, must be able to take any "C"-level API and transform it into a component.

I have also determined an efficient and workable design for an architecture to define the migration path for any "C"-level API into a component.

I have also determined that it is desirable to develop software tools for automatically generating reusable software components from core software technologies, thus making these software technologies available to a much larger user base.

I have further determined that it is desirable to design a distributed computer architecture and process for manually and/or automatically generating reusable software components. The computer architecture may be implemented using a client server and/or intranet and/or internet operating environments.

I have further determined that it is desirable to design a computer architecture and process for image viewing in a stand-alone and/or distributed environment. The computer architecture and process optionally uses a substantially uniform management layer in a stand-alone and/or distributed computing environment including, for example, client server and/or intranet and/or internet operating environments.

I have further determined that it is desirable to enable a typical PC user to add electronic paper processing to their existing business process.

I have further determined that it is desirable to enable software that manages paper so that it can be electronically and seamlessly copied in and out of devices and business applications (such as Microsoft Office, Microsoft Exchange, Lotus Notes) with an optional single-step Go operation.

SUMMARY OF THE INVENTION

One would expect the translating a "C"-level API from its native state into a component would require human-level intelligence. This is mainly because "C"-level APIs have virtually no constraints as to how they can be implemented. This means that there are an infinity variations of APIs, which can only be managed by human-level intelligence. While this point is true, I have determined that the appropriate solution starts at the other side of the equation, which is the component itself.

My solution starts out with a definition of a component that can sustain the feature/function requirements of any API. In other words, the interface of a generic component can be defined such that the features and functions of virtually any API can be re-implemented within its bounds. The two known end-points are, for example, the "C"-level API that generally starts with each component (although other programming languages may also be used and are within the scope of the present invention), and the component interface that represents any set of features/functions on the other side. The component factory migrates the original "C"-level API from its original state into the generic interface defined by the topmost layer. The first feature that can be demonstrated is that there is a topmost layer that can define a component interface that can represent the features/functions of most core technologies.

The component factory migrates the "C"-level API to the topmost level. Doing this in one large step would be impossible since the "C"-level API has a near-infinite variety of styles. However, the architecture advantageously has enough well-defined and well-structured layers for implementing the topmost component interface, for creating the component factory.

The computer architecture is designed for managing a diverse set of independent core technologies ("engines") using a single consistent framework. The architecture balances two seemingly opposing requirements: the need to provide a single consistent interface to many different engines with the ability to access the unique features of each engine.

The benefit of the architecture is that it enables a company to rapidly "wrap" a sophisticated technology so that other high-level developers can easily learn and implement the core technology. The computer architecture is therefore a middleware or enabling technology.

Another benefit of the architecture is that it provides a high-level specification for a consistent interface to any core technology. Once a high-level developer learns the interface described herein for one engine, that knowledge is easily transferable to other engines that are implemented using the architecture. For example, once a high-level developer learns to use the computer architecture for OCR (Optical Character Recognition), using the computer architecture for other engines, such as barcode recognition or forms processing, is trivial.

The architecture described herein is, at once, a framework for rapidly wrapping sophisticated technologies into high-level components, as well as a framework for high-level developers to communicate with a diverse set of engines. The creating of a component factory is based on the fact that the architecture defines a clear path for "wrapping" any C-level API into a component using simple structures and many rote steps. This process is currently being done in an inefficient manner by a programmer in the field.

In addition, the method described herein for creating a component factory creates a well-defined multi-tiered architecture for a component and automates, substantially automates, or manually expedites hereinafter automate the process of migrating a "C"-API from its native state through the various tiers of the architecture resulting in a standardized component. Advantageously, the method described herein does not base the component factory on making human-level intelligent decisions on how to translate a "C"-API into a component. Rather, by creating a well-defined architecture described below that is multi-tiered, the method is a series of incremental steps that need to be taken to migrate the "C"-API from one tier within the architecture to the next. In this way each incremental step is not a major one, but in sequence the entire series of steps will result in a component.

Since each step of migration is not a major one, the chances for automating these steps is significantly higher and the likelihood of being able to create the component factory becomes feasible. This approach is in fact what makes the method cost-effective, since the alternative approach, i.e., computer-generated human-level decision making, has many years before becoming sophisticated enough to replace humans in any realistic decision-making process.

The main features of the architecture are twofold:
1) Defining system architecture that describes in detail how to implement a component from a "C"-level API;
2) Creating a component factory by automating the migration of a "C"-level API from one tier within the architecture to the next.

The latter feature is the key to actually making the component factory feasible. With a fixed architecture that can be used to implement a "C"-level API as a component (using a programmer), that same architecture can be used as the basis for the component factory model.

In order to make the component factory, each step of the architecture needs to be designed to facilitate automation or manually expedited. In other words, I have determined that automating/expediting the process of taking the original "C"-level API and migrating it to a Level 1 layer, and then a Level 1 to a Level 2, and then a Level 2 to a Level 3 layer, and so on, the component has been implemented automatically or more efficiently. The component factory is therefore a sum of the ability to automate migrating the "C"-level API from one layer to the next within a well-defined architecture for implementing components.

There are numerous core technologies, such as text-retrieval and ICR (Intelligent Character Recognition), that have already been implemented, and are only available as "C"-level APIs. Many, if not most, core technologies are first released exclusively as "C"-level APIs. While there are integrators and corporations who have the team of technologists who can integrate these "C"-level APIs in-house, most companies are looking for component versions that can be implemented at a much higher level.

Therefore, many of the core technologies that are only available in a "C"-level API are not being used due to their inaccessible interface. The benefit of the component factory is that it can rapidly make available core technologies implemented as "C" APIs that would otherwise be underutilized or dormant in research labs by converting them to high-level components that can be used by millions of power-PC users.

With the advent of the World Wide Web (WEB) this opportunity has increased exponentially. The WEB is now home to a vast number of WEB authors with minimal formal training who can implement HTML pages and build web sites. One of the fundamental technologies for extending the capability of the WEB from simple page viewing to interactive and sophisticated applications is components.

A component extends the capability of HTML by enabling a WEB author to add core technology as a pre-packaged technology. Since components are fundamental to the growth and usability of the WEB, having a component factory that can translate "C"-level toolkits into components that are then usable within WEB sites opens a vast and new worldwide market to these technologies.

The purpose of the Virtual Copier ("VC") aspect of the present invention is to enable a typical PC user to add electronic paper processing to their existing business process. VC is an extension of the concept we understand as copying. In its simplest form it extends the notion of copying from a process that involves paper going through a conventional copier device, to a process that involves paper being scanned from a device at one location and copied to a device at another location. In its more sophisticated form, VC can copy paper from a device at one location directly into a business application residing on a network or on the Internet, or visa versa. The VC invention is software that manages paper so that it can be electronically and seamlessly copied in and out of devices and business applications (such as Microsoft Office, Microsoft Exchange, Lotus Notes) with an optional single-step Go operation. The VC software can reside on a PC, LAN/WAN server, digital device (such as a digital copier), or on a web server to be accessed over the Internet.

Virtual Copier is designed to solve the corporate paper problem by enabling existing web-based and client-server applications to manage paper as part of their solution. Virtual Copier links the familiar and universal world of paper and digital devices to web-based and client-server applications. The result is that the automated business processes become the primary storage of paper in electronic form. Information that is typically managed and processed in paper form is "copied" into the system and managed by the business processes with which users are accustomed, which is made possible by using Virtual Copier. Simple extensions of Virtual Copier support seamless electronic outsourcing of paper processing and archival services over the web.

Virtual Copier is a unique combination of an intuitive application built on an open component architecture that delivers a simple innovation: provide paper processing to existing Intranet and client-server business processes without any fuss. Whether it is an office clerk that needs to easily copy a report from a desktop scanner to the company's Intranet-networked copier, or an accounting software integrator that wants to embed paper processing, Virtual Copier offers a simple solution. To the office clerk Virtual Copier is a document imaging application packaged in the familiar setting of an office copier. To the integrator, the underlying open architecture of Virtual Copier offers a simple integration path for embedding paper processing into its client-server or web-based software solution.

Although managing paper manually is one of the great problems facing corporations, there has been little innovation in enabling those workers to eliminate the need to continuously work with paper manually. Much of the problem stems from the complexity of traditional document management systems, which require days of training and months to become familiar with the system in order to be proficient. Virtual Copier was designed to be as simple as a copier to operate, and yet still provide the complete capability of integrating paper with existing business applications. By simplifying the interface and underlying software infrastructure, VC can manage paper in electronic form as easily as is currently done in physical form.

VC extends the notion of a copier, which simply replicates the image of an original document onto another piece of paper using a single GO or START button, to do a similar operation in software so that the image gets seamlessly replicated into other devices or applications or the Internet.

An example of this is the actual implementation of Virtual Copier as a consumer product. The interface of the consumer product called Virtual Copier has a Go button much like a physical copier. This GO button can copy paper, whether physical or electronic, from one device and or application to another device and/or application.

What makes Virtual Copier as simple as its physical counterpart in at least one embodiment is the fact that it replicates the identical motions that a user who is making a copy using a physical photocopier goes through. When a user photocopies a document, he/she selects where they want to copy from (i.e. the sheet feeder), where the user wants to copy to (i.e. 6 copies collated and stapled) and then presses a GO button to actually carry out the photocopy process. With Virtual Copier the process feels familiar because the sequence is the same with just the Power VC portion of the main Virtual Copier window.

The power of Virtual Copier is the fact that the From can be a physical device (e.g. digital copier, fax or scanner) or an application (e.g. Lotus Notes, Microsoft Exchange, the Internet, or an electronic filing system). The To can also be a physical device (e.g. a fax, digital copier, or printer) or an application (e.g. Lotus Notes, Microsoft Exchange, the Internet, or an electronic filing system). Even though paper is being copied electronically from devices to applications, from applications to devices, from devices to devices, or from applications to applications, the user simply has one sequence to execute: select From, select To, and then press GO. Virtual Copier will accomplish all translations between device and applications automatically and seamlessly.

Another reason that paper is still a major corporate issue is that traditional document management systems require that a company invest in a whole new system just to store electronic images. Although this is the only way that document management systems have been designed and delivered, it is in fact highly inefficient. Most companies already manage information about physical documents in some form of software applications.

For example, accounting systems have long been used to maintain information about invoices and bills that arrive into a company from outside sources as physical pieces of paper. When an invoice arrives, its information is keyed into the accounting software, where balances are maintained and accounts payable information is coordinated. Yet the original invoice is stored manually, and every time that a request is made for a copy of the signed invoice, someone manually retrieves the invoice from a physical filing cabinet. Accounting systems, like most business applications, typically have no way of maintaining an electronic copy of the physical invoice, and adding a document management system to an accounting system is cumbersome, costly, and difficult to maintain, and even more difficult to coordinate.

Virtual Copier solves this problem in at least one embodiment by copying paper directly into the existing accounting system. Simply adding a To item in the Virtual Copier window enables a user to copy paper directly into the appropriate accounting record of the existing accounting system. This requires no retraining (users who are trained on the accounting system will still use the accounting system in the same way), requires no document management system (the electronic copy of the document is actually being maintained by the accounting system itself), there is no coordination between two systems (Virtual Copier embeds the invoice with the appropriate accounting record), and it is simple (one Go button).

What is true with regard to the example above of an accounting system is true of most other business applications. The power of Virtual Copier is that it can turn an information system into a document management system by adding support for electronic paper directly into the existing business application, whether it is a client, server-based, or web-based system.

Virtual Copier enables corporations to perform sophisticated document imaging with their existing Web-based and client-server applications through a user interface that is as familiar as the office copier. Virtual Copier can be used out-of-the-box as a standalone application to copy, scan, fax, or print images using existing digital devices within corporate environments or across the web. With the extensions, as described below, Virtual Copier can be integrated into Web-based and client server applications, such as ERP or accounting systems, to eliminate paper from existing business processes and legacy applications. Virtual Copier can also be used to support seamless access to document image processing and archival over the web since, in at least one embodiment, the VC interface is implemented as a software application.

VC is architected as an application that delivers end-user functionality while remaining open to third-parties extensions. For example, VC can be viewed as a copier. Like a copier, VC takes paper in, and produces paper going out. The only difference is that VC does not distinguish between electronic and physical paper.

To accommodate third-party extensions, VC is divided into five essential modules. Each module is a counterpart to an aspect that is found on a conventional copier. Based on the modular design of VC, each aspect of VC can be independently extended, offering much greater flexibility than conventional copiers.

The five core modules of VC are:

Input Module—The Input Module manages paper or electronic paper entering VC. This module manages imaging devices to input paper through scanners, MFPs, or the new breed of digital copiers. The Input Module also manages reading electronic paper from third-party or proprietary applications. The counterpart to VC's Input Module on a conventional copier is the scanner subsystem.

Output Module—The Output Module manages paper or electronic paper exiting VC. Like the Input Module, this module manages imaging devices to output paper to standard Windows printers, specialty image printers, MFPs, or the new breed of digital copiers. The Output Module also manages writing electronic paper to third-party or proprietary applications. The counterpart to VC's Output Module on a conventional copier is the printer or fax subsystem.

Process Module—The Process Module applies processing to the electronic paper as it is being copied. Examples of a process are OCR and ICR. The Process Module can also apply non-imaging functionality as well, such as workflow or other relevant tie-ins to the electronic paper as it is being copied. One of the advantages of VC over conventional copiers is that multiple processes can be applied to a single virtual copy. The counterpart to VC's Process Module on a conventional copier is the controller.

Client Module—The Client Module presents the electronic paper as it is being copied, and any relevant information related to the input or output functions. For example, if the Output Module is directed to a printer, then the Client Module might present the finishing capabilities; if the Output Module is directed to Goldmine, then the Client Module might present the target contact record to which the document is being copied. The counterpart to VC's Client Module on a conventional copier is the panel.

Server Module—Unlike conventional copiers, VC's Server Module is a unique subsystem that can communicate with the other modules as well as third-party applications. The Server Module is what makes VC a far more powerful concept than simply an application that can control a scanner and a printer to mimic a copier. The Server Module can be used to combine third-party applications with the new breed of digital imaging devices to create unique and custom virtual copier solutions. A virtual copier can be created with VC by combining a scanner with a printer; or by combining a scanner with an application; or by combing an application with an image printer. In each case VC is dynamically creating a custom virtual copier, with a complete understanding of how paper flows from the source to its destination. There is no counterpart to VC's Server Module on a conventional copier.

One of the primary design goals of VC is to make it simple to integrate VC with third-party applications. There are two options to integrating VC into a third-party application: running VC as an external service, or embedding VC as an underlying service.

VC is in one embodiment and optionally a standalone application that enables a user to scan (copy) paper from a device to a third-party application, and to print (copy) the reference of an image document from a third-party application to a printing device. VC does not require the third-party application to be aware that VC is operating. Rather, VC recognizes that the third-party application is running, and it intelligently copies paper to and from that application.

In this scenario the user is interacting with VC's Client Module in order to execute a copy operation to and from the third-party application. There does not have to be any changes made to the third-party application, not even to its interface, in order for VC to operate. The user of VC only knows that to copy to and from the third-party application, a custom Input and Output Module must be selected, and the Go button is pressed.

In order to support copying to and from a third-party application, VC must be able to support extensions that understand each third-party application. This is accomplished through the Input and Output Modules. The Client, Server, and even Process Modules remain independent across third-party applications. However, in order to support outputting to a third-party application, an Output Module is developed that is unique to that third-party application. Likewise, an Input Module is developed that is unique to a third-party application in order to support reading images from that application.

It is the optional Input and Output Modules that render VC extendable. For each third-party application there is a unique pair of Input and Output Modules that understand the third-party application, and how to copy images to and from that application. Each Input and Output Module registers itself to the Windows registry so that the Server Module knows how to find them. In this way Virtual Copier can grow indefinitely, to support any number of third-party applications.

The significant point is that the Input and Output Modules have their own interface, and can be developed independently from any other module. As long as the Input and Output Module conform to the API specified in this document it will plug-and-play with VC. VC will be able to mix and match the custom Input and Output Module with its standard and other custom Input and Output Modules.

A third-party application can also use the services of VC without its user interface. That is, a third-party application can embed VC's functionality and provide its own interface to its functionality. For example, rather than have VC as a separate application, a special button can be placed on a third-party application that launches VC in the background.

VC is designed so that the Server Module can run independently from the Client Module. All the core functionality, including communicating with the Input, Output, and Process Modules, are performed directly by the Server Module. The Client Module is generally simply an interface to the Server Module. Therefore, all the services of the Server Module can be made available in the background to a third-party application without the need for an interface. The third-party application can in fact become the user's interface to VC.

In order to support VC operating in the background a third-party application merely has to communicate with the Server Module directly, as described later in this document. The Server Module, as all modules in VC, support COM-based interfaces for simple and direct support from all major Windows development environments.

Accordingly, it is a feature and advantage of the present invention to implement a component factory, that is automated or manually expedited.

It is another feature and advantage of the present invention to be able to take any "C"-level API and transform it into a component.

It is another feature and advantage of the present invention to define an efficient and workable design for an architecture to provide the migration path for any C-level API into a component.

It is another feature and advantage of the present invention to develop software tools for automatically generating reusable software components from core software technologies.

It is another feature and advantage of the present invention to develop software tools to make software components available to a much larger user base.

It is another feature and advantage of the present invention in providing a distributed computer architecture and process for manually and/or automatically generating reusable software components.

It is another feature and advantage of the present invention in providing a distributed computer architecture and process for manually and/or automatically generating reusable software components where the computer architecture is implemented using a client server and/or intranet and/or internet operating environments.

It is another feature and advantage of the present invention in providing a computer architecture and process for image viewing in a stand-alone and/or distributed environment.

It is another feature and advantage of the present invention in providing a computer architecture and process that uses a substantially uniform management layer in a stand-alone and/or distributed computing environment including, for example, client server and/or intranet and/or internet operating environments.

It is another feature and advantage of the present invention to enable a typical PC user to add electronic paper processing to their existing business process.

It is another feature and advantage of the present invention to enable software that manages paper so that it can be electronically and seamlessly copied in and out of devices and business applications (such as Microsoft Office, Microsoft Exchange, Lotus Notes) with an optional single-step Go operation.

The present invention is based, in part, on my discovery that it is possible to make the component factory, and that each step of the architecture is designed to facilitate automation or manually design of components. The present invention is also based, in part, on my discovery that by automating/expediting the process of taking the original "C"-level API and migrating it to a Level 1 layer, and then a Level 1 to a Level 2, and then a Level 2 to a Level 3 layer, and so on, the component has been implemented automatically and/or more manually efficiently. The component factory is therefore a sum of the ability to automate migrating the "C"-level API from one layer to the next within a well-defined architecture for implementing components.

The present invention is also based, in part, on my discovery that the object manager and engine object component layers may be advantageously be designed to operate independently, thereby making possible a distributed computing environment, as described below in detail. I have further discovered that an efficient method of implementing the engine object component layer is by using pre-populated tables/files. I have further discovered that the engine management layer may be advantageously divided into a three layer structure of load/unload engine, dynamic linking engine function calls, and initialize engine setting.

In accordance with one embodiment of the invention, a computer implemented process migrates a program specific Application Programmer Interface (API) from an original state into a generic interface by building an object for each engine. The object provides substantially uniform access to the engine and engine settings associated with the engine. The computer implemented process includes the step of providing an engine management function interfacing with the program specific API. The engine management function furnishes a protective wrapper for each function call associated with the engine, trapping errors, and provides error management and administration to prevent conditions associated with improper engine functioning. The process optionally includes the step of providing an engine configuration function transforming API calls received from the program specific API into standardized calls. The engine configuration function provides additional functionality, including safely loading and unloading the engine. The process optionally includes the step of providing an engine function managing the standardized calls for each engine, thereby providing substantially uniform access to the engine and the engine settings associated with the engine.

In accordance with another embodiment of the invention, a computer implemented method migrates at least one program specific Application Programmer Interface (API) from an original state into a generic interface by building an object for each engine. The object provides substantially uniform access to the engine and engine settings associated with the engine. The computer implemented method includes the steps of defining a substantially consistent interface for individual object components that represent diverse technologies, and migrating a plurality of engines to the consistent interface. The computer implemented method also includes the step of substantially automatically and/or substantially uniformly, managing the individual object components using a predefined object manager and the consistent interface.

In accordance with another embodiment of the invention, a computer architecture migrates at least one program specific Application Programmer Interface (API) from an original state into a generic interface by building an object for each engine. The object provides substantially uniform access to the engine and engine settings associated with the engine. The computer architecture includes an engine management layer interfacing with the program specific API and providing engine management and administration, an engine configuration layer transforming API calls received from the program specific API into standardized calls, and an engine layer managing the standardized calls for each engine.

In accordance with another embodiment of the invention, an engine management layer configures a computer architecture to perform one or more computer implemented or computer assisted operations. The computer operations include one or more of loading and unloading engine dynamic link libraries into and out of memory for each engine, mapping at least one engine function to at least one corresponding engine object, providing general error detection and error correction for each engine, determining and matching arguments and returning values for mapping the at least one engine function to the at least one corresponding engine object, and/or managing error feedback from the at least one program specific API.

In accordance with another embodiment of the invention, a distributed computer system migrates a program specific Application Programmer Interface (API) from an original state into a generic interface by building an object for each engine. The object provides substantially uniform access to the engine and engine settings associated with the engine. The distributed computer system includes a server configured to include at least one engine having an engine interface providing one or more features to be executed, and at least one engine component configured to execute the one or more features of the engine by mapping a substantially consistent interface to the engine interface of the engine. The distributed computer system also includes at least one client configured to be connectable to the server and optionally configured to be connectable to another server.

The client includes an object manager layer communicable with and managing the at least one engine component stored on the server via the substantially consistent interface.

In accordance with another embodiment of the invention, a distributed computer implemented process migrates a program specific Application Programmer Interface (API) from an original state into a generic interface by building an object for each engine. The object provides substantially uniform access to the engine and engine settings associated with the engine. The computer implemented process includes the step of providing, on a server, at least one engine having an engine interface, and providing one or more features to be executed. The computer implemented process also includes the step of providing, on at least one of the server and another server connectable to the server, at least one engine component configured to execute the one or more features of the engine by mapping a substantially consistent interface to the engine interface of the engine. The computer implemented process also includes the step of providing, on a client configured to be connectable to the server and optionally configured to be connectable to the another server, an object manager layer communicable with and managing the at least one engine component via the substantially consistent interface.

In accordance with another embodiment of the invention, an image viewer process views at least one document image including an electronic document image, and performs viewing operations to the electronic document image. The process includes the step of selecting, by the user, one of a plurality of image viewing perspectives. Each of the plurality of image viewing perspectives provide the user the capability of viewing the document image in accordance with a different predefined user perspective. The process also includes the steps of selecting, by the user, using the image viewer process the document image to be viewed, and retrieving, by the image viewer process, the document image. The process also includes the step of displaying, by the image viewer process, the selected document image in accordance with an image viewing perspective selected by the user.

In accordance with another embodiment of the invention, a computer readable tangible medium is provided that stores the process thereon, for execution by the computer.

A computer data management system includes at least one of an electronic image, graphics and document management system capable of transmitting at least one of an electronic image, electronic graphics and electronic document to a plurality of external destinations including one or more of external devices and applications. The computer data management system is responsively connectable at least one of locally and via the Internet, and incldes at least one memory storing a plurality of interface protocols for interfacing and communicating, and at least one processor responsively connectable to the at least one memory. The processor implements the plurality of interface protocols as a software application for interfacing and communicating with the plurality of external destinations including the one or more of the external devices and applications.

In one embodiment, the external devices and applications include, for example, a printer, a facsimile, and a scanner. In one embodiment, the computer data management system includes the capability to integrate an image using software so that the image gets seamlessly replicated and transmitted to at least one of other devices and applications, and via the Internet. In one embodiment, the computer data management system includes the capability to integrate the electronic images into a destination application without the need to modify the destination application.

In one embodiment, the computer data management system includes an interface that enables copying images between physical devices, applications, and the Internet using a single "GO" operation. In one embodiment, the computer data management system includes the capability of adding at least one of electronic document and paper processing with a single programming step.

In one embodiment, the software application includes at least one input module managing data comprising at least one of paper and electronic paper input to the computer data management system, and managing at least one imaging device to input the data through at least one of a scanner and a digital copier, and managing the electronic paper from at least one third-party software applications; at least one output module managing the data output from the computer data management system, managing at least one imaging device to output the data to at least one of a standard Windows printer, an image printer, and a digital copier, and managing the output of the data to the third-party software application; at least one process module applying at least one data processing to the data comprising the at least one of the paper and the electronic paper as it is being copied, applying additional functionality including at least one of workflow and processing functionality to the data comprising the at least one of paper and electronic paper as it is being copied, and applying multiple processes to a single virtual copy; at least one client module presenting the data comprising the at least one of paper and electronic paper as it is being copied, and information related to at least one of the input and output functions; and at least one server module communicable with said at least one input, output, client, and process modules and external applications, and capable of dynamically combining the external applications with at least one of digital capturing devices and digital imaging devices.

In one embodiment, one or more of the external devices and applications integrates the computer data management system into an external application via one of running the computer data management system, as an external service and embedding the computer data management system as an embedded service.

In one embodiment, the server module includes enable virtual copy operation means for initiating, canceling, and resetting said computer data management system; maintain list of available module means for maintaining a registry containing a list of said input, output, and process modules that can be used in said computer data management system, said list being read on startup, and maintaining another copy of said list in a modules object accessible by said input, output, client, process and server modules; maintain currently active modules means for maintaining said input, output, and process modules currently being used for a current computer data management system copy operation in a program object, and saving the currently active modules in a process template file; and maintain complete document information means for maintaining information regarding a current file being copied, and saving the information in a document template file.

In one embodiment, the server module includes at least one server module application programmer interface (API).

IN one mebodiment, the server module application programmer interface (API) comprises the COM-based interfaces: at least one modules object maintaining a first list of available input, output, and process modules; at least one program object maintaining a second list of currently selected input, output, and process modules; at least one document object maintaining information regarding a current document being copied; at least one system management method object used to initiate, cancel, and reset said computer data management system; and at least one system management event object used to provide feedback to the Client Module.

In one embodiment, a computer data management system includes at least one of an electronic image, graphics and document management system capable of transmitting at least one of an electronic image, electronic graphics and electronic document to a plurality of external destinations including one or more of external devices and applications responsively connectable at least one of locally and via the Internet. The computer data management system comprises: a first capability to integrate an image using software so that the image gets seamlessly replicated into at least one of other devices and applications, and via the Internet; a second capability to integrate electronic images into existing applications without the need to modify the destination application; an interface comprising a software application that enables copying images between physical devices, applications, and the Internet using a single "GO" operation; and a third capability of adding at least one of electronic document and paper processing with a single programming step.

A computer data management system capable of managing and transmitting at least one of an electronic image, electronic graphics and electronic document to a plurality of external destinations including one or more of external devices and applications at least one of locally and via the Internet. The computer data management system includes at least one memory storing at least one of a common and universal interface protocol for interfacing and communicating; and at least one processor responsively connectable to said at least one memory, and implementing the at least one common and universal interface protocol as a software application for interfacing and communicating with the plurality of external destinations including the one or more of the external devices and applications.

In one embodiment, a computer readable tangible medium stores instructions for implementing a process driven by a computer implemented on at least one of an electronic image, graphics and document management system capable of managing and transmitting at least one of an electronic image, electronic graphics and electronic document to a plurality of external destinations including at least one of an external device and application at least one of locally and via the Internet. The instructions control the computer to perform the process of: storing at least one of a common and universal interface protocol for interfacing and communicating in at least one memory; and implementing the at least one of common and universal interface protocol as a software application via at least one processor for interfacing and communicating with the plurality of external destinations including the at least one external device and application.

In one embodiment, a computer data management system includes at least one of an electronic image, graphics and document management system capable of transmitting at least one of an electronic image, electronic graphics and electronic document to a plurality of external destinations including one or more of external devices and applications responsively connectable at least one of locally and via the Internet. The computer data management system includes a single function copy operation linking devices, applications and the Internet including at least one a go operation, a single function paper copy between devices and software applications, and a single function paper copy between software applications and devices; a one step programming method to add paper support to electronic business processes including at least one of a one step method of supporting paper within electronic business process application optionally including legacy systems with no or minimal reprogramming of the electronic business process application, a method of recreating a module oriented copier in software; and a copier interface implemented as software application including at least one of a virtual copier interface method of presenting to a user an operation of at least one of copying files and electronic images, at least one of to and from, at least one of digital imaging devices and software applications, in a substantially single step, and presenting users with direct access to at least one of tutorial and options from a main application window.

In one embodiment, a server module includes enable virtual copy operation means for initiating, canceling, and resetting said computer data management system; maintain list of available module means for maintaining a registry containing a list of said input, output, and process modules that can be used in said computer data management system, said list being read on startup, and maintaining another copy of said list in a modules object accessible by said input, output, client, process and server modules; maintain currently active modules means for maintaining said input, output, and process modules currently being used for a current computer data management system copy operation in a program object, and saving the currently active modules in a process template file; and maintain complete document information means for maintaining information regarding a current file being copied, and saving the information in a document template file.

In one embodiment, a computer data management method includes at least one of an electronic image, graphics and document management system capable of transmitting at least one of an electronic image, electronic graphics and electronic document to a plurality of external destinations including one or more of external devices and applications responsively connectable at least one of locally and via the Internet. The method comprises the steps of integrating an image using software so that the image gets seamlessly replicated into at least one of other devices and applications, and via the Internet; integrating electronic images into existing applications without the need to modify the destination application; interfacing via a software application enabling copying images between physical devices, applications, and the Internet using a single "GO" operation; and adding at least one of electronic document and paper processing with a single programming step.

In one embodiment, a server method includes initiating, canceling, and resetting said computer data management system; maintaining a registry containing a list of said input, output, and process modules that can be used in said computer data management system, said list being read on startup, and maintaining another copy of said list in a modules object accessible by said input, output, client, process and server modules; maintaining said input, output, and process modules currently being used for a current computer data management system copy operation in a program object, and saving the currently active modules in a process template file; and maintaining information regarding a current file being copied, and saving the information in a document template file.

A computer data administration system includes at least one of an electronic image, graphics and document administration system capable of transmitting at least one of an electronic image, electronic graphics and electronic document to a plurality of external destinations including one or more of external devices and applications. The computer data administration system is responsively connectable at least one of locally and via the Internet, and includes at least one memory storing a plurality of interface protocols for interfacing and communicating, and at least one processor responsively connectable to the at least one memory. The processor implements the plurality of interface protocols as a software application for interfacing and communicating with the plurality of external destinations including the one or more of the external devices and applications.

In one embodiment, the external devices and applications include, for example, a printer, a facsimile, and a scanner. In one embodiment, the computer data administration system includes the capability to integrate an image using software so that the image gets seamlessly replicated and transmitted to at least one of other devices and applications, and via the Internet. In one embodiment, the computer data administration system includes the capability to integrate the electronic images into a destination application without the need to modify the destination application.

In one embodiment, the computer data administration system includes an interface that enables copying images between physical devices, applications, and the Internet using a single "GO" operation. In one embodiment, the computer data administration system includes the capability of adding at least one of electronic document and paper processing with a single programming step.

In one embodiment, the software application includes at least one input module managing data comprising at least one of paper and electronic paper input to the computer data administration system, and managing at least one imaging device to input the data through at least one of a scanner and a digital copier, and managing the electronic paper from at least one third-party software applications; at least one output module managing the data output from the computer data administration system, managing at least one imaging device to output the data to at least one of a standard Windows printer, an image printer, and a digital copier, and managing the output of the data to the third-party software application; at least one process module applying at least one data processing to the data comprising the at least one of the paper and the electronic paper as it is being copied, applying additional functionality including at least one of workflow and processing functionality to the data comprising the at least one of paper and electronic paper as it is being copied, and applying multiple processes to a single virtual copy; at least one client module presenting the data comprising the at least one of paper and electronic paper as it is being copied, and information related to at least one of the input and output functions; and at least one server module communicable with said at least one input, output, client, and process modules and external applications, and capable of dynamically combining the external applications with at least one of digital capturing devices and digital imaging devices.

In one embodiment, one or more of the external devices and applications integrates the computer data administration system into an external application via one of running the computer data administration system, as an external service and embedding the computer data administration system as an embedded service.

In one embodiment, the server module includes enable virtual copy operation means for initiating, canceling, and resetting said computer data administration system; maintain list of available module means for maintaining a registry containing a list of said input, output, and process modules that can be used in said computer data administration system, said list being read on startup, and maintaining another copy of said list in a modules object accessible by said input, output, client, process and server modules; maintain currently active modules means for maintaining said input, output, and process modules currently being used for a current computer data administration system copy operation in a program object, and saving the currently active modules in a process template file; and maintain complete document information means for maintaining information regarding a current file being copied, and saving the information in a document template file.

In one embodiment, the server module includes at least one server module application programmer interface (API). IN one mebodiment, the server module application programmer interface (API) comprises the COM-based interfaces: at least one modules object maintaining a first list of available input, output, and process modules; at least one program object maintaining a second list of currently selected input, output, and process modules; at least one document object maintaining information regarding a current document being copied; at least one system administration method object used to initiate, cancel, and reset said computer data administration system; and at least one system administration event object used to provide feedback to the Client Module.

In one embodiment, a computer data administration system includes at least one of an electronic image, graphics and document administration system capable of transmitting at least one of an electronic image, electronic graphics and electronic document to a plurality of external destinations including one or more of external devices and applications responsively connectable at least one of locally and via the Internet. The computer data administration system comprises: a first capability to integrate an image using software so that the image gets seamlessly replicated into at least one of other devices and applications, and via the Internet; a second capability to integrate electronic images into existing applications without the need to modify the destination application; an interface comprising a software application that enables copying images between physical devices, applications, and the Internet using a single "GO" operation; and a third capability of adding at least one of electronic document and paper processing with a single programming step.

A computer data administration system capable of managing and transmitting at least one of an electronic image, electronic graphics and electronic document to a plurality of external destinations including one or more of external devices and applications at least one of locally and via the Internet. The computer data administration system includes at least one memory storing at least one of a common and universal interface protocol for interfacing and communicating; and at least one processor responsively connectable to said at least one memory, and implementing the at least one common and universal interface protocol as a software application for interfacing and communicating with the plurality of external destinations including the one or more of the external devices and applications.

In one embodiment, a computer readable tangible medium stores instructions for implementing a process driven by a computer implemented on at least one of an electronic image, graphics and document administration system capable of managing and transmitting at least one of an electronic image, electronic graphics and electronic document to a plurality of external destinations including at least one of an external device and application at least one of locally and via the Internet. The instructions control the computer to perform the process of: storing at least one of a common and universal interface protocol for interfacing and communicating in at least one memory; and implementing the at least one of common and universal interface protocol as a software application via at least one processor for interfacing and communicating with the plurality of external destinations including the at least one external device and application.

In one embodiment, a computer data administration system includes at least one of an electronic image, graphics and document administration system capable of transmitting at least one of an electronic image, electronic graphics and electronic document to a plurality of external destinations including one or more of external devices and applications responsively connectable at least one of locally and via the Internet. The computer data administration system includes a single function copy operation linking devices, applications and the Internet including at least one a go operation, a single function paper copy between devices and software applications, and a single function paper copy between software applications and devices; a one step programming method to add paper support to electronic business processes including at least one of a one step method of supporting paper within electronic business process application optionally including legacy systems with no or minimal reprogramming of the electronic business process application, a method of recreating a module oriented copier in software; and a copier interface implemented as software application including at least one of a virtual copier interface method of presenting to a user an operation of at least one of copying files and electronic images, at least one of to and from, at least one of digital imaging devices and software applications, in a substantially single step, and presenting users with direct access to at least one of tutorial and options from a main application window.

In one embodiment, a server module includes enable virtual copy operation means for initiating, canceling, and resetting said computer data administration system; maintain list of available module means for maintaining a registry containing a list of said input, output, and process modules that can be used in said computer data administration system, said list being read on startup, and maintaining another copy of said list in a modules object accessible by said input, output, client, process and server modules; maintain currently active modules means for maintaining said input, output, and process modules currently being used for a current computer data administration system copy operation in a program object, and saving the currently active modules in a process template file; and maintain complete document information means for maintaining information regarding a current file being copied, and saving the information in a document template file.

In one embodiment, a computer data administration method includes at least one of an electronic image, graphics and document administration system capable of transmitting at least one of an electronic image, electronic graphics and electronic document to a plurality of external destinations including one or more of external devices and applications responsively connectable at least one of locally and via the Internet. The method comprises the steps of integrating an image using software so that the image gets seamlessly replicated into at least one of other devices and applications, and via the Internet; integrating electronic images into existing applications without the need to modify the destination application; interfacing via a software application enabling copying images between physical devices, applications, and the Internet using a single "GO" operation; and adding at least one of electronic document and paper processing with a single programming step.

In one embodiment, a server method includes initiating, canceling, and resetting said computer data administration system; maintaining a registry containing a list of said input, output, and process modules that can be used in said computer data administration system, said list being read on startup, and maintaining another copy of said list in a modules object accessible by said input, output, client, process and server modules; maintaining said input, output, and process modules currently being used for a current computer data administration system copy operation in a program object, and saving the currently active modules in a process template file; and maintaining information regarding a current file being copied, and saving the information in a document template file.

A computer information management system includes at least one of an electronic image, graphics and document management system capable of transmitting at least one of an electronic image, electronic graphics and electronic document to a plurality of external destinations including one or more of external devices and applications. The computer information management system is responsively connectable at least one of locally and via the Internet, and includes at least one storage storing a plurality of interface protocols for interfacing and communicating, and at least one processor responsively connectable to the at least one storage. The processor implements the plurality of interface protocols as a software application for interfacing and communicating with the plurality of external destinations including the one or more of the external devices and applications.

In one embodiment, the external devices and applications include, for example, a printer, a facsimile, and a scanner. In one embodiment, the computer information management system includes the capability to integrate an image using software so that the image gets seamlessly replicated and transmitted to at least one of other devices and applications, and via the Internet. In one embodiment, the computer information management system includes the capability to integrate the electronic images into a destination application without the need to modify the destination application.

In one embodiment, the computer information management system includes an interface that enables copying images between physical devices, applications, and the Internet using a single "GO" operation. In one embodiment, the computer information management system includes the capability of adding at least one of electronic document and paper processing with a single programming step.

In one embodiment, the software application includes at least one input module managing information comprising at least one of paper and electronic paper input to the computer information management system, and managing at least one imaging device to input the information through at least one of a scanner and a digital copier, and managing the electronic paper from at least one third-party software applications; at least one output module managing the information output from the computer information management system, managing at least one imaging device to output the information to at least one of a standard Windows printer, an image printer, and a digital copier, and managing the output of the information to the third-party software application; at least one process module applying at least one information processing to the information comprising the at least one of the paper and the electronic paper as it is being copied, applying additional functionality including at least one of workflow and processing functionality to the information comprising the at least one of paper and electronic paper as it is being copied, and applying multiple processes to a single virtual copy; at least one client module presenting the information comprising the at least one of paper and electronic paper as it is being copied, and information related to at least one of the input and output functions; and at least one server module communicable with said at least one input, output, client, and process modules and external applications, and capable of dynamically combining the external applications with at least one of digital capturing devices and digital imaging devices.

In one embodiment, one or more of the external devices and applications integrates the computer information management system into an external application via one of running the computer information management system, as an external service and embedding the computer information management system as an embedded service.

In one embodiment, the server module includes enable virtual copy operation means for initiating, canceling, and resetting said computer information management system; maintain list of available module means for maintaining a registry containing a list of said input, output, and process modules that can be used in said computer information management system, said list being read on startup, and maintaining another copy of said list in a modules object accessible by said input, output, client, process and server modules; maintain currently active modules means for maintaining said input, output, and process modules currently being used for a current computer information management system copy operation in a program object, and saving the currently active modules in a process template file; and maintain complete document information means for maintaining information regarding a current file being copied, and saving the information in a document template file.

In one mebodiment, the server module includes at least one server module application programmer interface (API). IN one mebodiment, the server module application programmer interface (API) comprises the COM-based interfaces: at least one modules object maintaining a first list of available input, output, and process modules; at least one program object maintaining a second list of currently selected input, output, and process modules; at least one document object maintaining information regarding a current document being copied; at least one system management method object used to initiate, cancel, and reset said computer information management system; and at least one system management event object used to provide feedback to the Client Module.

In one embodiment, a computer information management system includes at least one of an electronic image, graphics and document management system capable of transmitting at least one of an electronic image, electronic graphics and electronic document to a plurality of external destinations including one or more of external devices and applications responsively connectable at least one of locally and via the Internet. The computer information management system comprises: a first capability to integrate an image using software so that the image gets seamlessly replicated into at least one of other devices and applications, and via the Internet; a second capability to integrate electronic images into existing applications without the need to modify the destination application; an interface comprising a software application that enables copying images between physical devices, applications, and the Internet using a single "GO"

operation; and a third capability of adding at least one of electronic document and paper processing with a single programming step.

A computer information management system capable of managing and transmitting at least one of an electronic image, electronic graphics and electronic document to a plurality of external destinations including one or more of external devices and applications at least one of locally and via the Internet. The computer information management system includes at least one storage storing at least one of a common and universal interface protocol for interfacing and communicating; and at least one processor responsively connectable to said at least one storage, and implementing the at least one common and universal interface protocol as a software application for interfacing and communicating with the plurality of external destinations including the one or more of the external devices and applications.

In one embodiment, a computer readable tangible medium stores instructions for implementing a process driven by a computer implemented on at least one of an electronic image, graphics and document management system capable of managing and transmitting at least one of an electronic image, electronic graphics and electronic document to a plurality of external destinations including at least one of an external device and application at least one of locally and via the Internet. The instructions control the computer to perform the process of: storing at least one of a common and universal interface protocol for interfacing and communicating in at least one storage; and implementing the at least one of common and universal interface protocol as a software application via at least one processor for interfacing and communicating with the plurality of external destinations including the at least one external device and application.

In one embodiment, a computer information management system includes at least one of an electronic image, graphics and document management system capable of transmitting at least one of an electronic image, electronic graphics and electronic document to a plurality of external destinations including one or more of external devices and applications responsively connectable at least one of locally and via the Internet. The computer information management system includes a single function copy operation linking devices, applications and the Internet including at least one a go operation, a single function paper copy between devices and software applications, and a single function paper copy between software applications and devices; a one step programming method to add paper support to electronic business processes including at least one of a one step method of supporting paper within electronic business process application optionally including legacy systems with no or minimal reprogramming of the electronic business process application, a method of recreating a module oriented copier in software; and a copier interface implemented as software application including at least one of a virtual copier interface method of presenting to a user an operation of at least one of copying files and electronic images, at least one of to and from, at least one of digital imaging devices and software applications, in a substantially single step, and presenting users with direct access to at least one of tutorial and options from a main application window.

In one embodiment, a server module includes enable virtual copy operation means for initiating, canceling, and resetting said computer information management system; maintain list of available module means for maintaining a registry containing a list of said input, output, and process modules that can be used in said computer information management system, said list being read on startup, and maintaining another copy of said list in a modules object accessible by said input, output, client, process and server modules; maintain currently active modules means for maintaining said input, output, and process modules currently being used for a current computer information management system copy operation in a program object, and saving the currently active modules in a process template file; and maintain complete document information means for maintaining information regarding a current file being copied, and saving the information in a document template file.

In one embodiment, a computer information management method includes at least one of an electronic image, graphics and document management system capable of transmitting at least one of an electronic image, electronic graphics and electronic document to a plurality of external destinations including one or more of external devices and applications responsively connectable at least one of locally and via the Internet. The method comprises the steps of integrating an image using software so that the image gets seamlessly replicated into at least one of other devices and applications, and via the Internet; integrating electronic images into existing applications without the need to modify the destination application; interfacing via a software application enabling copying images between physical devices, applications, and the Internet using a single "GO" operation; and adding at least one of electronic document and paper processing with a single programming step.

In one embodiment, a server method includes initiating, canceling, and resetting said computer information management system; maintaining a registry containing a list of said input, output, and process modules that can be used in said computer information management system, said list being read on startup, and maintaining another copy of said list in a modules object accessible by said input, output, client, process and server modules; maintaining said input, output, and process modules currently being used for a current computer information management system copy operation in a program object, and saving the currently active modules in a process template file; and maintaining information regarding a current file being copied, and saving the information in a document template file.

A computer data management system includes at least one of an electronic image, graphics and document management system capable of transmitting at least one of an electronic image, electronic graphics and electronic document to a plurality of external destinations including one or more of external devices and applications. The computer data management system is responsively connectable at least one of locally and via the Internet, and includes at least one memory storing a plurality of interface protocols for interfacing and communicating, and at least one processor responsively connectable to the at least one memory. The processor implements at least one interface protocol as a software application for interfacing and communicating with the plurality of external destinations including the one or more of the external devices and applications.

In one embodiment, the external devices and applications include, for example, a printer, a facsimile, and a scanner. In one embodiment, the computer data management system includes the capability to integrate an image using software so that the image gets seamlessly replicated and transmitted to at least one of other devices and applications, and via the Internet. In one embodiment, the computer data management system includes the capability to integrate the electronic images into a destination application without the need to modify the destination application.

In one embodiment, the computer data management system includes an optional interface that enables copying images between physical devices, applications, and the Internet using a single "GO" operation. In one embodiment, the computer data management system includes the optional capability of adding at least one of electronic document and paper processing with a single programming step.

In one embodiment, the software application includes one or more of: at least one input module managing data comprising at least one of paper and electronic paper input to the computer data management system, and managing at least one imaging device to input the data through at least one of a scanner and a digital copier, and managing the electronic paper from at least one third-party software applications; at least one output module managing the data output from the computer data management system, managing at least one imaging device to output the data to at least one of a standard Windows printer, an image printer, and a digital copier, and managing the output of the data to the third-party software application; at least one process module applying at least one data processing to the data comprising the at least one of the paper and the electronic paper as it is being copied, applying additional functionality including at least one of workflow and processing functionality to the data comprising the at least one of paper and electronic paper as it is being copied, and applying multiple processes to a single virtual copy; at least one client module presenting the data comprising the at least one of paper and electronic paper as it is being copied, and information related to at least one of the input and output functions; and at least one server module communicable with said at least one input, output, client, and process modules and external applications, and capable of dynamically combining the external applications with at least one of digital capturing devices and digital imaging devices.

In one embodiment, one or more of the external devices and applications integrates the computer data management system into an external application via at least one of running the computer data management system, as an external service and embedding the computer data management system as an embedded service.

In one embodiment, the server module includes one or more of: enable virtual copy operation means for initiating, canceling, and resetting said computer data management system; maintain list of available module means for maintaining a registry containing a list of said input, output, and process modules that can be used in said computer data management system, said list being read on startup, and maintaining another copy of said list in a modules object accessible by said input, output, client, process and server modules; maintain currently active modules means for maintaining said input, output, and process modules currently being used for a current computer data management system copy operation in a program object, and saving the currently active modules in a process template file; and maintain complete document information means for maintaining information regarding a current file being copied, and saving the information in a document template file.

In one embodiment, the server module includes at least one server module application programmer interface (API). In one embodiment, the server module application programmer interface (API) comprises one or more of the following COM-based interfaces: at least one modules object maintaining a first list of available input, output, and process modules; at least one program object maintaining a second list of currently selected input, output, and process modules; at least one document object maintaining information regarding a current document being copied; at least one system management method object used to initiate, cancel, and reset said computer data management system; and at least one system management event object used to provide feedback to the Client Module.

In one embodiment, a computer data management system includes at least one of an electronic image, graphics and document management system capable of transmitting at least one of an electronic image, electronic graphics and electronic document to a plurality of external destinations including one or more of external devices and applications responsively connectable at least one of locally and via the Internet. The computer data management system comprises one or more of: a first capability to integrate an image using software so that the image gets seamlessly replicated into at least one of other devices and applications, and via the Internet; a second capability to integrate electronic images into existing applications without the need to modify the destination application; an interface comprising a software application that enables copying images between physical devices, applications, and the Internet using a single "GO" operation; and a third capability of adding at least one of electronic document and paper processing with a single programming step.

A computer data management system capable of managing and transmitting at least one of an electronic image, electronic graphics and electronic document to a plurality of external destinations including one or more of external devices and applications at least one of locally and via the Internet. The computer data management system includes at least one memory storing at least one of a common and universal interface protocol for interfacing and communicating; and at least one data processor responsively connectable to said at least one memory, and implementing the at least one common and universal interface protocol as a software application for interfacing and communicating with the plurality of external destinations including the one or more of the external devices and applications.

In one embodiment, a computer readable tangible medium stores instructions for implementing a process driven by a computer implemented on at least one of an electronic image, graphics and document management system capable of managing and transmitting at least one of an electronic image, electronic graphics and electronic document to a plurality of external destinations including at least one of an external device and application at least one of locally and via the Internet. The instructions control the computer to perform the process of: storing at least one of a common and universal interface protocol for interfacing and communicating in at least one memory; and implementing the at least one of common and universal interface protocol interfacing and communicating with the plurality of external destinations.

In one embodiment, a computer data management system includes at least one of an electronic image, graphics and document management system capable of transmitting at least one of an electronic image, electronic graphics and electronic document to a plurality of external destinations including one or more of external devices and applications responsively connectable at least one of locally and via the Internet. The computer data management system includes one or more of: a single function copy operation linking devices, applications and the Internet including at least one a go operation, a single function paper copy between devices and software applications, and a single function paper copy between software applications and devices; a one step programming method to add paper support to electronic business processes including at least one of a one step method of supporting paper within electronic business process application optionally including legacy systems with no or minimal reprogramming of the electronic business process application, a method of recreating a module oriented copier in software; and a copier interface implemented as software application including at least one of a virtual copier interface method of presenting to a user an operation of at least one of copying files and electronic images, at least one of to and from, at least one of digital imaging devices and software applications, in a substantially single step, and presenting users with direct access to at least one of tutorial and options from a main application window.

In one embodiment, a server module includes one or more of: enable virtual copy operation means for initiating, canceling, and resetting said computer data management system; maintain list of available module means for maintaining a registry containing a list of said input, output, and process modules that can be used in said computer data management system, said list being read on startup, and maintaining another copy of said list in a modules object accessible by said input, output, client, process and server modules; maintain currently active modules means for maintaining said input, output, and process modules currently being used for a current computer data management system copy operation in a program object, and saving the currently active modules in a process template file; and maintain complete document information means for maintaining information regarding a current file being copied, and saving the information in a document template file.

In one embodiment, a computer data management method includes at least one of an electronic image, graphics and document management system capable of transmitting at least one of an electronic image, electronic graphics and electronic document to a plurality of external destinations including one or more of external devices and applications responsively connectable at least one of locally and via the Internet. The method comprises one or more of the steps of integrating an image using software so that the image gets seamlessly replicated into at least one of other devices and applications, and via the Internet; integrating electronic images into existing applications without the need to modify the destination application; interfacing via a software application enabling copying images between physical devices, applications, and the Internet using a single "GO" operation; and adding at least one of electronic document and paper processing with a single programming step.

In one embodiment, a server method includes one or more of: initiating, canceling, and resetting said computer data management system; maintaining a registry containing a list of said input, output, and process modules that can be used in said computer data management system, said list being read on startup, and maintaining another copy of said list in a modules object accessible by said input, output, client, process and server modules; maintaining said input, output, and process modules currently being used for a current computer data management system copy operation in a program object, and saving the currently active modules in a process template file; and maintaining information regarding a current file being copied, and saving the information in a document template file.

A computer data administration system includes at least one of an electronic image, graphics and document administration system capable of transmitting at least one of an electronic image, electronic graphics and electronic document to a plurality of external destinations including one or more of external devices and applications. The computer data administration system is responsively connectable at least one of locally and via the Internet, and includes at least one memory storing a plurality of interface protocols for interfacing and communicating, and at least one processor responsively connectable to the at least one memory. The processor implements at least one interface protocol as a software application for interfacing and communicating with the plurality of external destinations including the one or more of the external devices and applications.

In one embodiment, the external devices and applications include, for example, a printer, a facsimile, and a scanner. In one embodiment, the computer data administration system includes the capability to integrate an image using software so that the image gets seamlessly replicated and transmitted to at least one of other devices and applications, and via the Internet. In one embodiment, the computer data administration system includes the capability to integrate the electronic images into a destination application without the need to modify the destination application.

In one embodiment, the computer data administration system includes an optional interface that enables copying images between physical devices, applications, and the Internet using a single "GO" operation. In one embodiment, the computer data administration system includes the optional capability of adding at least one of electronic document and paper processing with a single programming step.

In one embodiment, the software application includes one or more of: at least one input module managing data comprising at least one of paper and electronic paper input to the computer data administration system, and managing at least one imaging device to input the data through at least one of a scanner and a digital copier, and managing the electronic paper from at least one third-party software applications; at least one output module managing the data output from the computer data administration system, managing at least one imaging device to output the data to at least one of a standard Windows printer, an image printer, and a digital copier, and managing the output of the data to the third-party software application; at least one process module applying at least one data processing to the data comprising the at least one of the paper and the electronic paper as it is being copied, applying additional functionality including at least one of workflow and processing functionality to the data comprising the at least one of paper and electronic paper as it is being copied, and applying multiple processes to a single virtual copy; at least one client module presenting the data comprising the at least one of paper and electronic paper as it is being copied, and information related to at least one of the input and output functions; and at least one server module communicable with said at least one input, output, client, and process modules and external applications, and capable of dynamically combining the external applications with at least one of digital capturing devices and digital imaging devices.

In one embodiment, one or more of the external devices and applications integrates the computer data administration system into an external application via at least one of running the computer data administration system, as an external service and embedding the computer data administration system as an embedded service.

In one embodiment, the server module includes one or more of: enable virtual copy operation means for initiating, canceling, and resetting said computer data administration system; maintain list of available module means for maintaining a registry containing a list of said input, output, and process modules that can be used in said computer data administration system, said list being read on startup, and maintaining another copy of said list in a modules object accessible by said input, output, client, process and server modules; maintain currently active modules means for maintaining said input, output, and process modules currently being used for a current computer data administration system copy operation in a program object, and saving the currently active modules in a process template file; and maintain complete document information means for maintaining information regarding a current file being copied, and saving the information in a document template file.

In one embodiment, the server module includes at least one server module application programmer interface (API). In one embodiment, the server module application programmer interface (API) comprises one or more of the following COM-based interfaces: at least one modules object maintaining a first list of available input, output, and process modules; at least one program object maintaining a second list of currently selected input, output, and process modules; at least one document object maintaining information regarding a current document being copied; at least one system administration method object used to initiate, cancel, and reset said computer data administration system; and at least one system administration event object used to provide feedback to the Client Module.

In one embodiment, a computer data administration system includes at least one of an electronic image, graphics and document administration system capable of transmitting at least one of an electronic image, electronic graphics and electronic document to a plurality of external destinations including one or more of external devices and applications responsively connectable at least one of locally and via the Internet. The computer data administration system comprises one or more of: a first capability to integrate an image using software so that the image gets seamlessly replicated into at least one of other devices and applications, and via the Internet; a second capability to integrate electronic images into existing applications without the need to modify the destination application; an interface comprising a software application that enables copying images between physical devices, applications, and the Internet using a single "GO" operation; and a third capability of adding at least one of electronic document and paper processing with a single programming step.

A computer data administration system capable of managing and transmitting at least one of an electronic image, electronic graphics and electronic document to a plurality of external destinations including one or more of external devices and applications at least one of locally and via the Internet. The computer data administration system includes at least one memory storing at least one of a common and universal interface protocol for interfacing and communicating; and at least one data processor responsively connectable to said at least one memory, and implementing the at least one common and universal interface protocol as a software application for interfacing and communicating with the plurality of external destinations including the one or more of the external devices and applications.

In one embodiment, a computer readable tangible medium stores instructions for implementing a process driven by a computer implemented on at least one of an electronic image, graphics and document administration system capable of managing and transmitting at least one of an electronic image, electronic graphics and electronic document to a plurality of external destinations including at least one of an external device and application at least one of locally and via the Internet. The instructions control the computer to perform the process of: storing at least one of a common and universal interface protocol for interfacing and communicating in at least one memory; and implementing the at least one of common and universal interface protocol interfacing and communicating with the plurality of external destinations.

In one embodiment, a computer data administration system includes at least one of an electronic image, graphics and document administration system capable of transmitting at least one of an electronic image, electronic graphics and electronic document to a plurality of external destinations including one or more of external devices and applications responsively connectable at least one of locally and via the Internet. The computer data administration system includes one or more of: a single function copy operation linking devices, applications and the Internet including at least one a go operation, a single function paper copy between devices and software applications, and a single function paper copy between software applications and devices; a one step programming method to add paper support to electronic business processes including at least one of a one step method of supporting paper within electronic business process application optionally including legacy systems with no or minimal reprogramming of the electronic business process application, a method of recreating a module oriented copier in software; and a copier interface implemented as software application including at least one of a virtual copier interface method of presenting to a user an operation of at least one of copying files and electronic images, at least one of to and from, at least one of digital imaging devices and software applications, in a substantially single step, and presenting users with direct access to at least one of tutorial and options from a main application window.

In one embodiment, a server module includes one or more of: enable virtual copy operation means for initiating, canceling, and resetting said computer data administration system; maintain list of available module means for maintaining a registry containing a list of said input, output, and process modules that can be used in said computer data administration system, said list being read on startup, and maintaining another copy of said list in a modules object accessible by said input, output, client, process and server modules; maintain currently active modules means for maintaining said input, output, and process modules currently being used for a current computer data administration system copy operation in a program object, and saving the currently active modules in a process template file; and maintain complete document information means for maintaining information regarding a current file being copied, and saving the information in a document template file.

In one embodiment, a computer data administration method includes at least one of an electronic image, graphics and document administration system capable of transmitting at least one of an electronic image, electronic graphics and electronic document to a plurality of external destinations including one or more of external devices and applications responsively connectable at least one of locally and via the Internet. The method comprises one or more of the steps of integrating an image using software so that the image gets seamlessly replicated into at least one of other devices and applications, and via the Internet; integrating electronic images into existing applications without the need to modify the destination application; interfacing via a software application enabling copying images between physical devices, applications, and the Internet using a single "GO" operation; and adding at least one of electronic document and paper processing with a single programming step.

In one embodiment, a server method includes one or more of: initiating, canceling, and resetting said computer data administration system; maintaining a registry containing a list of said input, output, and process modules that can be used in said computer data administration system, said list being read on startup, and maintaining another copy of said list in a modules object accessible by said input, output, client, process and server modules; maintaining said input, output, and process modules currently being used for a current computer data administration system copy operation in a program object, and saving the currently active modules in a process template file; and maintaining information regarding a current file being copied, and saving the information in a document template file.

A workstation data management system includes at least one of an electronic image, graphics and document management system capable of transmitting at least one of an electronic image, electronic graphics and electronic document to a plurality of external destinations including one or more of external devices and applications. The workstation data management system is responsively connectable at least one of locally and via the Internet, and includes at least one memory storing a plurality of interface protocols for interfacing and communicating, and at least one processor responsively connectable to the at least one memory. The processor implements at least one interface protocol as a software application for interfacing and communicating with the plurality of external destinations including the one or more of the external devices and applications.

In one embodiment, the external devices and applications include, for example, a printer, a facsimile, and a scanner. In one embodiment, the workstation data management system includes the capability to integrate an image using software so that the image gets seamlessly replicated and transmitted to at least one of other devices and applications, and via the Internet. In one embodiment, the workstation data management system includes the capability to integrate the electronic images into a destination application without the need to modify the destination application.

In one embodiment, the workstation data management system includes an optional interface that enables copying images between physical devices, applications, and the Internet using a single "GO" operation. In one embodiment, the workstation data management system includes the optional capability of adding at least one of electronic document and paper processing with a single programming step.

In one embodiment, the software application includes one or more of: at least one input module managing data comprising at least one of paper and electronic paper input to the workstation data management system, and managing at least one imaging device to input the data through at least one of a scanner and a digital copier, and managing the electronic paper from at least one third-party software applications; at least one output module managing the data output from the workstation data management system, managing at least one imaging device to output the data to at least one of a standard Windows printer, an image printer, and a digital copier, and managing the output of the data to the third-party software application; at least one process module applying at least one data processing to the data comprising the at least one of the paper and the electronic paper as it is being copied, applying additional functionality including at least one of workflow and processing functionality to the data comprising the at least one of paper and electronic paper as it is being copied, and applying multiple processes to a single virtual copy; at least one client module presenting the data comprising the at least one of paper and electronic paper as it is being copied, and information related to at least one of the input and output functions; and at least one server module communicable with said at least one input, output, client, and process modules and external applications, and capable of dynamically combining the external applications with at least one of digital capturing devices and digital imaging devices.

In one embodiment, one or more of the external devices and applications integrates the workstation data management system into an external application via at least one of running the workstation data management system, as an external service and embedding the workstation data management system as an embedded service.

In one embodiment, the server module includes one or more of: enable virtual copy operation means for initiating, canceling, and resetting said workstation data management system; maintain list of available module means for maintaining a registry containing a list of said input, output, and process modules that can be used in said workstation data management system, said list being read on startup, and maintaining another copy of said list in a modules object accessible by said input, output, client, process and server modules; maintain currently active modules means for maintaining said input, output, and process modules currently being used for a current workstation data management system copy operation in a program object, and saving the currently active modules in a process template file; and maintain complete document information means for maintaining information regarding a current file being copied, and saving the information in a document template file.

In one embodiment, the server module includes at least one server module application programmer interface (API). In one embodiment, the server module application programmer interface (API) comprises one or more of the following COM-based interfaces: at least one modules object maintaining a first list of available input, output, and process modules; at least one program object maintaining a second list of currently selected input, output, and process modules; at least one document object maintaining information regarding a current document being copied; at least one system management method object used to initiate, cancel, and reset said workstation data management system; and at least one system management event object used to provide feedback to the Client Module.

In one embodiment, a workstation data management system includes at least one of an electronic image, graphics and document management system capable of transmitting at least one of an electronic image, electronic graphics and electronic document to a plurality of external destinations including one or more of external devices and applications responsively connectable at least one of locally and via the Internet. The workstation data management system comprises one or more of: a first capability to integrate an image using software so that the image gets seamlessly replicated into at least one of other devices and applications, and via the Internet; a second capability to integrate electronic images into existing applications without the need to modify the destination application; an interface comprising a software application that enables copying images between physical devices, applications, and the Internet using a single "GO" operation; and a third capability of adding at least one of electronic document and paper processing with a single programming step.

A workstation data management system capable of managing and transmitting at least one of an electronic image, electronic graphics and electronic document to a plurality of external destinations including one or more of external devices and applications at least one of locally and via the Internet. The workstation data management system includes at least one memory storing at least one of a common and universal interface protocol for interfacing and communicating; and at least one data processor responsively connectable to said at least one memory, and implementing the at least one common and universal interface protocol as a software application for interfacing and communicating with the plurality of external destinations including the one or more of the external devices and applications.

In one embodiment, a workstation readable tangible medium stores instructions for implementing a process driven by a workstation implemented on at least one of an electronic image, graphics and document management system capable of managing and transmitting at least one of an electronic image, electronic graphics and electronic document to a plurality of external destinations including at least one of an external device and application at least one of locally and via the Internet. The instructions control the workstation to perform the process of: storing at least one of a common and universal interface protocol for interfacing and communicating in at least one memory; and implementing the at least one of common and universal interface protocol interfacing and communicating with the plurality of external destinations.

In one embodiment, a workstation data management system includes at least one of an electronic image, graphics and document management system capable of transmitting at least one of an electronic image, electronic graphics and electronic document to a plurality of external destinations including one or more of external devices and applications responsively connectable at least one of locally and via the Internet. The workstation data management system includes one or more of: a single function copy operation linking devices, applications and the Internet including at least one a go operation, a single function paper copy between devices and software applications, and a single function paper copy between software applications and devices; a one step programming method to add paper support to electronic business processes including at least one of a one step method of supporting paper within electronic business process application optionally including legacy systems with no or minimal reprogramming of the electronic business process application, a method of recreating a module oriented copier in software; and a copier interface implemented as software application including at least one of a virtual copier interface method of presenting to a user an operation of at least one of copying files and electronic images, at least one of to and from, at least one of digital imaging devices and software applications, in a substantially single step, and presenting users with direct access to at least one of tutorial and options from a main application window.

In one embodiment, a server module includes one or more of: enable virtual copy operation means for initiating, canceling, and resetting said workstation data management system; maintain list of available module means for maintaining a registry containing a list of said input, output, and process modules that can be used in said workstation data management system, said list being read on startup, and maintaining another copy of said list in a modules object accessible by said input, output, client, process and server modules; maintain currently active modules means for maintaining said input, output, and process modules currently being used for a current workstation data management system copy operation in a program object, and saving the currently active modules in a process template file; and maintain complete document information means for maintaining information regarding a current file being copied, and saving the information in a document template file.

In one embodiment, a workstation data management method includes at least one of an electronic image, graphics and document management system capable of transmitting at least one of an electronic image, electronic graphics and electronic document to a plurality of external destinations including one or more of external devices and applications responsively connectable at least one of locally and via the Internet. The method comprises one or more of the steps of integrating an image using software so that the image gets seamlessly replicated into at least one of other devices and applications, and via the Internet; integrating electronic images into existing applications without the need to modify the destination application; interfacing via a software application enabling copying images between physical devices, applications, and the Internet using a single "GO" operation; and adding at least one of electronic document and paper processing with a single programming step.

In one embodiment, a server method includes one or more of: initiating, canceling, and resetting said workstation data management system; maintaining a registry containing a list of said input, output, and process modules that can be used in said workstation data management system, said list being read on startup, and maintaining another copy of said list in a modules object accessible by said input, output, client, process and server modules; maintaining said input, output, and process modules currently being used for a current workstation data management system copy operation in a program object, and saving the currently active modules in a process template file; and maintaining information regarding a current file being copied, and saving the information in a document template file.

A computer data management apparatus includes at least one of an electronic image, graphics and document management apparatus capable of transmitting at least one of an electronic image, electronic graphics and electronic document to a plurality of external destinations including one or more of external devices and applications. The computer data management apparatus is responsively connectable at least one of locally and via the Internet, and includes at least one memory storing a plurality of interface protocols for interfacing and communicating, and at least one processor responsively connectable to the at least one memory. The processor implements at least one interface protocol as a software application for interfacing and communicating with the plurality of external destinations including the one or more of the external devices and applications.

In one embodiment, the external devices and applications include, for example, a printer, a facsimile, and a scanner. In one embodiment, the computer data management apparatus includes the capability to integrate an image using software so that the image gets seamlessly replicated and transmitted to at least one of other devices and applications, and via the Internet. In one embodiment, the computer data management apparatus includes the capability to integrate the electronic images into a destination application without the need to modify the destination application.

In one embodiment, the computer data management apparatus includes an optional interface that enables copying images between physical devices, applications, and the Internet using a single "GO" operation. In one embodiment, the computer data management apparatus includes the optional capability of adding at least one of electronic document and paper processing with a single programming step.

In one embodiment, the software application includes one or more of: at least one input module managing data comprising at least one of paper and electronic paper input to the computer data management apparatus, and managing at least one imaging device to input the data through at least one of a scanner and a digital copier, and managing the electronic paper from at least one third-party software applications; at least one output module managing the data output from the computer data management apparatus, managing at least one imaging device to output the data to at least one of a standard Windows printer, an image printer, and a digital copier, and managing the output of the data to the third-party software application; at least one process module applying at least one data processing to the data comprising the at least one of the paper and the electronic paper as it is being copied, applying additional functionality including at least one of workflow and processing functionality to the data comprising the at least one of paper and electronic paper as it is being copied, and applying multiple processes to a single virtual copy; at least one client module presenting the data comprising the at least one of paper and electronic paper as it is being copied, and information related to at least one of the input and output functions; and at least one server module communicable with said at least one input, output, client, and process modules and external applications, and capable of dynamically combining the external applications with at least one of digital capturing devices and digital imaging devices.

In one embodiment, one or more of the external devices and applications integrates the computer data management apparatus into an external application via at least one of running the computer data management apparatus, as an external service and embedding the computer data management apparatus as an embedded service.

In one embodiment, the server module includes one or more of: enable virtual copy operation means for initiating, canceling, and resetting said computer data management apparatus; maintain list of available module means for maintaining a registry containing a list of said input, output, and process modules that can be used in said computer data management apparatus, said list being read on startup, and maintaining another copy of said list in a modules object accessible by said input, output, client, process and server modules; maintain currently active modules means for maintaining said input, output, and process modules currently being used for a current computer data management apparatus copy operation in a program object, and saving the currently active modules in a process template file; and maintain complete document information means for maintaining information regarding a current file being copied, and saving the information in a document template file.

In one embodiment, the server module includes at least one server module application programmer interface (API). In one embodiment, the server module application programmer interface (API) comprises one or more of the following COM-based interfaces: at least one modules object maintaining a first list of available input, output, and process modules; at least one program object maintaining a second list of currently selected input, output, and process modules; at least one document object maintaining information regarding a current document being copied; at least one apparatus management method object used to initiate, cancel, and reset said computer data management apparatus; and at least one apparatus management event object used to provide feedback to the Client Module.

In one embodiment, a computer data management apparatus includes at least one of an electronic image, graphics and document management apparatus capable of transmitting at least one of an electronic image, electronic graphics and electronic document to a plurality of external destinations including one or more of external devices and applications responsively connectable at least one of locally and via the Internet. The computer data management apparatus comprises one or more of: a first capability to integrate an image using software so that the image gets seamlessly replicated into at least one of other devices and applications, and via the Internet; a second capability to integrate electronic images into existing applications without the need to modify the destination application; an interface comprising a software application that enables copying images between physical devices, applications, and the Internet using a single "GO" operation; and a third capability of adding at least one of electronic document and paper processing with a single programming step.

A computer data management apparatus capable of managing and transmitting at least one of an electronic image, electronic graphics and electronic document to a plurality of external destinations including one or more of external devices and applications at least one of locally and via the Internet. The computer data management apparatus includes at least one memory storing at least one of a common and universal interface protocol for interfacing and communicating; and at least one data processor responsively connectable to said at least one memory, and implementing the at least one common and universal interface protocol as a software application for interfacing and communicating with the plurality of external destinations including the one or more of the external devices and applications.

In one embodiment, a computer readable tangible medium stores instructions for implementing a process driven by a computer implemented on at least one of an electronic image, graphics and document management apparatus capable of managing and transmitting at least one of an electronic image, electronic graphics and electronic document to a plurality of external destinations including at least one of an external device and application at least one of locally and via the Internet. The instructions control the computer to perform the process of: storing at least one of a common and universal interface protocol for interfacing and communicating in at least one memory; and implementing the at least one of common and universal interface protocol interfacing and communicating with the plurality of external destinations.

In one embodiment, a computer data management apparatus includes at least one of an electronic image, graphics and document management apparatus capable of transmitting at least one of an electronic image, electronic graphics and electronic document to a plurality of external destinations including one or more of external devices and applications responsively connectable at least one of locally and via the Internet. The computer data management apparatus includes one or more of: a single function copy operation linking devices, applications and the Internet including at least one a go operation, a single function paper copy between devices and software applications, and a single function paper copy between software applications and devices; a one step programming method to add paper support to electronic business processes including at least one of a one step method of supporting paper within electronic business process application optionally including legacy apparatus with no or minimal reprogramming of the electronic business process application, a method of recreating a module oriented copier in software; and a copier interface implemented as software application including at least one of a virtual copier interface method of presenting to a user an operation of at least one of copying files and electronic images, at least one of to and from, at least one of digital imaging devices and software applications, in a substantially single step, and presenting users with direct access to at least one of tutorial and options from a main application window.

In one embodiment, a server module includes one or more of: enable virtual copy operation means for initiating, canceling, and resetting said computer data management apparatus; maintain list of available module means for maintaining a registry containing a list of said input, output, and process modules that can be used in said computer data management apparatus, said list being read on startup, and maintaining another copy of said list in a modules object accessible by said input, output, client, process and server modules; maintain currently active modules means for maintaining said input, output, and process modules currently being used for a current computer data management apparatus copy operation in a program object, and saving the currently active modules in a process template file; and maintain complete document information means for maintaining information regarding a current file being copied, and saving the information in a document template file.

In one embodiment, a computer data management method includes at least one of an electronic image, graphics and document management apparatus capable of transmitting at least one of an electronic image, electronic graphics and electronic document to a plurality of external destinations including one or more of external devices and applications responsively connectable at least one of locally and via the Internet. The method comprises one or more of the steps of integrating an image using software so that the image gets seamlessly replicated into at least one of other devices and applications, and via the Internet; integrating electronic images into existing applications without the need to modify the destination application; interfacing via a software application enabling copying images between physical devices, applications, and the Internet using a single "GO" operation; and adding at least one of electronic document and paper processing with a single programming step.

In one embodiment, a server method includes one or more of: initiating, canceling, and resetting said computer data management apparatus; maintaining a registry containing a list of said input, output, and process modules that can be used in said computer data management apparatus, said list being read on startup, and maintaining another copy of said list in a modules object accessible by said input, output, client, process and server modules; maintaining said input, output, and process modules currently being used for a current computer data management apparatus copy operation in a program object, and saving the currently active modules in a process template file; and maintaining information regarding a current file being copied, and saving the information in a document template file.

A computer data management device includes at least one of an electronic image, graphics and document management device capable of transmitting at least one of an electronic image, electronic graphics and electronic document to a plurality of external destinations including one or more of external devices and applications. The computer data management device is responsively connectable at least one of locally and via the Internet, and includes at least one memory storing a plurality of interface procedures for communicating and communicating, and at least one processor responsively connectable to the at least one memory. The processor implements at least one interface procedure as a software application for communicating and communicating with the plurality of external destinations including the one or more of the external devices and applications.

In one embodiment, the external devices and applications include, for example, a printer, a facsimile, and a scanner. In one embodiment, the computer data management device includes the capability to integrate an image using software so that the image gets seamlessly replicated and transmitted to at least one of other devices and applications, and via the Internet. In one embodiment, the computer data management device includes the capability to integrate the electronic images into a destination application without the need to modify the destination application.

In one embodiment, the computer data management device includes an optional interface that enables copying images between physical devices, applications, and the Internet using a single "GO" action. In one embodiment, the computer data management device includes the optional capability of adding at least one of electronic document and paper processing with a single programming step.

In one embodiment, the software application includes one or more of: at least one input module managing data comprising at least one of paper and electronic paper input to the computer data management device, and managing at least one imaging device to input the data through at least one of a scanner and a digital copier, and managing the electronic paper from at least one third-party software applications; at least one output module managing the data output from the computer data management device, managing at least one imaging device to output the data to at least one of a standard Windows printer, an image printer, and a digital copier, and managing the output of the data to the third-party software application; at least one process module applying at least one data processing to the data comprising the at least one of the paper and the electronic paper as it is being copied, applying additional functionality including at least one of workflow and processing functionality to the data comprising the at least one of paper and electronic paper as it is being copied, and applying multiple processes to a single virtual copy; at least one client module presenting the data comprising the at least one of paper and electronic paper as it is being copied, and information related to at least one of the input and output functions; and at least one server module communicable with said at least one input, output, client, and process modules and external applications, and capable of dynamically combining the external applications with at least one of digital capturing devices and digital imaging devices.

In one embodiment, one or more of the external devices and applications integrates the computer data management device into an external application via at least one of running the computer data management device, as an external service and embedding the computer data management device as an embedded service.

In one embodiment, the server module includes one or more of: enable virtual copy action means for initiating, canceling, and resetting said computer data management device; maintain list of available module means for maintaining a registry containing a list of said input, output, and process modules that can be used in said computer data management device, said list being read on startup, and maintaining another copy of said list in a modules object accessible by said input, output, client, process and server modules; maintain currently active modules means for maintaining said input, output, and process modules currently being used for a current computer data management device copy action in a program object, and saving the currently active modules in a process template file; and maintain complete document information means for maintaining information regarding a current file being copied, and saving the information in a document template file.

In one embodiment, the server module includes at least one server module application programmer interface (API). In one embodiment, the server module application programmer interface (API) comprises one or more of the following COM-based interfaces: at least one modules is object maintaining a first list of available input, output, and process modules; at least one program object maintaining a second list of currently selected input, output, and process modules; at least one document object maintaining information regarding a current document being copied; at least one device management method object used to initiate, cancel, and reset said computer data management device; and at least one device management event object used to provide feedback to the Client Module.

In one embodiment, a computer data management device includes at least one of an electronic image, graphics and document management device capable of transmitting at least one of an electronic image, electronic graphics and electronic document to a plurality of external destinations including one or more of external devices and applications responsively connectable at least one of locally and via the Internet. The computer data management device comprises one or more of: a first capability to integrate an image using software so that the image gets seamlessly replicated into at least one of other devices and applications, and via the Internet; a second capability to integrate electronic images into existing applications without the need to modify the destination application; an interface comprising a software application that enables copying images between physical devices, applications, and the Internet using a single "GO" action; and a third capability of adding at least one of electronic document and paper processing with a single programming step.

A computer data management device capable of managing and transmitting at least one of an electronic image, electronic graphics and electronic document to a plurality of external destinations including one or more of external devices and applications at least one of locally and via the Internet. The computer data management device includes at least one memory storing at least one of a common and universal interface procedure for communicating and communicating; and at least one data processor responsively connectable to said at least one memory, and implementing the at least one common and universal interface procedure as a software application for communicating and communicating with the plurality of external destinations including the one or more of the external devices and applications.

In one embodiment, a computer readable tangible medium stores instructions for implementing a process driven by a computer implemented on at least one of an electronic image, graphics and document management device capable of managing and transmitting at least one of an electronic image, electronic graphics and electronic document to a plurality of external destinations including at least one of an external device and application at least one of locally and via the Internet. The instructions control the computer to perform the process of: storing at least one of a common and universal interface procedure for communicating and communicating in at least one memory; and implementing the at least one of common and universal interface procedure communicating and communicating with the plurality of external destinations.

In one embodiment, a computer data management device includes at least one of an electronic image, graphics and document management device capable of transmitting at least one of an electronic image, electronic graphics and electronic document to a plurality of external destinations including one or more of external devices and applications responsively connectable at least one of locally and via the Internet. The computer data management device includes one or more of: a single function copy action linking devices, applications and the Internet including at least one a go action, a single function paper copy between devices and software applications, and a single function paper copy between software applications and devices; a one step programming method to add paper support to electronic business processes including at least one of a one step method of supporting paper within electronic business process application optionally including legacy devices with no or minimal reprogramming of the electronic business process application, a method of recreating a module oriented copier in software; and a copier interface implemented as software application including at least one of a virtual copier interface method of presenting to a user an action of at least one of copying files and electronic images, at least one of to and from, at least one of digital imaging devices and software applications, in a substantially single step, and presenting users with direct access to at least one of tutorial and options from a main application window.

In one embodiment, a server module includes one or more of: enable virtual copy action means for initiating, canceling, and resetting said computer data management device; maintain list of available module means for maintaining a registry containing a list of said input, output, and process modules that can be used in said computer data management device, said list being read on startup, and maintaining another copy of said list in a modules object accessible by said input, output, client, process and server modules; maintain currently active modules means for maintaining said input, output, and process modules currently being used for a current computer data management device copy action in a program object, and saving the currently active modules in a process template file; and maintain complete document information means for maintaining information regarding a current file being copied, and saving the information in a document template file.

In one embodiment, a computer data management method includes at least one of an electronic image, graphics and document management device capable of transmitting at least one of an electronic image, electronic graphics and electronic document to a plurality of external destinations including one or more of external devices and applications responsively connectable at least one of locally and via the Internet. The method comprises one or more of the steps of integrating an image using software so that the image gets seamlessly replicated into at least one of other devices and applications, and via the Internet; integrating electronic images into existing applications without the need to modify the destination application; communicating via a software application enabling copying images between physical devices, applications, and the Internet using a single "GO" action; and adding at least one of electronic document and paper processing with a single programming step.

In one embodiment, a server method includes one or more of: initiating, canceling, and resetting said computer data management device; maintaining a registry containing a list of said input, output, and process modules that can be used in said computer data management device, said list being read on startup, and maintaining another copy of said list in a modules object accessible by said input, output, client, process and server modules; maintaining said input, output, and process modules currently being used for a current computer data management device copy action in a program object, and saving the currently active modules in a process template file; and maintaining information regarding a current file being copied, and saving the information in a document template file.

A computer data management method includes at least one of an electronic image, graphics and document management method capable of transmitting at least one of an electronic image, electronic graphics and electronic document to a plurality of external destinations including one or more of external devices and applications. The computer data management method is connectable at least one of locally and via the Internet, and accesses at least one memory storing a plurality of interface protocols for interfacing and communicating, and at least one processor responsively connectable to the at least one memory. The processor implements at least one interface protocol as a software application for interfacing and communicating with the plurality of external destinations including the one or more of the external devices and applications.

In one embodiment, the external devices and applications include, for example, a printer, a facsimile, and a scanner. In one embodiment, the computer data management method includes the capability to integrate an image using software so that the image gets seamlessly replicated and transmitted to at least one of other devices and applications, and via the Internet. In one embodiment, the computer data management method includes the capability to integrate the electronic images into a destination application without the need to modify the destination application.

In one embodiment, the computer data management method includes an optional interface that enables copying images between physical devices, applications, and the Internet using a single "GO" operation. In one embodiment, the computer data management method includes the optional capability of adding at least one of electronic document and paper processing with a single programming step.

In one embodiment, the software application includes one or more of: managing data comprising at least one of paper and electronic paper input to the computer data management method, and managing at least one imaging device to input the data through at least one of a scanner and a digital copier, and managing the electronic paper from at least one third-party software applications; managing the data output from the computer data management method, managing at least one imaging device to output the data to at least one of a standard Windows printer, an image printer, and a digital copier, and managing the output of the data to the third-party software application; applying at least one data processing to the data comprising the at least one of the paper and the electronic paper as it is being copied, applying additional functionality including at least one of workflow and processing functionality to the data comprising the at least one of paper and electronic paper as it is being copied, and applying multiple processes to a single virtual copy; presenting the data comprising the at least one of paper and electronic paper as it is being copied, and information related to at least one of the input and output functions; and communicable with said at least one input, output, client, and process modules and external applications, and capable of dynamically combining the external applications with at least one of digital capturing devices and digital imaging devices.

In one embodiment, one or more of the external devices and applications integrates the computer data management method into an external application via at least one of running the computer data management method, as an external service and embedding the computer data management method as an embedded service.

In one embodiment, the server module includes one or more of: enable virtual copy operation means for initiating, canceling, and resetting said computer data management method; maintain list of available module means for maintaining a registry containing a list of said input, output, and process modules that can be used in said computer data management method, said list being read on startup, and maintaining another copy of said list in a modules object accessible by said input, output, client, process and server modules; maintain currently active modules means for maintaining said input, output, and process modules currently being used for a current computer data management method copy operation in a program object, and saving the currently active modules in a process template file; and maintain complete document information means for maintaining information regarding a current file being copied, and saving the information in a document template file.

In one embodiment, the server module includes at least one server module application programmer interface (API). In one embodiment, the server module application programmer interface (API) comprises one or more of the following COM-based interfaces: at least one modules object maintaining a first list of available input, output, and process modules; at least one program object maintaining a second list of currently selected input, output, and process modules; at least one document object maintaining information regarding a current document being copied; at least one method management method object used to initiate, cancel, and reset said computer data management method; and at least one method management event object used to provide feedback to the Client Module.

In one embodiment, a computer data management method includes at least one of an electronic image, graphics and document management method capable of transmitting at least one of an electronic image, electronic graphics and electronic document to a plurality of external destinations including one or more of external devices and applications responsively connectable at least one of locally and via the Internet. The computer data management method comprises one or more of: a first capability to integrate an image using software so that the image gets seamlessly replicated into at least one of other devices and applications, and via the Internet; a second capability to integrate electronic images into existing applications without the need to modify the destination application; an interface comprising a software application that enables copying images between physical devices, applications, and the Internet using a single "GO" operation; and a third capability of adding at least one of electronic document and paper processing with a single programming step.

A computer data management method capable of managing and transmitting at least one of an electronic image, electronic graphics and electronic document to a plurality of external destinations including one or more of external devices and applications at least one of locally and via the Internet. The computer data management method includes at least one memory storing at least one of a common and universal interface protocol for interfacing and communicating; and at least one data processor responsively connectable to said at least one memory, and implementing the at least one common and universal interface protocol as a software application for interfacing and communicating with the plurality of external destinations including the one or more of the external devices and applications.

In one embodiment, a computer readable tangible medium stores instructions for implementing a process driven by a computer implemented on at least one of an electronic image, graphics and document management method capable of managing and transmitting at least one of an electronic image, electronic graphics and electronic document to a plurality of external destinations including at least one of an external device and application at least one of locally and via the Internet. The instructions control the computer to perform the process of: storing at least one of a common and universal interface protocol for interfacing and communicating in at least one memory; and implementing the at least one of common and universal interface protocol interfacing and communicating with the plurality of external destinations.

In one embodiment, a computer data management method includes at least one of an electronic image, graphics and document management method capable of transmitting at least one of an electronic image, electronic graphics and electronic document to a plurality of external destinations including one or more of external devices and applications responsively connectable at least one of locally and via the Internet. The computer data management method includes one or more of: a single function copy operation linking devices, applications and the Internet including at least one a go operation, a single function paper copy between devices and software applications, and a single function paper copy between software applications and devices; a one step programming method to add paper support to electronic business processes including at least one of a one step method of supporting paper within electronic business process application optionally including legacy methods with no or minimal reprogramming of the electronic business process application, a method of recreating a module oriented copier in software; and a copier interface implemented as software application including at least one of a virtual copier interface method of presenting to a user an operation of at least one of copying files and electronic images, at least one of to and from, at least one of digital imaging devices and software applications, in a substantially single step, and presenting users with direct access to at least one of tutorial and options from a main application window.

In one embodiment, a server module includes one or more of: enable virtual copy operation means for initiating, canceling, and resetting said computer data management method; maintain list of available module means for maintaining a registry containing a list of said input, output, and process modules that can be used in said computer data management method, said list being read on startup, and maintaining another copy of said list in a modules object accessible by said input, output, client, process and server modules; maintain currently active modules means for maintaining said input, output, and process modules currently being used for a current computer data management method copy operation in a program object, and saving the currently active modules in a process template file; and maintain complete document information means for maintaining information regarding a current file being copied, and saving the information in a document template file.

In one embodiment, a computer data management method includes at least one of an electronic image, graphics and document management method capable of transmitting at least one of an electronic image, electronic graphics and electronic document to a plurality of external destinations including one or more of external devices and applications responsively connectable at least one of locally and via the Internet. The method comprises one or more of the steps of integrating an image using software so that the image gets seamlessly replicated into at least one of other devices and applications, and via the Internet; integrating electronic images into existing applications without the need to modify the destination application; interfacing via a software application enabling copying images between physical devices, applications, and the Internet using a single "GO" operation; and adding at least one of electronic document and paper processing with a single programming step.

In one embodiment, a server method includes one or more of: initiating, canceling, and resetting said computer data management method; maintaining a registry containing a list of said input, output, and process modules that can be used in said computer data management method, said list being read on startup, and maintaining another copy of said list in a modules object accessible by said input, output, client, process and server modules; maintaining said input, output, and process modules currently being used for a current computer data management method copy operation in a program object, and saving the currently active modules in a process template file; and maintaining information regarding a current file being copied, and saving the information in a document template file.

In accordance with another embodiment of the invention, a computer readable tangible medium is provided that stores an object thereon, for execution by the computer.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 7 is a table illustrating the engine management specification with definitions;

FIG. 9 is an illustration of exemplary tables used to drive the three functions of the engine management layer illustrated in FIG. 8;

FIG. 10 is an exemplary table illustrating the engine configuration specification with definitions;

FIG. 12 is an exemplary table illustrating the engine functionality specification with definitions;

NOTATIONS AND NOMENCLATURE

Figure 1:
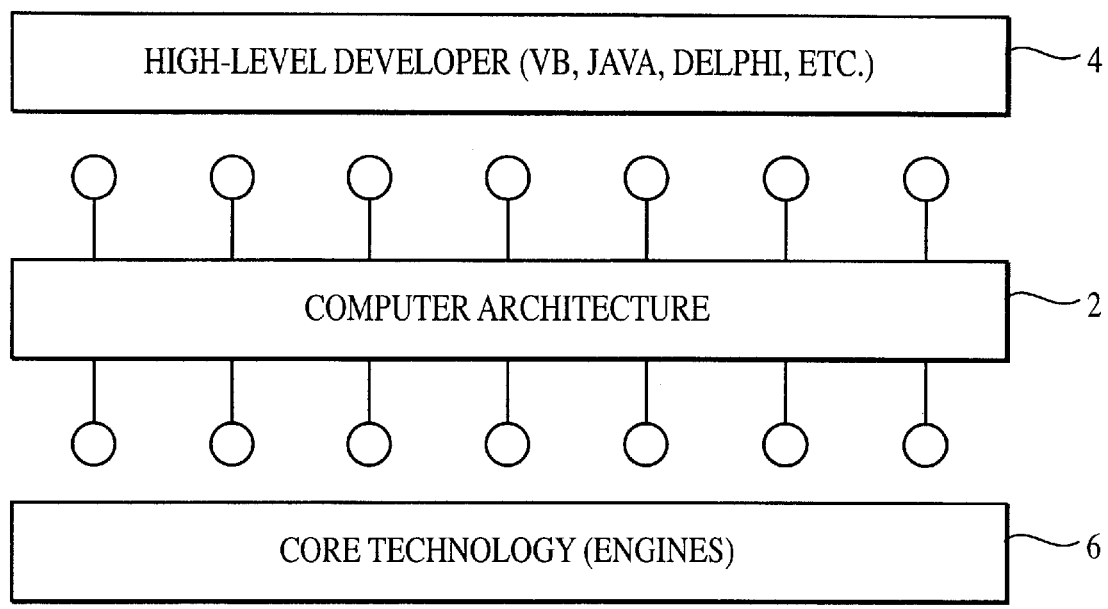
FIG. 1 is an illustration of the placement and/or use of the computer architecture and/or method of the present invention.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Of course, one or more of the above operations may alternatively be done manually. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

BEST MODE FOR CARRYING OUT THE INVENTION

Reference now will be made in detail to the presently preferred embodiments of the invention. Such embodiments are provided by way of explanation of the invention, which is not intended to be limited thereto.

In fact, those of ordinary skill in the art may appreciate upon reading the present specification and viewing the present drawings that various modifications and variations can be made. For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The purpose of the Virtual Copier ("VC") aspect of the present invention is to enable a typical PC user to add electronic paper processing to their existing business process. VC is an extension of the concept we understand as copying. In its simplest form it extends the notion of copying from a process that involves paper going through a conventional copier device, to a process that involves paper being scanned from a device at one location and copied to a device at another location. In its more sophisticated form, VC can copy paper from a device at one location directly into a business application residing on a network or on the Internet, or visa versa. The VC invention is software that manages paper so that it can be electronically and seamlessly copied in and out of devices and business applications (such as Microsoft Office, Microsoft Exchange, Lotus Notes) with an optional single-step Go operation. The VC software can reside on a PC, LAN/WAN server, digital device (such as a digital copier), or on a web server to be accessed over the Internet.

Virtual Copier is designed to solve the corporate paper problem by enabling existing web-based and client-server applications to manage paper as part of their solution. Virtual Copier links the familiar and universal world of paper and digital devices to web-based and client-server applications. The result is that the automated business processes become the primary storage of paper in electronic form. Information that is typically managed and processed in paper form is "copied" into the system and managed by the business processes with which users are accustomed, which is made possible by using Virtual Copier. Simple extensions of Virtual Copier support seamless electronic outsourcing of paper processing and archival services over the web.

Virtual Copier is a unique combination of an intuitive application built on an open component architecture that delivers a simple innovation: provide paper processing to existing Intranet and client-server business processes without any fuss. Whether it is an office clerk that needs to easily copy a report from a desktop scanner to the company's Intranet-networked copier, or an accounting software integrator that wants to embed paper processing, Virtual Copier offers a simple solution. To the office clerk Virtual Copier is a document imaging application packaged in the familiar setting of an office copier. To the integrator, the underlying open architecture of Virtual Copier offers a simple integration path for embedding paper processing into its client-server or web-based software solution.

Although managing paper manually is one of the great problems facing corporations, there has been little innovation in enabling those workers to eliminate the need to continuously work with paper manually. Much of the problem stems from the complexity of traditional document management systems, which require days of training and months to become familiar with the system in order to be proficient. Virtual Copier was designed to be as simple as a copier to operate, and yet still provide the complete capability of integrating paper with existing business applications. By simplifying the interface and underlying software infrastructure, VC can manage paper in electronic form as easily as is currently done in physical form.

VC extends the notion of a copier, which simply replicates the image of an original document onto another piece of paper using a single GO or START button, to do a similar operation in software so that the image gets seamlessly replicated into other devices or applications or the Internet.

An example of this is the actual implementation of Virtual Copier as a consumer product. The interface of the consumer product called Virtual Copier has a Go button much like a physical copier. This GO button can copy paper, whether physical or electronic, from one device and or application to another device and/or application.

What makes Virtual Copier as simple as its physical counterpart in at least one embodiment is the fact that it replicates the identical motions that a user who is making a copy using a physical photocopier goes through. When a user photocopies a document, he/she selects where they want to copy from (i.e. the sheet feeder), where the user wants to copy to (i.e. 6 copies collated and stapled) and then presses a GO button to actually carry out the photocopy process. With Virtual Copier the process feels familiar because the sequence is the same with just the Power VC portion of the main Virtual Copier window.

The power of Virtual Copier is the fact that the From can be a physical device (e.g. digital copier, fax or scanner) or an application (e.g. Lotus Notes, Microsoft Exchange, the Internet, or an electronic filing system). The To can also be a physical device (e.g. a fax, digital copier, or printer) or an application (e.g. Lotus Notes, Microsoft Exchange, the Internet, or an electronic filing system). Even though paper is being copied electronically from devices to applications, from applications to devices, from devices to devices, or from applications to applications, the user simply has one sequence to execute: select From, select To, and then press GO. Virtual Copier will accomplish all translations between device and applications automatically and seamlessly.

Another reason that paper is still a major corporate issue is that traditional document management systems require that a company invest in a whole new system just to store electronic images. Although this is the only way that document management systems have been designed and delivered, it is in fact highly inefficient. Most companies already manage information about physical documents in some form of software applications.

For example, accounting systems have long been used to maintain information about invoices and bills that arrive into a company from outside sources as physical pieces of paper. When an invoice arrives, its information is keyed into the accounting software, where balances are maintained and accounts payable information is coordinated. Yet the original invoice is stored manually, and every time that a request is made for a copy of the signed invoice, someone manually retrieves the invoice from a physical filing cabinet. Accounting systems, like most business applications, typically have no way of maintaining an electronic copy of the physical invoice, and adding a document management system to an accounting system is cumbersome, costly, and difficult to maintain, and even more difficult to coordinate.

Virtual Copier solves this problem in at least one embodiment by copying paper directly into the existing accounting system. Simply adding a To item in the Virtual Copier window enables a user to copy paper directly into the appropriate accounting record of the existing accounting system. This requires no retraining (users who are trained on the accounting system will still use the accounting system in the same way), requires no document management system (the electronic copy of the document is actually being maintained by the accounting system itself), there is no coordination between two systems (Virtual Copier embeds the invoice with the appropriate accounting record), and it is simple (one Go button).

What is true with regard to the example above of an accounting system is true of most other business applications. The power of Virtual Copier is that it can turn an information system into a document management system by adding support for electronic paper directly into the existing business application, whether it is a client, server-based, or web-based system.

Virtual Copier enables corporations to perform sophisticated document imaging with their existing Web-based and client-server applications through a user interface that is as familiar as the office copier. Virtual Copier can be used out-of-the-box as a standalone application to copy, scan, fax, or print images using existing digital devices within corporate environments or across the web. With the extensions, as described below, Virtual Copier can be integrated into Web-based and client server applications, such as ERP or accounting systems, to eliminate paper from existing business processes and legacy applications. Virtual Copier can also be used to support seamless access to document image processing and archival over the web since, in at least one embodiment, the VC interface is implemented as a software application.

VC is architected as an application that delivers end-user functionality while remaining open to third-parties extensions. For example, VC can be viewed as a copier. Like a copier, VC takes paper in, and produces paper going out. The only difference is that VC does not distinguish between electronic and physical paper.

To accommodate third-party extensions, VC is divided into five essential modules. Each module is a counterpart to an aspect that is found on a conventional copier. Based on the modular design of VC, each aspect of VC can be independently extended, offering much greater flexibility than conventional copiers.

The five core modules of VC illustrated in are:

Input Module—The Input Module manages paper or electronic paper entering VC. This module manages imaging devices to input paper through scanners, MFPs, or the new breed of digital copiers. The Input Module also manages reading electronic paper from third-party or proprietary applications. The counterpart to VC's Input Module on a conventional copier is the scanner subsystem.

Output Module—The Output Module manages paper or electronic paper exiting VC. Like the Input Module, this module manages imaging devices to output paper to standard Windows printers, specialty image printers, MFPs, or the new breed of digital copiers. The Output Module also manages writing electronic paper to third-party or proprietary applications. The counterpart to VC's Output Module on a conventional copier is the printer or fax subsystem.

Process Module—The Process Module applies processing to the electronic paper as it is being copied. Examples of a process are OCR and ICR. The Process Module can also apply non-imaging functionality as well, such as workflow or other relevant tie-ins to the electronic paper as it is being copied. One of the advantages of VC over conventional copiers is that multiple processes can be applied to a single virtual copy. The counterpart to VC's Process Module on a conventional copier is the controller.

Client Module—The Client Module presents the electronic paper as it is being copied, and any relevant information related to the input or output functions. For example, if the Output Module is directed to a printer, then the Client Module might present the finishing capabilities; if the Output Module is directed to Goldmine, then the Client Module might present the target contact record to which the document is being copied. The counterpart to VC's Client Module on a conventional copier is the panel.

Server Module—Unlike conventional copiers, VC's Server Module is a unique subsystem that can communicate with the other modules as well as third-party applications. The Server Module is what makes VC a far more powerful concept than simply an application that can control a scanner and a printer to mimic a copier. The Server Module can be used to combine third-party applications with the new breed of digital imaging devices to create unique and custom virtual copier solutions. A virtual copier can be created with VC by combining a scanner with a printer; or by combining a scanner with an application; or by combing an application with an image printer. In each case VC is dynamically creating a custom virtual copier, with a complete understanding of how paper flows from the source to its destination. There is no counterpart to VC's Server Module on a conventional copier.

One of the primary design goals of VC is to make it simple to integrate VC with third-party applications. There are two options to integrating VC into a third-party application: running VC as an external service, or embedding VC as an underlying service.

VC is in one embodiment and optionally a standalone application that enables a user to scan (copy) paper from a device to a third-party application, and to print (copy) the reference of an image document from a third-party application to a printing device. VC does not require the third-party application to be aware that VC is operating. Rather, VC recognizes that the third-party application is running, and it intelligently copies paper to and from that application.

In this scenario the user is interacting with VC's Client Module in order to execute a copy operation to and from the third-party application. There does not have to be any changes made to the third-party application, not even to its interface, in order for VC to operate. The user of VC only knows that to copy to and from the third-party application, a custom Input and Output Module must be selected, and the Go button is pressed.

In order to support copying to and from a third-party application, VC must be able to support extensions that understand each third-party application. This is accomplished through the Input and Output Modules. The Client, Server, and even Process Modules remain independent across third-party applications. However, in order to support outputting to a third-party application, an Output Module is developed that is unique to that third-party application. Likewise, an Input Module is developed that is unique to a third-party application in order to support reading images from that application.

It is the optional Input and Output Modules that render VC extendable. For each third-party application there is a unique pair of Input and Output Modules that understand the third-party application, and how to copy images to and from that application. Each Input and Output Module registers itself to the Windows registry so that the Server Module knows how to find them. In this way Virtual Copier can grow indefinitely, to support any number of third-party applications.

The significant point is that the Input and Output Modules have their own interface, and can be developed independently from any other module. As long as the Input and Output Modules conform to the API specified in this document it will plug-and-play with VC. VC will be able to mix and match the custom Input and Output Module with its standard and other custom Input and Output Modules.

A third-party application can also use the services of VC without its user interface. That is, a third-party application can embed VC's functionality and provide its own interface to its functionality. For example, rather than have VC as a separate application, a special button can be placed on a third-party application that launches VC in the background.

VC is designed so that the Server Module can run independently from the Client Module. All the core functionality, including communicating with the Input, Output, and Process Modules, are performed directly by the Server Module. The Client Module is generally simply an interface to the Server Module. Therefore, all the services of the Server Module can be made available in the background to a third-party application without the need for an interface. The third-party application can in fact become the user's interface to VC.

In order to support VC operating in the background a third-party application merely has to communicate with the Server Module directly, as described later in this document. The Server Module, as all modules in VC, support COM-based interfaces for simple and direct support from all major Windows development environments.

The purpose of the computer architecture and process described herein is to create a component factory that can automatically generate reusable software components from sophisticated core software technologies. Many, if not most, core software technologies, such as OCR (Optical Character Recognition) or barcode recognition, are designed and implemented using a "C"-language API (Application Program Interface). The technology is often complex, requiring months of trial-and-error to correctly develop application systems using the technology. While there are millions of Intranet developers and power-PC users who are capable of assembling component-based systems, I have determined that there are relatively few "C" programmers (estimated at less than 100,000) who can learn and implement application software with these complex _C'-level API's. It is therefore desirable to develop software tools for automatically generating reusable software components from core software technologies thus making these software technologies available to a much larger user base.

Since I have determined that there is no structure or format for implementing "C"-level API's, the ability to automatically transform a unique API into a standard component would seem impossible since that would take a nearly-human level of intelligence. To date, the only way, I am aware, to create a component out of an existing API is to have an existing programmer in the field do the work for each API. Humans can intelligently analyze an API and create a component based on intelligent decisions tempered by experience. The challenge of creating a component factory is the challenge of partially or substantially recreating the component design and formulating effective implementation decisions.

One would expect the translating a "C"-level API from its native state into a component would require human-level intelligence. This is mainly because "C"-level APIs have virtually no constraints as to how they can be implemented. This means that there are an infinity variations of APIS, which can only be managed by human-level intelligence. While this point is true, I have determined that the appropriate solution starts at the other side of the equation, which is the component itself.

My solution starts out with a definition of a component that can sustain the feature/function requirements of any API. In other words, the interface of a generic component can be defined such that the features and functions of virtually any API can be re-implemented within its bounds. The two known end-points are the "C"-level API that started with, and the component interface that represents any set of features/functions on the other side.

I have also determined that one solution for creating a computer architecture and process for implementing a component factory is to create a well-defined multi-tiered systems architecture for a component and to automate, substantially automate, or manually expedite from its native state through the various tiers of the systems architecture resulting in a standardized or substantially standardized component. Advantageously, this solution is not based on making human-level intelligent decisions on how to translate a _C'-level API into a component. Rather, by starting with a well-defined systems architecture that is multi-tiered, a series of incremental steps that migrates a C-level API from one tier within the systems architecture to the next may be performed, and which are facilitated using the architecture and/or process described herein.

Advantageously, each incremental step is not a major one, but in sequence the entire series of steps will result in a usable component. Since each step of migration is not a major one, the chances of automating these steps is significantly higher and the likelihood of being able to create the component factory becomes more feasible.

The fundamental building blocks of the computer architecture and process are twofold:

1) To define a systems architecture that describes in detail how to implement a component from a C-level API
2) To create a component factory by automating, substantially automating, or manually expediting the migration of a C-level API from one tier within the architecture to the next.

The building blocks are the keys or important to actually making the component factory feasible.

Significantly, the computer architecture and processes described herein have application to the Intranet and document market marketplace. Corporations are embracing internet computing technologies to create enterprise-level Intranets and Extranets. Using standard browser technologies, corporations and government entities are rapidly adopting the internet computing model and are developing enterprise applications by assembling standard Microsoft specified Active X components. These are not "C" programmers; rather they are typical power PC users. Further availability of reusable components would only fuel this development.

The general outline for creating a component factory is described below in detail. It is important to note that automatically, substantially automatically, or manually building a component is neither obvious nor guaranteed. As will be described below in detail, automating or substantially automating the building of a component consists of automating individual steps that comprise the component architecture. However, in today's application environment, any amount of automation will dramatically increase the efficiencies of building a component The computer architecture is designed for managing a diverse set of independent core technologies ("engines") using a single consistent framework. The architecture balances two seemingly opposing requirements: the need to provide a single consistent interface to many different engines with the ability to access the unique features of each engine.

The benefit of the architecture is that it enables a company to rapidly "wrap" a sophisticated technology so that other high-level developers can easily learn and implement the core technology. The computer architecture is therefore a middleware or enabling technology, as illustrated in FIG. 1.

As illustrated in FIG. 1, computer architecture 2, described below in detail, is a middle layer between high level developer programs 4 (such as C-level APIs, or other programs having similar characteristics) and are technology/component engines 6 (such as OCR, bar code recognition, and other components having similar characteristics).

Another benefit of the architecture is that it provides a high-level specification for a consistent interface to any core technology. Once a high-level developer learns the interface described herein for one engine, that knowledge is easily transferable to other engines that are implemented using the architecture. For example, once a high-level developer learns to use the computer architecture for OCR (Optical Character Recognition), using the computer architecture for other engines, such as barcode recognition or forms processing, is trivial.

In summary, the architecture and process described herein is at once a framework for rapidly wrapping sophisticated technologies into high-level components, as well as a framework for high-level developers to communicate with a diverse set of engines. The creating of a component factory is based on the fact that the architecture defines a clear path for "wrapping" any C-level API into a component using simple structures and many rote steps. This process is currently being done in an inefficient manner by a programmer in the field.

The method described herein for creating a component factory creates a well-defined multi-tiered architecture for a component and automates, substantially automates, or manually expedites (hereinafter "automates") the process of migrating a "C"-API from its native state through the various tiers of the architecture resulting in a standardized component.

Advantageously, the method described herein does not base the component factory on making human-level intelligent decisions on how to translate a "C"-level API into a component. Rather, by creating a well-defined architecture described below that is multi-tiered, the method is a series of incremental steps that need to be taken to migrate the "C"-level API from one tier within the architecture to the next. In this way each incremental step is not a major one, but in sequence the entire series of steps will result in a component.

Since each step of migration is not a major one, the chances for automating these steps is significantly higher and the likelihood of being able to create the component factory becomes feasible. This approach is in fact what makes the method cost-effective, since the alternative approach, i.e., computer-generated human-level decision making, is currently unavailable and would require much effort, if at all possible, to replace humans in any realistic decision-making process.

With a fixed architecture that can be used to implement a "C"-level API as a component (using a programmer), that same architecture can be used as the basis for the component factory model. In order to make the component factory, each step of the architecture needs to be designed to facilitate automation or manually expedited. In other words, I have determined that automating/expediting the process of taking the original "IC"-level API and migrating it to a Level 1 layer, and then a Level 1 to a Level 2, and then a Level 2 to a Level 3 layer, and so on, the component has been implemented automatically, or more efficiently manually. The component factory is therefore a sum of the ability to automate migrating the "C"-level API from one layer to the next within a well-defined architecture for implementing components.

Figure 2:
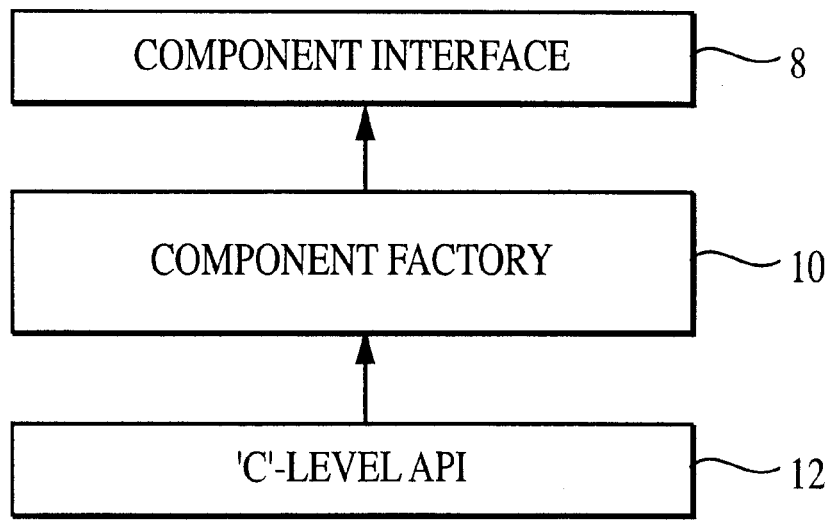
FIG. 2 is an illustration of the component factory migrating the original "C"-level API from its original state into the generic interface defined by the topmost layer.

As illustrated in FIG. 2, the component factory 10 migrates the original "C"-level API 12 from its original state into the generic interface 8 defined by the topmost layer. The first feature that can be demonstrated is that there is a topmost layer 8 that can define a component interface that can represent the features/functions of most core technologies. The component factory 10 migrates the "C"-level API 12 to the topmost level 8. Doing this in one large step would be impossible since the "C"-level API has a near-infinite variety of styles. However, the architecture advantageously has enough well-defined and well-structured layers for implementing the topmost component interface, for creating the component factory.

Figure 3:
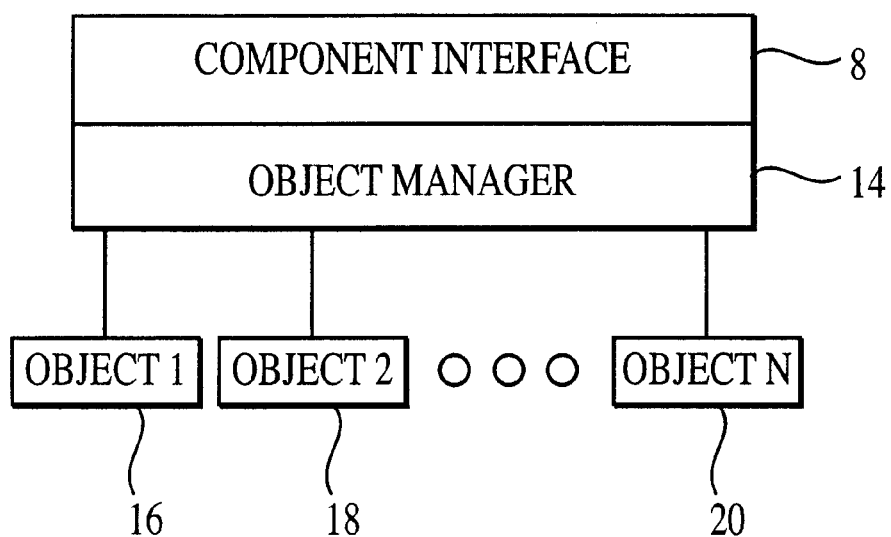
FIG. 3 is an overview of the computer architecture in the present invention.
Figure 4:
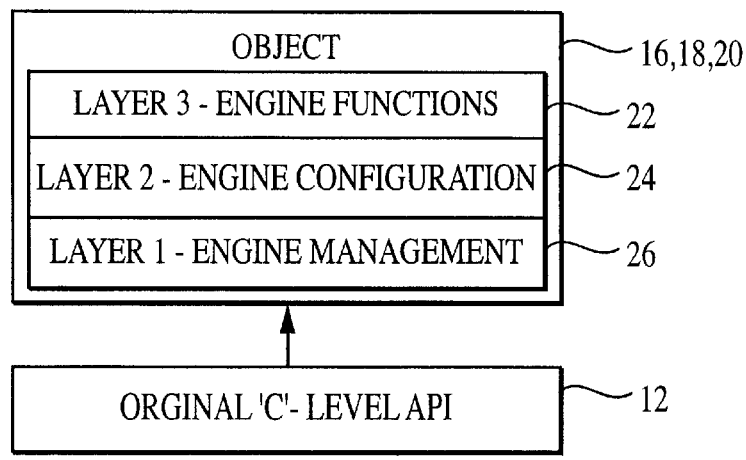
FIG. 4 is an illustration of the design of an Object in accordance with the computer architecture of the present invention.

A simplified overview of the architecture is illustrated in FIG. 3. In FIG. 3, the component interface 8 sits on top of an Object Manager 14 that communicates with individual objects e.g., 16, 18, 20. These objects 16, 18, 20 represent specific core technologies that are represented as "C"-level APIs. The design of Object1, Object2, . . . ObjectN is illustrated in FIG. 4.

A component factory can be created by automating the process of migrating the original "C"-level API 12 from its original state to the Layer 1—Engine Management tier 26, and then from the state to Layer 2 Engine configuration tier 24, and so on up the Engine Functions layer 22. These layers will be further described below.

The computer architecture is implemented, for example, as a standard COM component, as an ActiveX control; the specifications designed by Microsoft, published in the technical literature, and incorporated herein by reference. ActiveX control (COM) support is currently available within any Microsoft 32-bit Windows operating environment. ActiveX controls are supported by all OLE-based applications, including all of Microsoft's end-user products (e.g., Microsoft Office, Word, Access, Powerpoint, Access), the main Internet Browsers (Microsoft's Internet Explorer and Netscape's Navigator—the latter with an add-in product and by 4Q97 directly), most other name-brand end-user Windows products (e.g., Lotus Notes), and all major development environments (e.g., Microsoft Visual Basic and Visual C++, Delphi, Borland C++, Power Builder). By implementing the architecture as, for example, an ActiveX control, complex technologies can be programmed by virtually any Windows or Intranet user or developer. Of course, other component specifications may also be used.

Although the architecture has been implemented as a COM-based technology with C++ as the language of choice, the architecture can be implemented in many other languages (e.g. Java) and distributed architectures (e.g. CORBA).

Every engine, such as a text retrieval or an OCR (Optical Character Recognition) engine, has a unique interface. This interface is generally a "C"-level API (Application Program Interface). In most cases, the learning curve for understanding and integrating a new engine can be a one man-month to several man-years and generally requires highly experienced "C" programmers. The purpose of the architecture is to define a clear infrastructure within which any core can be rapidly "wrapped" so that users and developers can have easy access to these core technologies.

In addition to defining the infrastructure for engines to be accessible to typical users, the architecture also defines how to migrate an engine from its native state to the prescribed interface. In other words, the architecture goes beyond simply defining the framework for wrapping engines, it also defines the specific steps for wrapping these engines.

The architecture consists of a hierarchical series of layers that take any "C"-level API from its unique state to one that is standard and consistent. The result is a single, highly-integrated object component that contains and manages any type of engine that can be programmed regardless of the nature and subject of the core technology. The architecture therefore not only defines the goal (e.g., the object component interface) but also the means of implementing that goal for any type of engine.

Figure 5:
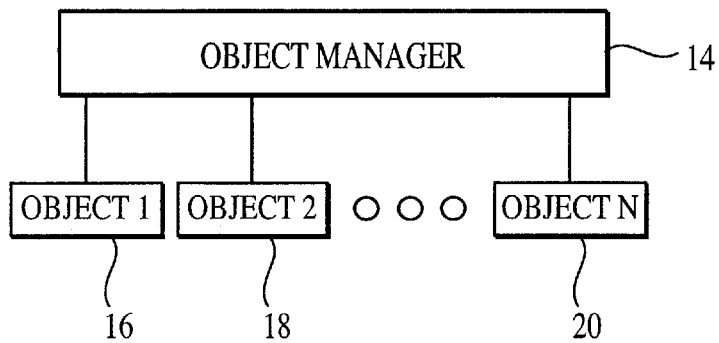
FIG. 5 is an illustration of the architecture comprised of two major parts.

The architecture is comprised of two major parts as illustrated in FIG. 5: the Object Manager 14, and the individual object components 16, 18, 20. The Object Manager 14 in FIG. 5 manages individual object components 16, 18, 20 illustrated as Object 1, Object 2, etc. The Object Manager 14 communicates with the individual object components 16, 18, 20 using a consistent COM interface.

Each object component implements the feature set of an individual engine by mapping a consistent COM interface to the "C"-Level API interface of the individual engine that it supports. In this way the Object Manager can consistently communicate with each engine, using the engine's object component. Because the COM interface of each object component is consistent, the Object Manager can interface with every underlying engine the same way.

The features of the architecture include:

1) definition of consistent COM interfaces for individual object components that represent diverse technologies;

2) a prescribed process for migrating any engine to the defined consistent COM interface; and/or 3) a predefined Object Manager that automatically manages the individual object components.

When implemented, for example, as an ActiveX control, the architecture also yields an umbrella control that can be used by a high-level programmer to program and manage numerous sophisticated technologies in a plug-and-play environment. In order to facilitate the discussion of the architecture itself it is best to start with the architecture of the engine object component and then describe the Object Manager. Since the Object Manager is directly dependent on the engine object components, an understanding of the latter will assist in the description of the former.

Engine Object Component—16, 18, 20

The purpose of the engine object is to wrap a specific engine using a series of layers that convert the engine's unique interface into a COM interface that is, for example, specified by the architecture. The architecture not only defines the consistent COM interface for implementing an engine, it also describes how to implement the interface from the original "C"-Level API. Once the COM interface of the engine object component is implemented, the Object Manager understands and can therefore communicate with it.

Figure 6:
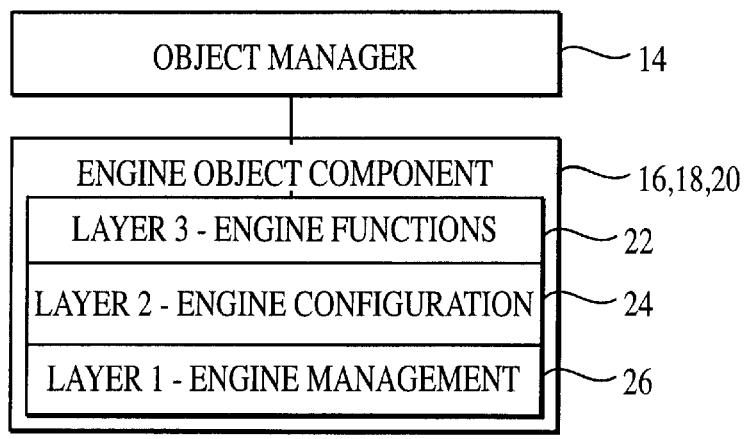
FIG. 6 is an illustration of the architecture of an engine component including, for example, three layers designed to migrate the original API of the engine to a consistent COM interface.

Each engine component consists of, for example, three layers that are designed to migrate the original API of the engine to a consistent COM interface. As illustrated in FIG. 6, the Object Manager 14 communicates with the topmost layer 22 of the object component 16, 18, 20 which is the defined interface of object component.

Each layer is described below in two parts. The first part is the prescribed COM interface for communicating with the engine object component. The second part describes a specific path for automating building the layer. By providing an outline for automating building each layer, the overall engine object component can be automatically, substantially automatically or manually expedited and generated.

Layer 1—Engine Management 26

The first layer in the object component architecture is designed to deal with the fundamental features of an engine. This includes the ability to load and unload the standard or commercially available via, for example, MicroSoft Corporation, engine Dynamic Link Libraries (DLLs) into memory, as well as the ability to consistently deal with errors. This is the most fundamental layer because it is the essential "wrapper" layer of an engine. Once this layer is complete all interaction with the underlying engine is filtered through this layer. Additional important engine management functions include dynamically accessing a function call of an engine, and initializing engine settings. All of these engine management functions are optionally and beneficially table driven to promote or facilitate access to, and implementation of, engine management functions.

The Layer 1 specification is summarized in FIG. 7 that describes the IEngineManagement COM interface. The purpose of the IEngineManagement interface is to transparently load and unload an engine to and from memory. I have determined that this is often the core feature that is incorrectly implemented and a cause for hard-to-find bugs. This layer may be generated manually by a developer who is familiar with the architecture as outlined herein in an expedited manner or automatically as described below in detail.

Layer 1 can be precisely defined in generic terms, and is therefore the simplest layer to likely be automatically, substantially automatically, or easily manually generated. A sample or example of actual code that can be used to implement this layer is described below. As long the process and/or code for implementing Layer 1 can be generically defined, that is engine and technology independent, then the process of generating the generic code for each new engine is expedited either manually or automatically.

The premise for automating any level is to start with as few pieces of information as possible. For the Engine Management layer I have assumed that nothing more than the set of DLLs that implement the engine functionality are known. Given this information, I have determined that I will need to implement:

Loading and unloading the engine from memory

Adding error management We can start, in this example, with a model C++ header file that defines the Engine Management layer and investigate how this code can be implemented generically.

As mentioned earlier, if the code to implement this layer can be defined generically then it can be easily generated, for example, manually, and/or automatically for any engine.

```
class SomeEngineObject
{
    //Wrapper Functions
private:
    FARPROC_SomeFunction;
    BOOL SomeFunction○;
    //EngineManagement
protected:
    BOOL GetProcAddress (HINSTANCE, FARPROC&, LPCTSTR);
    BOOL GetProcAddresses○;
    BOOL ProcessError○;
```

```
public:
    BOOL ActivateEngine (BOOL Activate);
    BOOL IsEngineActivated○;
};
```

The IEngineManagement interface is implemented in the C++ class as the public methods: ActivateEngine○ and IsEngineActivated○.

The first step of implementing the Engine Management layer 20 is to wrap each original engine function within a class-defined function that represents the original. For example, if there is an original function called SomeFunction○, then the engine object should have a corresponding SomeFunction○ method. The engine object version can then add standard engine and error management code so that any layers above have automatic error detection, correction, and reporting.

An example of generic code that maps an original function call to the original function is as follows:

```
BOOL GetProcAddress (HINSTANCE hLib, FARPROC&Proc,
LPCTSTR ProcName)
{
    Proc= :: GetProcAddress (hLib, ProcName)
    if (!Proc)
    {
        SetIMAGmEError (LOADENGINEFUNCTIONSERROR,
ProcName);
        return FALSE;
    }
    return TRUE;
```

Given the original function name, the GetProcAddress can map the original function to one that is defined by the engine object. Using the engine object C++ header file described above, the SomeFunction○ method is mapped to the original engine function using the following line of code:

(GetProcAddress (hLib, SomeFunction, "SomeFunction");

To map all the function calls within the original engine DLLs just requires cycling through each function call and mapping it to the engine object counterpart. Since Windows contains facilities that enables access to all the functions within a DLL, a simple loop may be used. The hLib module is derived from the DLL name, which, as mentioned at the start, is the one piece of information we are given.

What is more complex is to define a generic implementation of the engine object version of the original function. This may be described in code as follows:

```
BOOL SomeFunction (arguments)
ASSERT (arguments)
ErrorVariable=_SomeFunction (arguments);
returnProcessError○;
}
```

The engine object version of the original function passes the function call to the original one after completing a series of assertion tests, and is followed by a series of error detection tests. In this way the original engine function is "wrapped" by the engine object to manage error detection and correction.

The process of loading an engine can likewise be implemented generically.

```
BOOLLoadDLLs()
{
    BOOLbReturn=TRUE;
    HINSTANCEt_hLib;
    CStringt_ModuleName;
    POSITIONpos;
    pos=m_Modules.GetStartPosition();
    if (pos=NULL)
    {
        SetIMAGinEError (NOMODULESDEFINED);
        return FALSE;
    }
    while (pos&&bReturn)
    {
        m_Modules.GetNextAssoc (pos, t_ModuleName, t_hLib);
        if (t_hLib!=NULL)
            continue;
        t_hLib=::LoadLibrary(t_ModuleName);
        if (t_hLib=NULL)
        {
            SetIMGAinEError (CANTLOADMODULE,
            t_ModuleName);
            FreeDLLs();
            bReturn=FALSE;
            break;
        }
        m_Modules.SetAt (t_ModuleName, t_hLib);
    }
    returnbReturn;
}
```

The LoadDLLs function is a generic implementation of a function that loops through the names of DLLs that are provided (in the form of the mModules variable), and cycles through each one loading it into memory using the Windows LoadLibrary() function. A similar engine object function can be implemented to remove these DLLs from memory.

Figure 8:
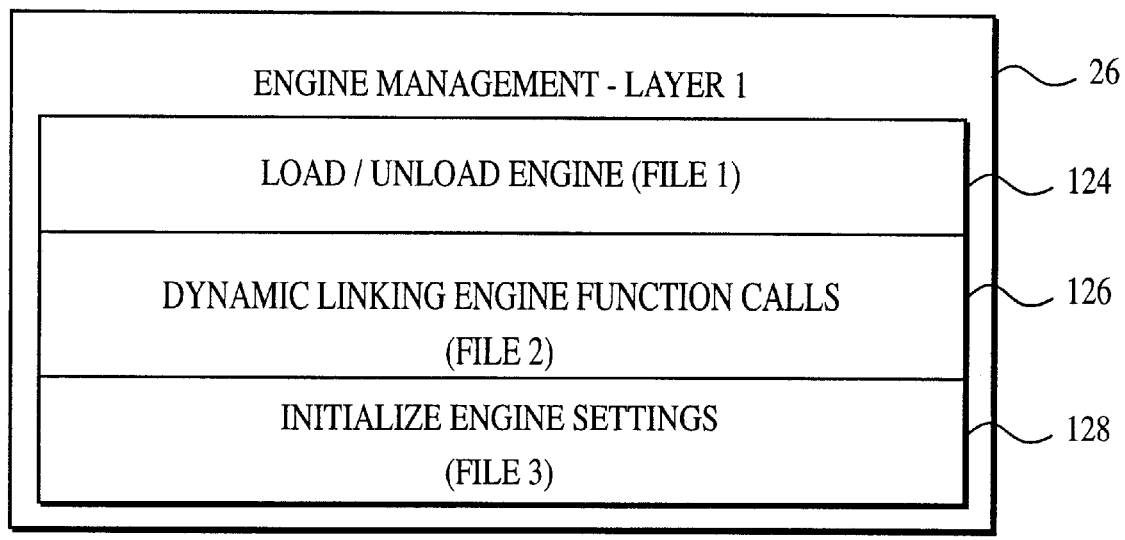
FIG. 8 is an illustration of the engine management layer being divided into three functions/specifications.

The present invention further divides the engine management layer into three functions, as illustrated in FIG. 8. The first function is loading and unloading 124 of the core or engine technology. The second function for the engine management layer 26 is dynamically linking procedures or function calls, or hooking the desired engine functionality into the procedures of the core technology 126, including, for example, initializing and setting up engine settings. The third function is initializing the engine itself 128, which is essentially engine management. Once these three functions are performed in level 1, anything in the core technology is accessible.

Advantageously, the present invention utilizes tables to drive each of these three functions described above, and as illustrated in FIG. 9. Each of the tables of files, for example tables 130, 136, 140, are filled in with the appropriate data or information. I have discovered that if the above three functions are set up or implemented using tables, that the core technology may be effectively and efficiently described. That is, the use of tables is a very effective and simple method of describing an engine for use in engine management, engine loading/unloading and engine procedure linking. For example, it is similar to indicating or providing the raw data of that engine, the list of the engine functions, and the list of the engine dynamic link libraries (DLLs) for engine management.

The files or tables contain the logic or executable of the engine. Accordingly, all that is needed is a list of the engine functions 132, a list of the file of the engine executable code or DLLs 138, and a list of the engine settings 142. Using the tables with the above information, the engine may be automatically loaded and unloaded, initialized, and/or dynamically hooked into the necessary functions. Accordingly, the process of generating level 1 for engine management may advantageously be automated. The specific algorithms used for the engine management layer are described in the Appendix.

In summary, for the Engine Management layer the following pieces may be automated, substantially automated, and/or manually expedited.

Loading and unloading the engine DLLs (provided into and out of memory

Mapping original functions to engine object counterparts

Adding general error detection and correction

Determining and matching arguments and return values for mapping the original functions to their engine object counterparts. In order to add assertion and error detection and correction, the original function must be wrapped and called from within the engine object version of the original function.

Managing error feedback. All APIs have their own way of providing error feedback. Since one of the goals of the Engine Management layer is to generically manage error detection, correction, and feedback, it must handle all errors identically. However, APIs have numerous and incompatible methods in this case. I have determined that most APIs follow one of several distinct mechanisms for providing error feedback.

By creating specific classes of APIs, the process of generating Layer 1 engine management may be expedited, manually and/or automatically.

Layer 2—Engine Configuration 24

The second layer 24 in the object component architecture is designed to deal with configuring an engine. This includes the ability to set any variety of features that are generally associated with the functioning of an engine. The architecture is designed to meet the challenge of providing a uniform interface for dealing with generally any or most engine settings.

The engine configuration layer 24 includes a series of prefabricated functions that map out the settings stored in the table to the appropriate engine configuration parameters. Accordingly, all that is needed is to fill in the values for the table associated with engine configuration. Thus, the engine object may advantageously come pre-packaged with predetermined tables populated with predetermined values.

The Layer 2 specification can be summarized in FIG. 10 that describes an exemplary IEngineConfiguration COM interface. The purpose of the IEngineConfiguration interface is to provide the ability to set and get the settings of any engine uniformly. While the Engine Management layer can load and unload engines transparently, this layer configures engines to operate as required by the user or developer.

Figure 11:
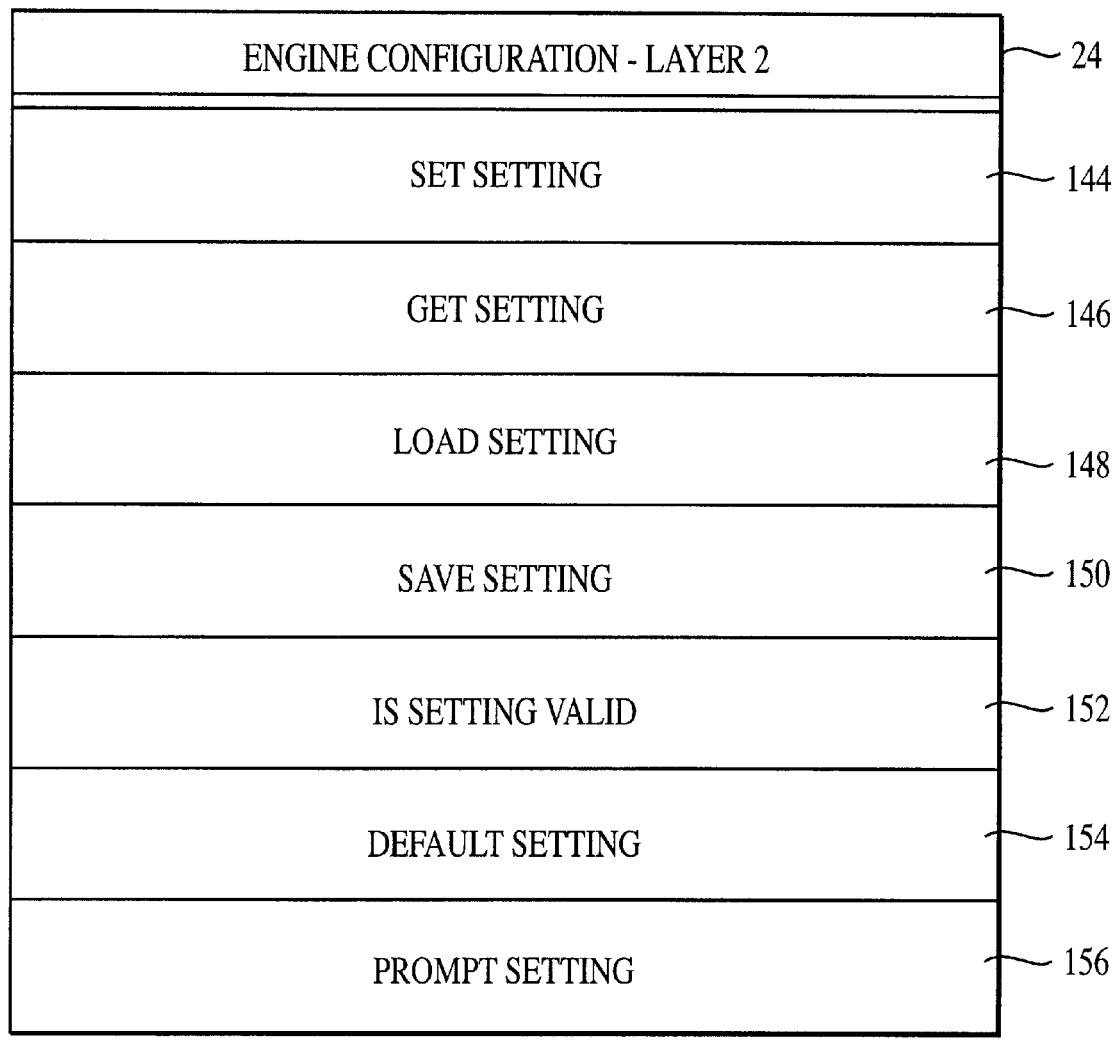
FIG. 11 is another exemplary table illustrating the engine configuration specification.

FIG. 11 is another exemplary table illustrating the engine configuration specification. Examples include a set setting function 144, a get setting function 146, a load setting 148, a save setting 150, an is setting valid function 152, a default setting 154, and a prompt setting 156.

The get setting 146 and set setting 144 functions retrieve the value of a particular engine setting, or assign a value to a particular engine setting, respectively. Each one of the get setting and set setting functions includes or comprises a table of the settings. The load setting 148 and save setting 150 functions do the similar function as the get setting and set setting functions, but in persistence. Persistence is defined as writing values to the disk, for example hard disk, compact disk, and the like, and retrieves the values from the disk. So as where the get setting and set setting functions assign a value and/or retrieves the value from local memory, the load and set setting functions assign the value and retrieve the value of the setting from disk.

The load and set setting functions provide persistence when the computer system is close down, such that when the computer system will return to the last setting when it is subsequently reopened.

The default setting function 154 provides the most favorable value for a given setting. Thus, if no setting is selected, the system will automatically select default settings. The prompt setting function 156 is what displays to the user all the various settings.

Advantageously, the present invention generates the skeletal structure of each table automatically. In addition, since there is a table of settings, the skeletal structure not only generates these functions, but also fills in the settings that need to be assigned. Thus, the engine configuration function provides the feature of having a pre-populated set of options which require particular values to be assigned to table entries.

Although this architecture advantageously makes it simple for a human to migrate the configuration of an engine appear into two simple and universally applicable interface points, doing so automatically requires additional steps. The two steps to automating this approach are, for example, as follows:

Determine the configuration methods used by various APIs for configuring the core technology;

Detect the variations for configuring an engine and automating each one separately.

As with Layer 1—Engine Management, there exists a finite set of general variations used by developers of core technologies to configure an engine. Although Layer 1 is clearly more generic in nature, advantageously, Layer 2 also has considerable consistency.

Layer 3—Engine Functionality 22

The third layer 22 in the object component architecture is designed to deal with accessing the actual functionality of the core engine. For example, for an OCR engine this would be to OCR an image or a document. For a text retrieval engine this would be to initiate and retrieve results of a text search.

An exemplary Layer 3 specification can be summarized in FIG. 12 that describes the IEngineFunction COM interface. The purpose of the IEngineFunction interface is to provide the ability to initiate any function supported by an engine. The simple IEngineFunction interface is capable of managing an infinite variation of functions.

The third layer may advantageously be further divided into many sub-layers that more discretely define the steps necessary to execute a function within an API. Since the designer of an API has infinite variety of possible ways of implementing a function, creating a tiered architecture to manage this layer is useful.

Figure 13:
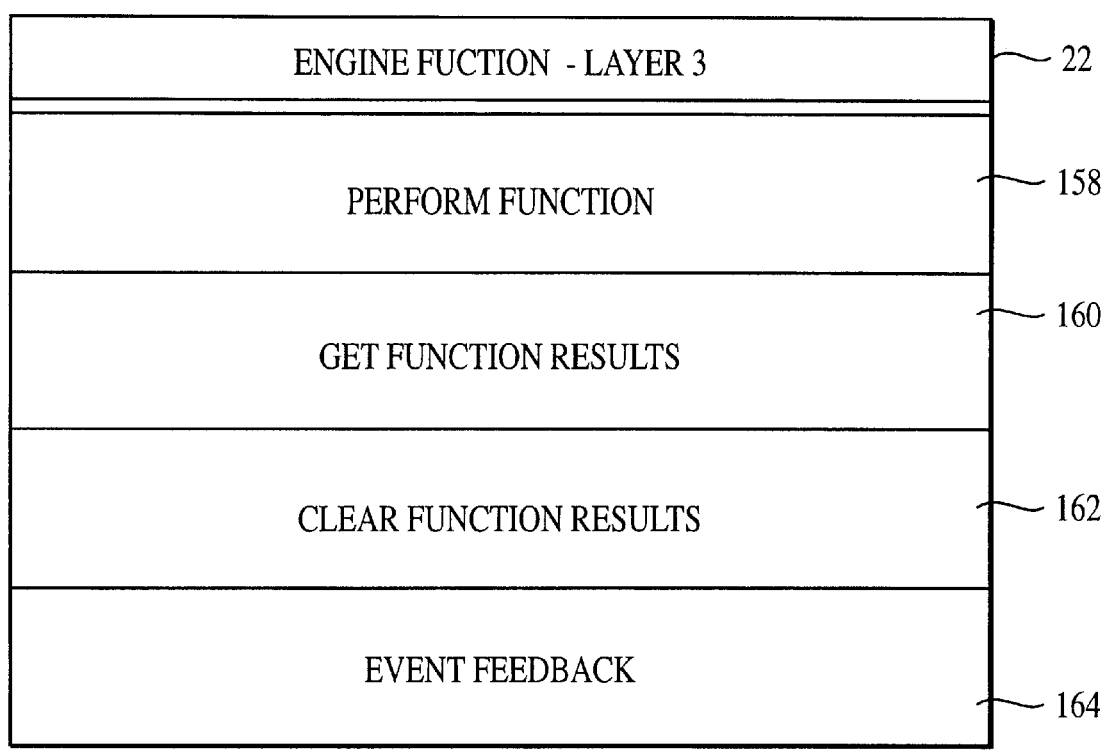
FIG. 13 is another exemplary table illustrating the engine functionality specification.

An exemplary tiered architecture for the engine function is illustrated in FIG. 13. As illustrated in FIG. 13, the engine function or engine processing layer includes four elements. The engine function layer 22 includes a series of predefined functions to perform in the perform element 158. For example, for optical character recognition (OCR), the present invention uses a set of predefined functions.

Alternatively, for scanning, the present invention includes a separate set of predefined functions.

Accordingly, there are a series of actions that are performed by the engine function layer on a given engine, such as an OCR engine, a scanning engine, a printing engine and the like. The engine function layer is designed not to generally go directly to a specific engine. Rather, the engine function layer 22 will generally interface with the engine management layer 26 and/or the engine configuration layer 24 as needed.

For example, in the course of performing an action and/or function, the engine function layer interfaces with the engine configuration layer to possibly modify settings. For an OCR engine, the engine function layer fills out a table of OCR documents as one action that could take place. OCR image is another action.

The get function results 160 gets the results of the function stored in a register. The clear function 162 clears all the registers that contain all the results, in this case its memory. The feedback event or function 164 provides continuous feedback, depending on what action takes place. For example, if an OCR action is being performed, the feedback function provides the percentage of completion of the OCR process.

The automation of this layer is accomplished by the following functions:

Determine the execution of methods used by various APIs for executing a given function;

Divide this layer into a multi-tiered layer that further facilitates automation;

Detect the variations of the sub-layers and automate each one separately.

Although this layer has many more variations than Layer 2, I have determined that there is a general set of variations used by developers of APIs to implement core functionality.

Thus, the benefit of the component factory is that it can transform core software technologies that are currently available in "C"-level APIs to a limited audience into components that have a much greater audience.

There are a variety of "C"-level APIs that cover the following categories of functionality that can be better served in the market as ActiveX controls or other component and used in conjunction with the architecture and methods described herein.

Text Retrieval

Data Extraction

Workflow

Storage Management

Each of these categories has several vendors with products that currently service the market in a limited way because the technologies are only available as "C"-level APIs. Without the core competency of creating components out of these core technologies they are limiting their marketability and opportunity for international distribution.

With the proposed component factory users and vendors can rapidly create components from their original core technology and increase their marketability, competitiveness, and ultimately their sales.

Further, there are numerous core technologies, such as text-retrieval and ICR (Intelligent Character Recognition), that have already been implemented, and are only available as "C"-level APIs. Many, if not most, core technologies are first released exclusively as "C"-level APIs. While there are integrators and corporations who have the team of technologists who can integrate these "C"-level APIs in-house, most companies are looking for component versions that can be implemented at a much higher level. Therefore, many of the core technologies that are only available in a "C"-level API are not being used due to their inaccessible interface. The benefit of the component factory is that it can rapidly make available core technologies implemented as "IC" APIs that would otherwise be underutilized or dormant in research labs by converting them to high-level components that can be used by millions of power-PC users.

With the advent of the World Wide Web (WEB) this opportunity has increased exponentially. The WEB is now home to a vast number of WEB authors with minimal formal training who can implement HTML pages and build web sites. One of the fundamental technologies for extending the capability of the WEB from simple page viewing to interactive and sophisticated applications is components. A component extends the capability of HTML by enabling a WEB author to add core technology as a pre-packaged technology. Since components are fundamental to the growth and usability of the WEB, having a component factor that can translate "C"-level toolkits into components that are then usable within WEB sites opens a vast and new worldwide market to these technologies.

Figure 14:
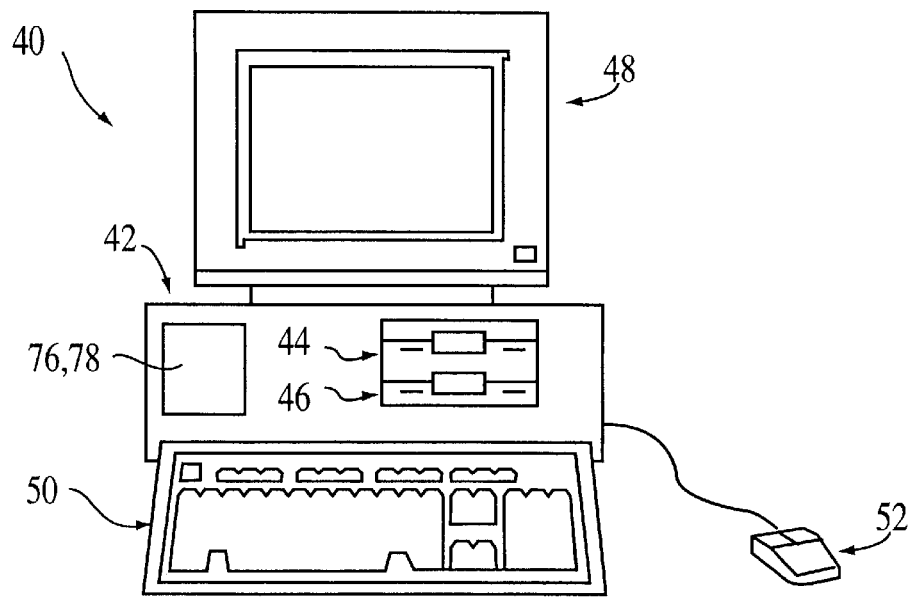
FIG. 14 is an illustration of a main central processing unit for implementing the computer processing in accordance with a computer implemented embodiment of the present invention.

FIG. 14 is an illustration of a main central processing unit for implementing the computer processing in accordance with a computer implemented embodiment of the present invention. The procedures described above may be presented in terms of program procedures executed on, for example, a computer or network of computers.

Viewed externally in FIG. 14, a computer system designated by reference numeral 40 has a central processing unit 42 having disk drives 44 and 46. Disk drive indications 44 and 46 are merely symbolic of a number of disk drives which might be accommodated by the computer system. Typically these would include a floppy disk drive such as 44, a hard disk drive (not shown externally) and a CD ROM indicated by slot 46. The number and type of drives varies, typically with different computer configurations. Disk drives 44 and 46 are in fact optional, and for space considerations, may easily be omitted from the computer system used in conjunction with the production process/apparatus described herein.

The computer also has an optional display 48 upon which information is displayed. In some situations, a keyboard 50 and a mouse 52 may be provided as input devices to interface with the central processing unit 42. Then again, for enhanced portability, the keyboard 50 may be either a limited function keyboard or omitted in its entirety. In addition, mouse 52 may be a touch pad control device, or a track ball device, or even omitted in its entirety as well. In addition, the computer system also optionally includes at least one infrared transmitter 76 and/or infrared receiver 78 for either transmitting and/or receiving infrared signals, as described below.

Figure 15:
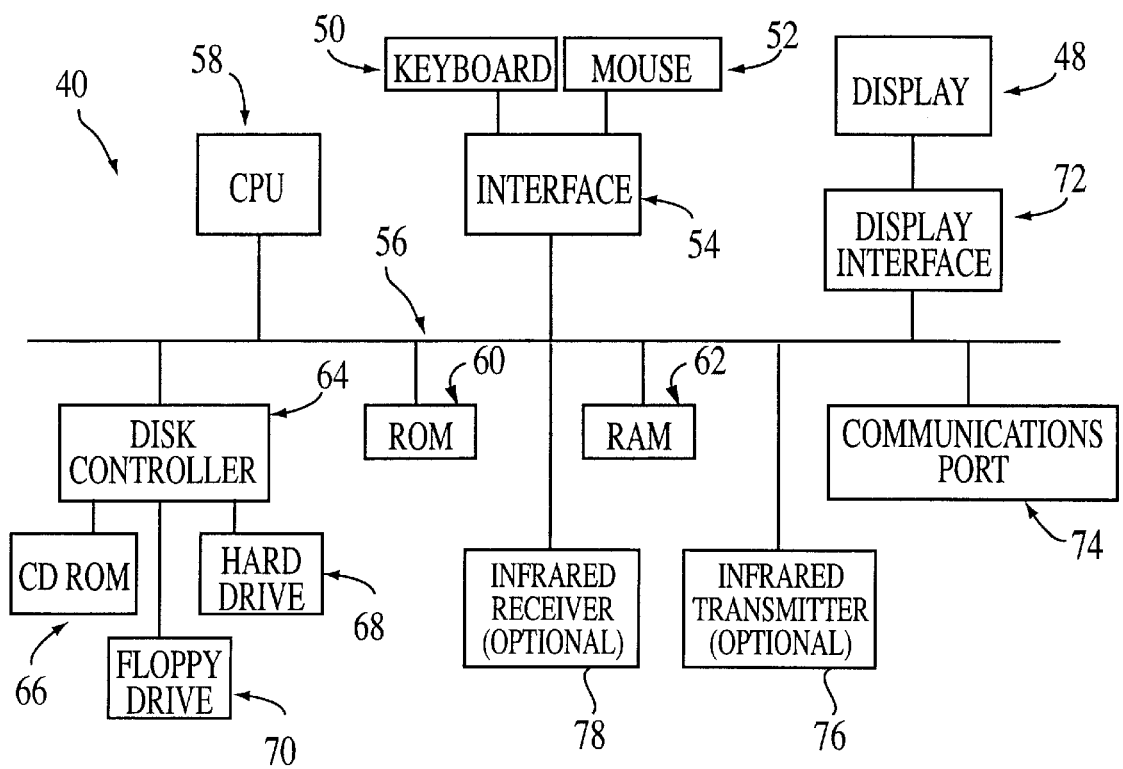
FIG. 15 illustrates a block diagram of the internal hardware of the computer of FIG. 14.

FIG. 15 illustrates a block diagram of the internal hardware of the computer of FIG. 14. A bus 56 serves as the main information highway interconnecting the other components of the computer. CPU 58 is the central processing unit of the system, performing calculations and logic operations required to execute a program. Read only memory (ROM) 60 and random access memory (RAM) 62 constitute the main memory of the computer. Disk controller 64 interfaces one or more disk drives to the system bus 56. These disk drives may be floppy disk drives such as 70, or CD ROM or DVD (digital video disks) drive such as 66, or internal or external hard drives 68. As indicated previously, these various disk drives and disk controllers are optional devices.

A display interface 72 interfaces display 48 and permits information from the bus 56 to be displayed on the display 48. Again as indicated, display 48 is also an optional accessory. For example, display 48 could be substituted or omitted. Communication with external devices, for example, the components of the apparatus described herein, occurs utilizing communication port 74. For example, optical fibers and/or electrical cables and/or conductors and/or optical communication (e.g., infrared, and the like) and/or wireless communication (e.g., radio frequency (RF), and the like) can be used as the transport medium between the external devices and communication port 74.

In addition to the standard components of the computer, the computer also optionally includes at least one of infrared transmitter 76 or infrared receiver 78. Infrared transmitter 76 is utilized when the computer system is used in conjunction with one or more of the processing components/stations that transmits/receives data via infrared signal transmission.

Figure 16:
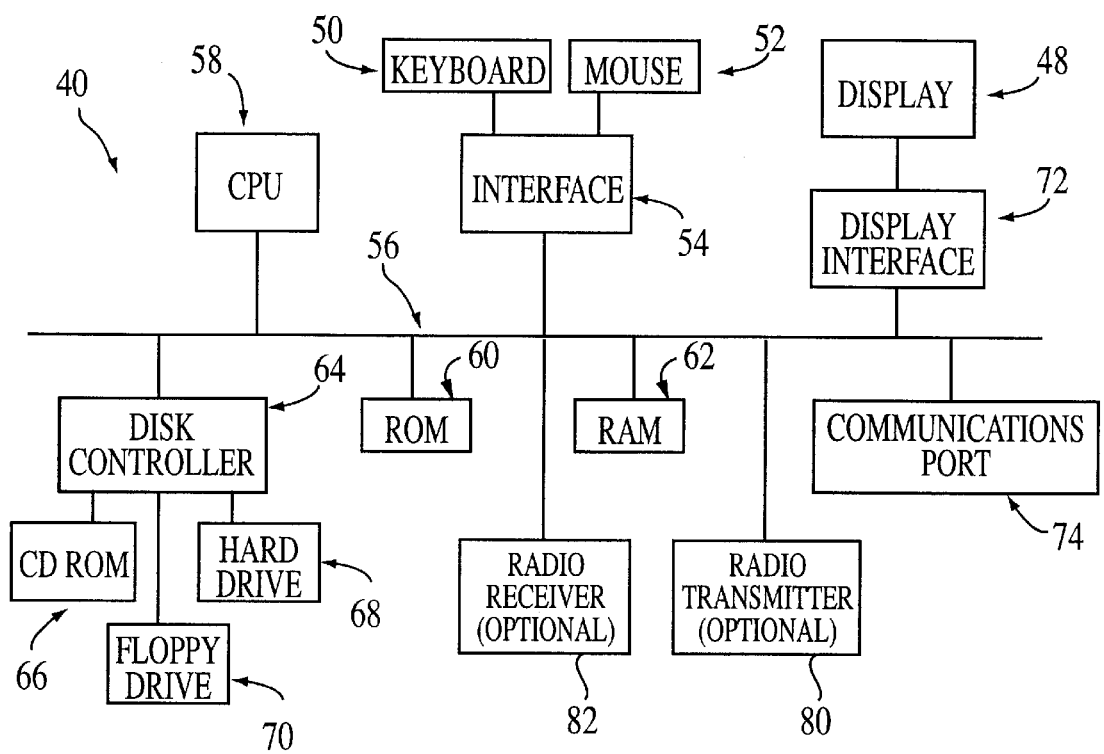
FIG. 16 is a block diagram of the internal hardware of the computer of FIG. 15 in accordance with a second embodiment.

FIG. 16 is a block diagram of the internal hardware of the computer of FIG. 14 in accordance with a second embodiment. In FIG. 16, instead of utilizing an infrared transmitter or infrared receiver, the computer system uses at least one of a low power radio transmitter 80 and/or a low power radio receiver 82. The low power radio transmitter 80 transmits the signal for reception by components of the production process, and receives signals from the components via the low power radio receiver 82. The low power radio transmitter and/or receiver 80, 82 are standard devices in industry.

Figure 17:
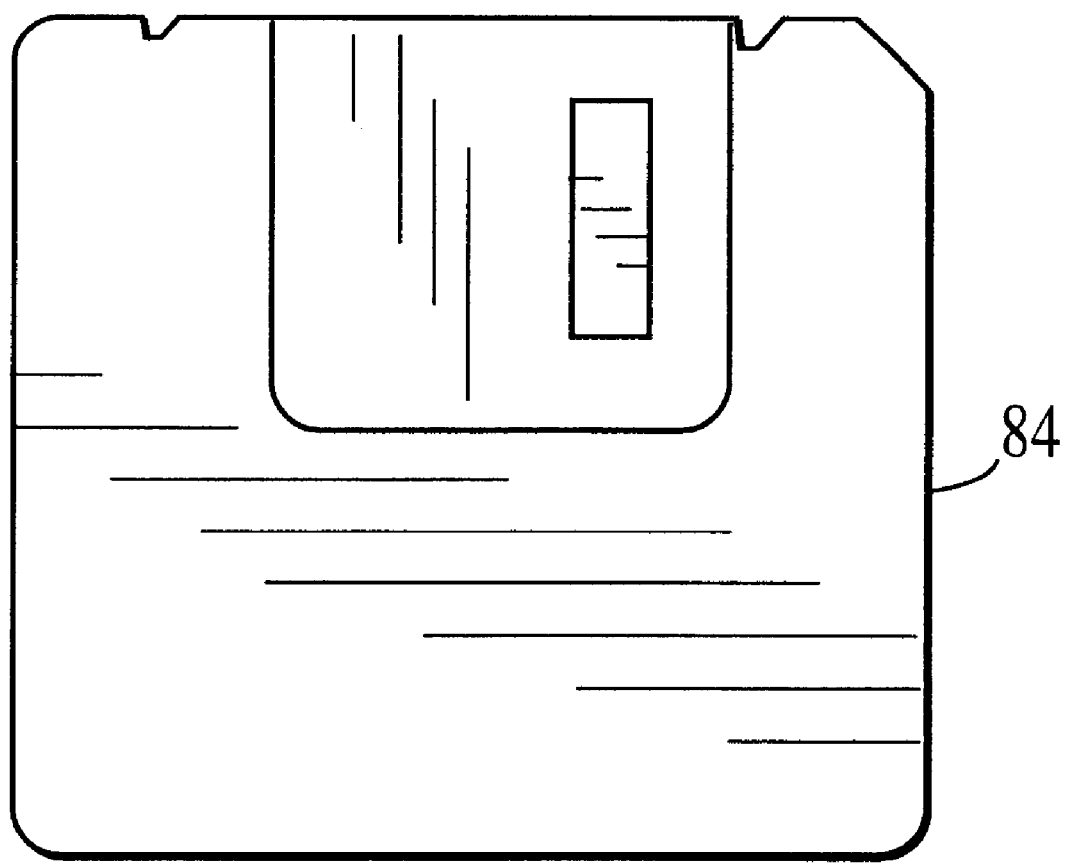
FIG. 17 is an illustration of an exemplary memory medium which can be used with disk drives illustrated in FIGS. 14–16.

FIG. 17 is an illustration of an exemplary memory medium which can be used with disk drives illustrated in FIGS. 14–16. Typically, memory media such as floppy disks, or a CD ROM, or a digital video disk will contain, for example, a multi-byte locale for a single byte language and the program information for controlling the computer to enable the computer to perform the functions described herein. Alternatively, ROM 60 and/or RAM 62 illustrated in FIGS. 15–16 can also be used to store the program information that is used to instruct the central processing unit 58 to perform the operations associated with the production process.

Although processing system 40 is illustrated having a single processor, a single hard disk drive and a single local memory, processing system 40 may suitably be equipped with any multitude or combination of processors or storage devices. Processing system 40 may, in point of fact, be replaced by, or combined with, any suitable processing system operative in accordance with the principles of the present invention, including sophisticated calculators, and hand-held, laptop/notebook, mini, mainframe and super computers, as well as processing system network combinations of the same.

Conventional processing system architecture is more fully discussed in *Computer Organization and Architecture*, by William Stallings, MacMillam Publishing Co. (3rd ed. 1993); conventional processing system network design is more fully discussed in *Data Network Design*, by Darren L. Spohn, McGraw-Hill, Inc. (1993), and conventional data communications is more fully discussed in *Data Communications Principles*, by R. D. Gitlin, J. F. Hayes and S. B. Weinstain, Plenum Press (1992) and in *The Irwin Handbook of Telecommunications*, by James Harry Green, Irwin Professional Publishing (2nd ed. 1992). Each of the foregoing publications is incorporated herein by reference. Alternatively, the hardware configuration may be arranged according to the multiple instruction multiple data (MIMD) multiprocessor format for additional computing efficiency.

The details of this form of computer architecture are disclosed in greater detail in, for example, U.S. Pat. No. 5,163,131; Boxer, A., Where Buses Cannot Go, IEEE Spectrum, February 1995, pp. 41–45; and Barroso, L. A. et al., RPM: A Rapid Prototyping Engine for Multiprocessor Systems, IEEE Computer February 1995, pp. 26–34, all of which are incorporated herein by reference.

In alternate preferred embodiments, the above-identified processor, and in particular microprocessing circuit 58, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

Figure 18:
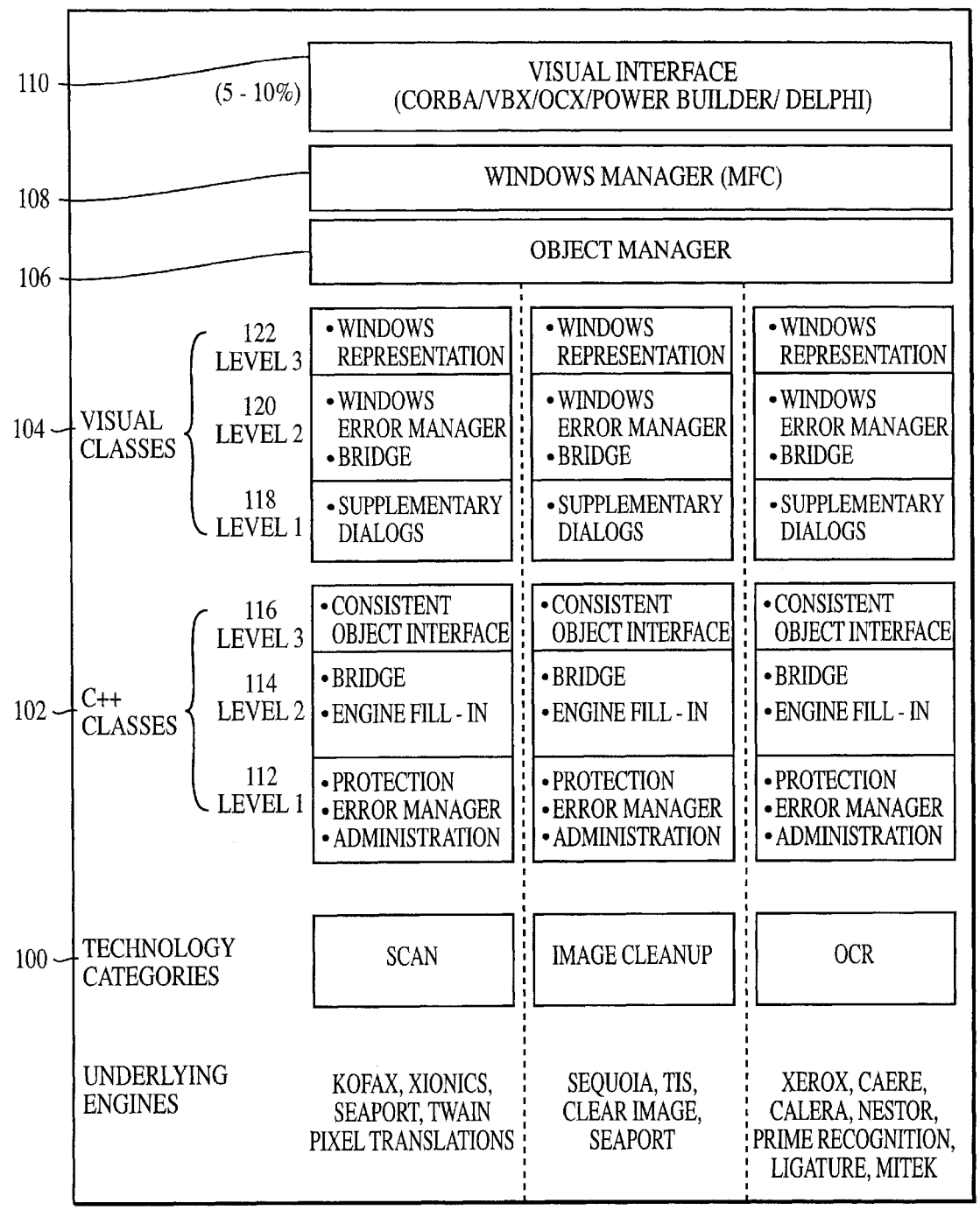
FIG. 18 is an illustration of another embodiment of the component factory migrating the original "C"-level API from its original state into the generic interface defined by the topmost layer.

FIG. 18 is an illustration of another embodiment of the component factory migrating the original "C"-level API from its original state into the generic interface defined by the topmost layer. This powerful architecture goal is to supply easy access to all imaging functions that can be performed by any engine.

The architecture according to this second embodiment, groups C-level toolkits 100 into logical categories, such as scan, print, display, OCR, cleanup and so on. A single engine can span multiple categories (e.g., Kofax engine does view/print/scan). This enables the architecture to deal with the multitude of engines available in a logical fashion.

On top of these, a three-level C++ class (or object) 102 is built for each engine. This object gives uniform access to the engine and to all its unique settings. The three levels do the following:

Level 1 of the C++ classes 112 is a protective wrapper for each function call in the underlying engine. It traps all errors and provides error management and administration to prevent accidental GPFs or engine crashes.

Think of it as the "condom layer." While providing the most direct access feasible to the underlying engine and all its capabilities, level 1 of the C++ class 112 also protects the user from the engine. It manages all engine loading and unloading, prevents multiple copies of an engine and calls engines automatically as needed.

The architecture also provides three levels of access: 1. Use the default engine settings. Benefit: No learning up front. Program knowing nothing other than "OCR gets text out of there."2. Prepackage customized engine settings. Set it once for everyone who uses the program, every time they use the program. 3. Modify engine settings at run-time. Let the user choose the settings.

Level 2 of the C++ classes 114 bridges the low-level API calls so they can be used by level 3 116 in standardized calls for each category. And it supplements the engine by providing additional functionality, such as safely loading and unloading engines.

Level 3 of the C++ class 116 consists of a standardized set of calls for all engines in each category. Programmers can access all the unique functions of each engine in a uniform way.

Another associated C++ class, called a Visual Class 104, adds a visual interpretation of each engine. This class manages all user interaction with each underlying engine. Like their lower-level counterparts, the Visual Class consists of three layers:

Level 1—118 adds any dialogs or other pop-up window capability that may be lacking in each engine. Examples: Dialogs to customize the engine settings or, for a recognition engine, the zone definition settings.

Level 2—120 serves two functions: It bridges level 1 dialogs with the actual Windows window that represents the control. It also handles all Windows-related error message presentation.

Level 3—122 manages anything else from the underlying engine (such as annotations) that needs to appear on the window. The Visual Class includes engine-specific Windows dialog boxes that let you customize which engine features you want to use, as well as any other Windows representation necessary for a toolkit. (For example, a compression engine has to display the image—the visual class, not the engine, does the work.)

The Object Manager layer 106, the first horizontal umbrella, orchestrates the underlying objects. It translates service requests into a form that the engine objects can understand.

The Windows Manager 108 presents Windows messages (move window, mouse/scrollbar/toolbox activity) to the Object Manager. It is written using Microsoft's Foundation Class (MFC), which makes it easy to support OCXs. (The OCX is in fact an MFC class.)

At the top, a visual interface 110 presents to the user a set of visual calls and translates those calls into Windows messages. This layer comprises only 5% of the VBX code, yet it permits the toolkit to appear as a VBX, OCX or other standard visual interface.

Accordingly, the present invention provides two main layers, the engine object component layer and the object manager layer. By creating these two main layers, the present invention allows third parties to create their own engine object component layers so that the third party engine can be readily compatible and useable by the present invention. In addition, the present invention is accessible via the Internet. That is, the present invention is operable over the Internet using, for example, standard Internet protocols, such as component object module (COM) communication protocol and distributed COM (DCOM) protocol.

In addition, the present invention optionally combines three layers of functions including the visual interface, the windows manager and the object manager into one layer called the object manager. Of course, this combination of layers is not meant to convey that only these specific layers must be used, but rather, to be indicative of overall functionality generally required to implement or execute component engines. That is, one or more of the above functions may be incorporated into the object manager layer. The present invention also advantageously combines the visual classes and C++ classes into the engine object component to further standardize and/or provide access to the object manager for engine object components.

The present invention optionally uses the standard ActiveX component control supplied, for example, by MicroSoft Corporation. ActiveX is a protocol for component communication. The present invention also creates each of the object manager and the engine component layer as a separate ActiveX. That is, the object manager is its own ActiveX control, and the engine object is its own ActiveX control. Thus, the engine object can now run independently from the object manager. Accordingly, the engine object can operate without relying necessarily on the concurrent operation of the object manager.

The independent relationship between the engine object and the object manager means also that the engine object represents a discrete means of technology. For example, an engine object can be an OCR technology. This provides several benefits. First, because the object manager layer is open, the manufacturer of the OCR technology can wrap their own engine in the form of an engine object component, and the engine will automatically "plug into" or work with, the object manager. Thus, the engine object is provided high level access, making it accessible to many more parties, users, and the like. When the object manager interface is designed to be open, any third party, such as an engine manufacturer, can create their own engine object component that is compatible with the object manager, the manufacturer can do it.

Figure 19:
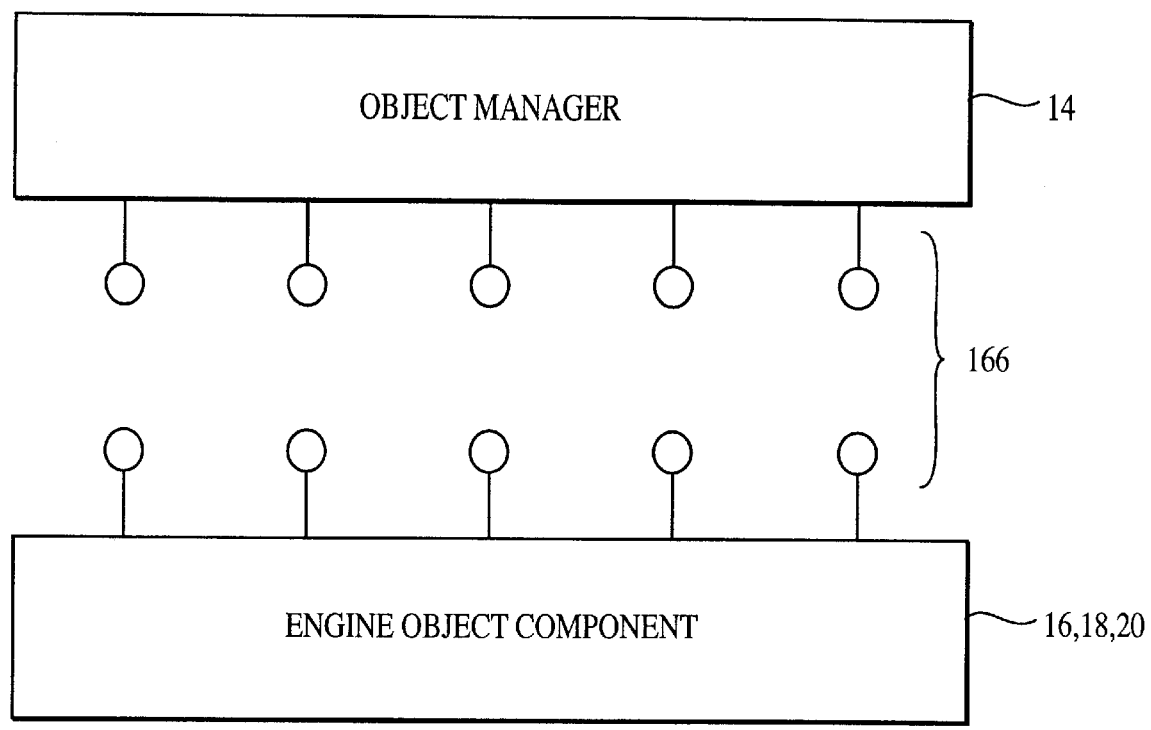
FIG. 19 is an illustration of a distributed environment or architecture for manually and/or automatically generating and/or using reusable software components for client server and/or intranet operating environments.

FIG. 19 is an illustration of a distributed environment or architecture for manually and/or automatically generating and/or using reusable software components for client server and/or intranet operating environments. A very significant point that is relevant to why the object manager and the engine object component are independent in the present invention relates to providing a distributed environment for using the present invention. Rather than communicate within the same technology between the object manager and the engine object, the object manager and the engine object component communicate with each other in binary mode, via, for example, standard distributed component object module (DCOM) communication. As illustrated in FIG. 19, object manager 14 communicates with engine object component 16, 18, 20 via DCOM specification 166. Other types of component communication may also be utilized that provide the capability of a distributed component interaction.

Thus, the engine object component and the object manager can leverage current protocols to not only communicate on the same machine, but also on different machines such as a client server and/or intranet and/or Internet environment. The object manager can be placed on one machine, and the engine object component on another machine and have distributed processing, what is otherwise called thin client processing, distributed processing, wide area intranet processing.

What this allows the present invention to do is to put the object manager on the thin client, who would accept the request from the user, for example, to OCR something or to print something. The actual request is handled or processed by the engine object component which generally resides on the server. The engine object component contains the horse power, or the processing power to process the request.

The engine object layer is generally located in the same or substantially same location as where the core technology or engine itself is being stored. Alternatively, the engine object layer and the engine may be optionally located in a distributed environment on different machines, servers, and the like.

Figure 20:
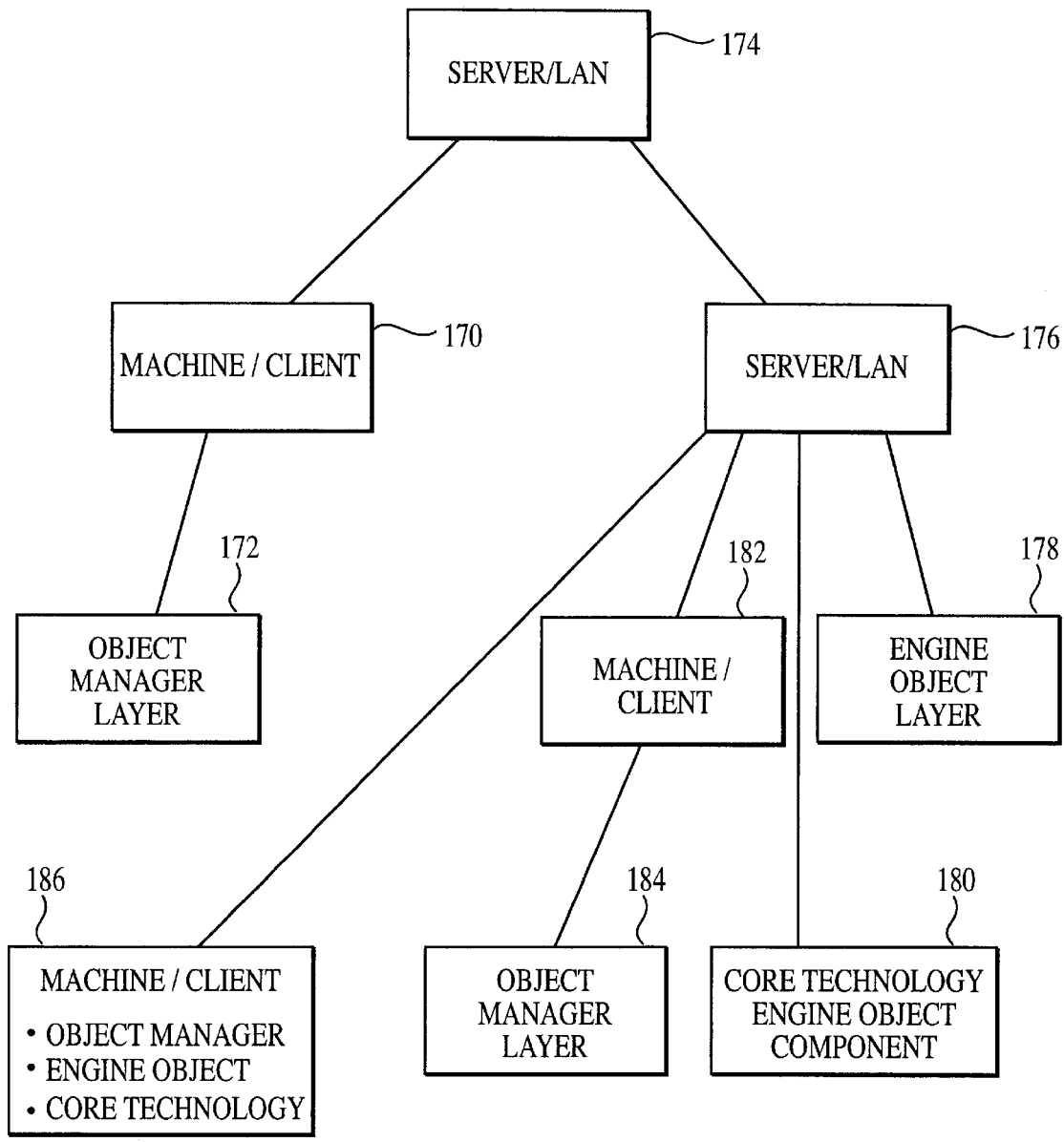
FIG. 20 is a detailed illustration of the distributed environment or architecture for manually and/or automatically generating and/or using reusable software components for client server and/or intranet operating environments.

FIG. 20 is a detailed illustration of the distributed environment or architecture for manually and/or automatically generating and/or using reusable software components for client server and/or intranet operating environments. In FIG. 20, client 170 includes object manager layer 172. Client 170 executes the core technology 180, via accessing engine object layer 178 managed/stored on server 176, and communicated via server 174.

Client 182, located on the same server 176 as core technology 180 and engine object layer 178, may also be used to execute the core technology 180 via object manager layer 184. In this instance, the client 182 with the object manager layer 184 is located on the same server 176 as the engine object layer 178. In addition, since the present invention utilizes a communication protocol between components, for example, DCOM, that allows a client to also include both the engine object component layer and the object manager layer on the same machine 186, as well as the core technology.

Further, since the object manager is formatted or constructed of a client technology, the object manager can sit in a standard browser. This means that anyone that has an Internet browser, i.e., anyone that has access to the world wide web (WEB) can actually access the core engine technology. Thus, by structuring the architecture of the present invention as described herein, users automatically become Internet, intranet and/or WEB enabled.

The present invention also transforms the core technology from essentially client based technology into a client server and/or a thin client technology. This makes the core technology high level accessible, thereby transforming any core technology into client server, or hidden client technology. The browser is located on the client, and the browser leverages the object manager. Accordingly, the browser optionally contains the object manager, and the object manager makes requests over, for example, the Internet, local network, and the like via a server, to the engine object. The server would be either a web server or a LAN server.

The present invention also advantageously provides the ability to have the client and the server, in a distributed environment as discussed above, or on the same machine locally. The present invention utilizes the DCOM communication protocol defining the communication protocol between the object manager and the engine object component. Accordingly, since DCOM can work on the same machine as well as in a distributed environment, DCOM does not necessitate that the engine object or the object manager component be on two separate machines.

Figure 21:
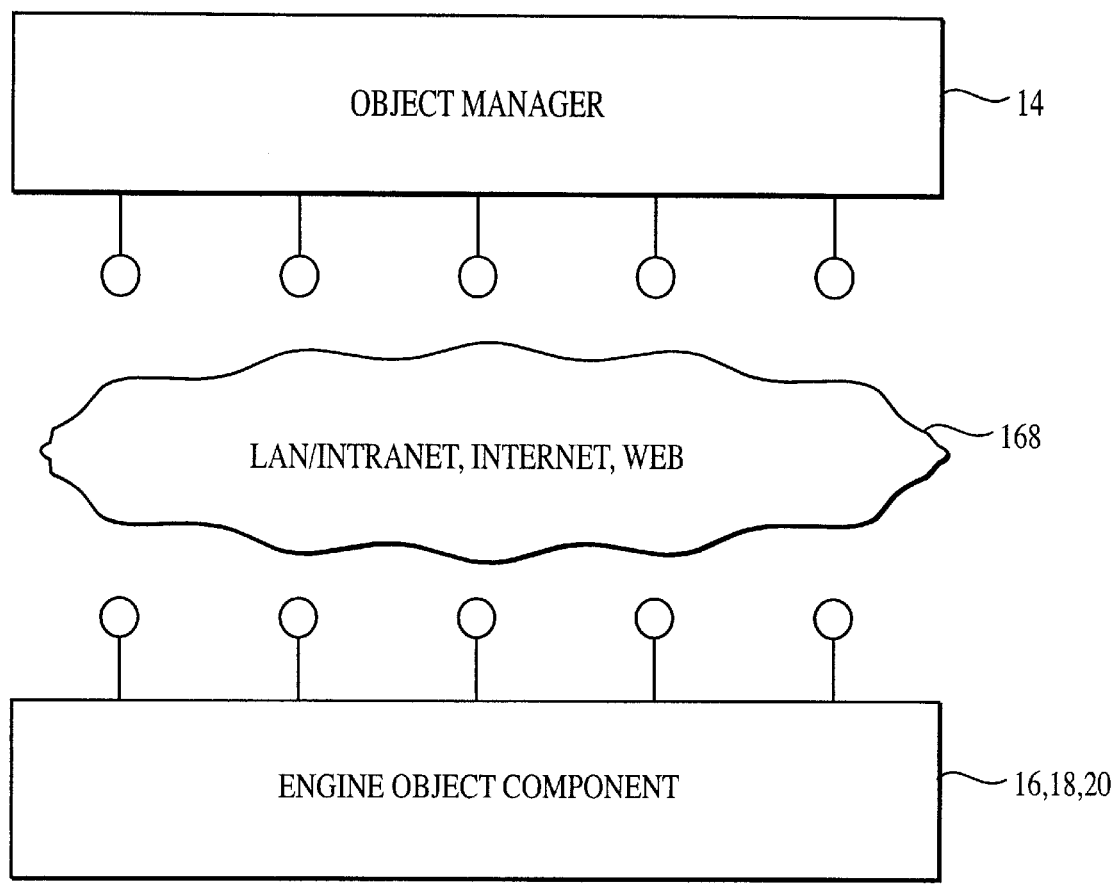
FIG. 21 is an illustration of a distributed environment or architecture for manually and/or automatically generating and/or using reusable software components for network environments, such as the Internet.

FIG. 21 is an illustration of a distributed environment or architecture for manually and/or automatically generating and/or using reusable software components for network environments, such as the Internet. As illustrated in FIG. 21, object manager 14 communicates with engine object component 16, 18, 20 via DCOM specification and a networking environment, such as the Internet, intranet, and the like 168. Other types of component communication may also be utilized that provide the capability of a distributed component interaction over a networking environment.

Figure 22:
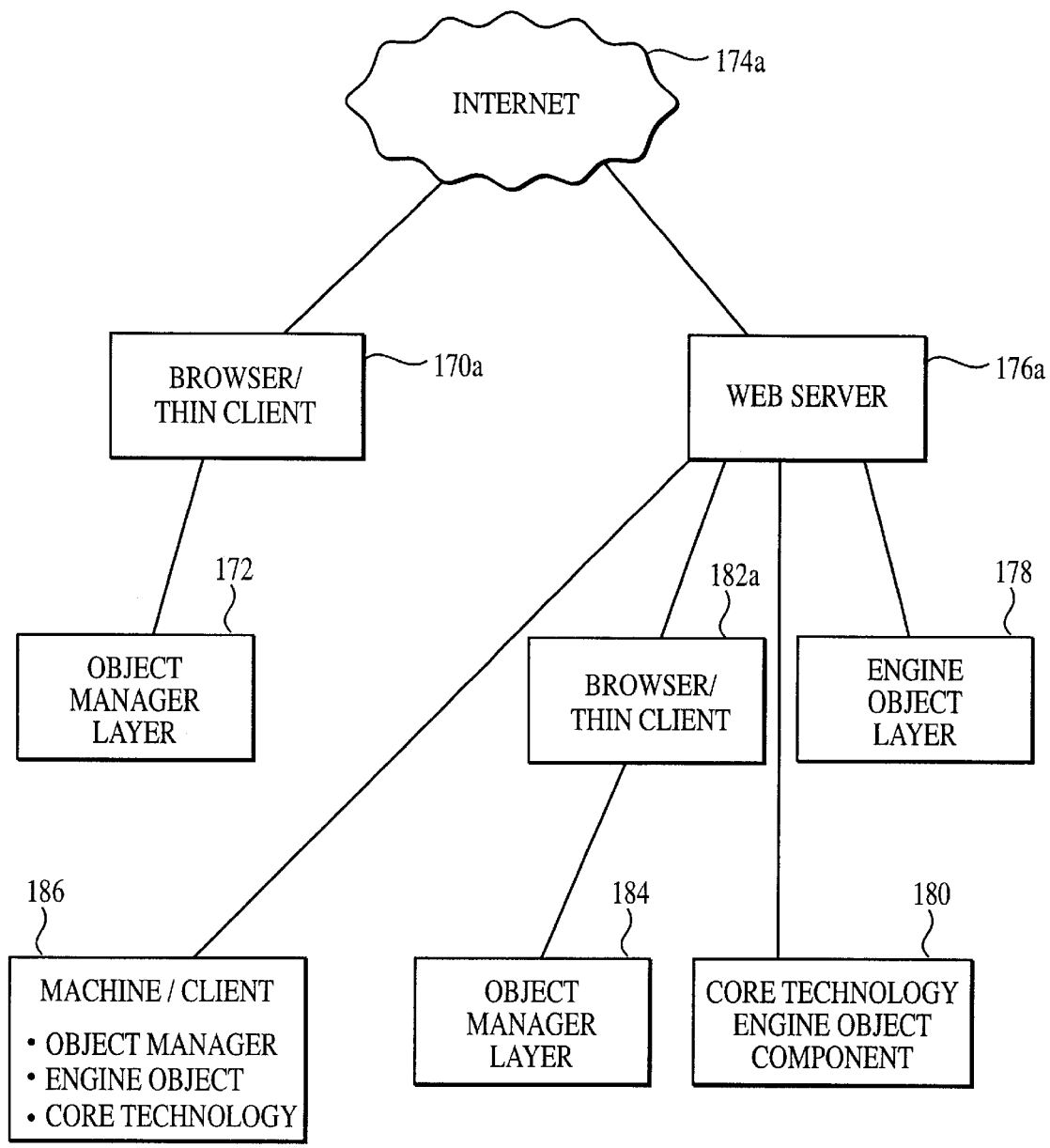
FIG. 22 is a detailed illustration of the distributed environment or architecture for manually and/or automatically generating and/or using reusable software components in the Internet environment.

FIG. 22 is a detailed illustration of the distributed environment or architecture for manually and/or automatically generating and/or using reusable software components in the Internet environment. In FIG. 22, client 170 includes object manager layer 172. Browser/thin client 170*a* executes the core technology 180, via accessing engine object layer 178 managed/stored on web server 176*a*, and communicated via the Internet 174*a*.

Browser/thin client 182*a*, located on the same web server 176*a* as core technology 180 and engine object layer 178, may also be used to execute the core technology 180 via object manager layer 184. In this instance, the browser/thin client 182*a* with the object manager layer 184 is located on the same web server 176*a* as the engine object layer 178. In addition, since the present invention utilizes a communication protocol between components, for example, DCOM, that allows a client to also include both the engine object component layer and the object manager layer on the same machine 186, as well as the core technology.

Figure 23A:
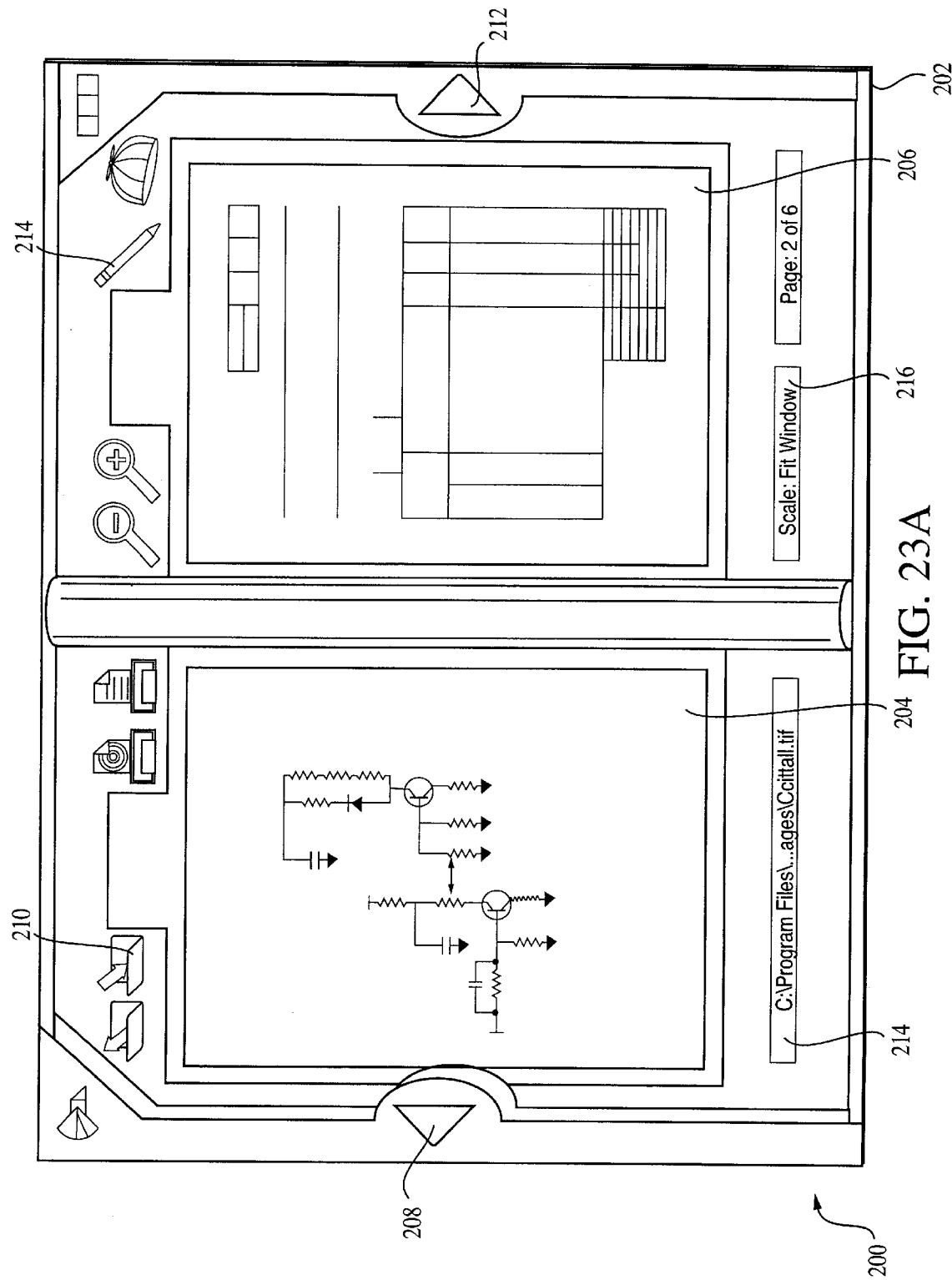
FIGS. 23A–23C are illustrations of the image viewer user interface and/or functionality associated therewith in accordance with the present invention.
Figure 23B:
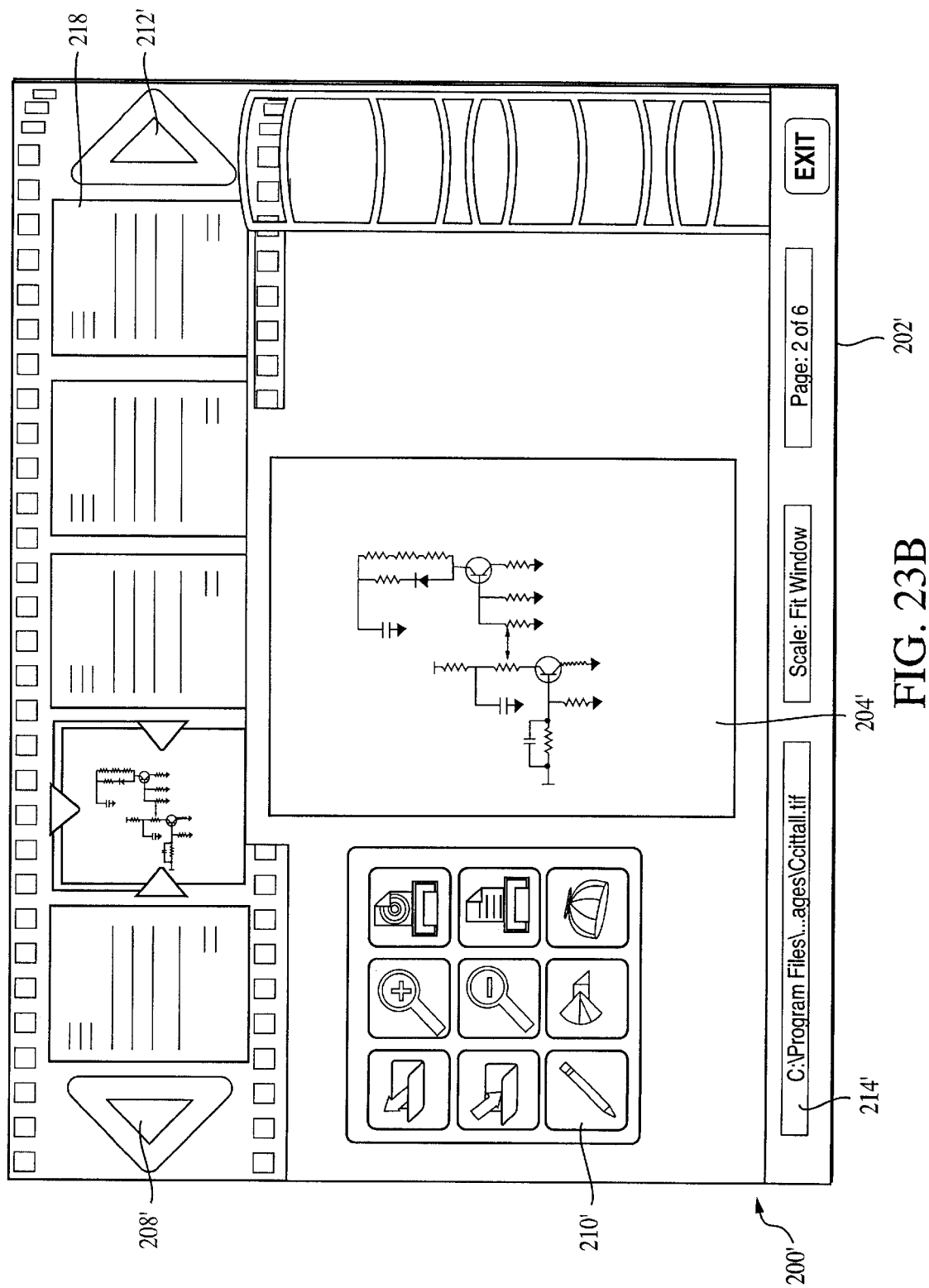
Figure 23C:
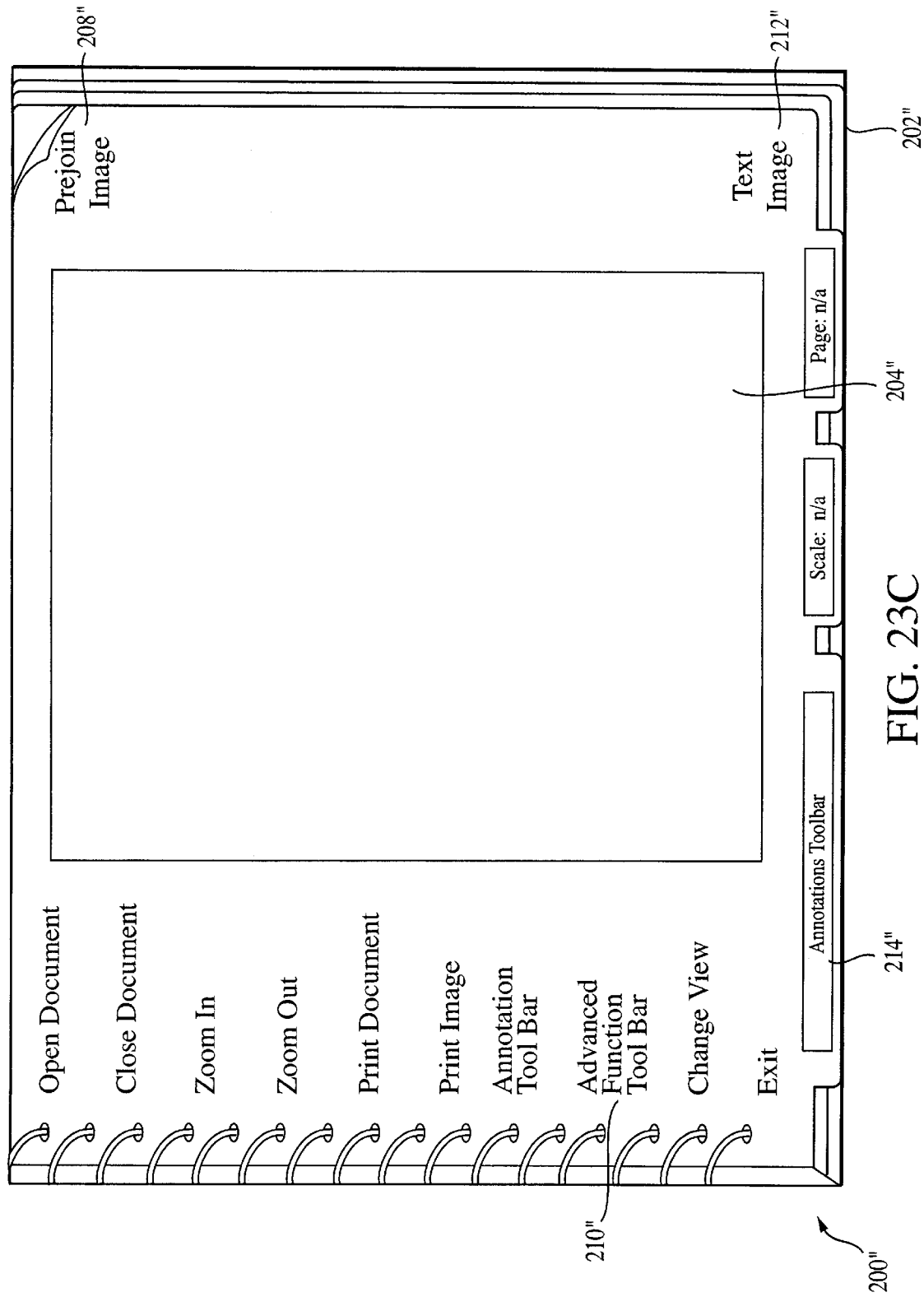

FIGS. 23A–23C are illustrations of the image viewer user selectable or configurable or programmable interface and/or functionality associated therewith in accordance with the present invention. In FIG. 23A, user interface 200 for image viewing includes viewing frame 202, with dual viewing areas 204, 206. Viewing area 204 includes at the periphery, previous page activator 208, at the top, document tools 210, and at the bottom status indicator 214. Viewing area 206 includes at the periphery, next page activator 212, at the top, document tools 214, and at the bottom status indicator 216.

Advantageously, this user interface is selectable and/or customizable by the user, as illustrated below in connection with this figure and FIGS. 23B–23C. Significantly, the image viewer provides the ability to a user to retain or develop a specific perspective on viewing a document. One of the features of the viewer is therefore the ability to change the user's perspective. For example, the user might be looking at the same document, as a book, as a film, or as a bounded or traditional book. This gives the user the ability to relate to the document in a fashion that they are comfortable with, depending on the content or depending on the user. That is, the image viewer is like a usable selectable perspective on viewing a document in a plurality of ways.

FIG. 23B is an illustration of another user selectable interface for image viewing. In FIG. 23B, user interface 200' for image viewing includes viewing frame 202', with single viewing area 204'. Viewing area 204' includes at the top left, previous page activator 208' and at the top right next page indicator 212'. Viewing area 204' also includes at the left area document tools 210', and at the bottom status indicator 214'. Viewing area 204' also includes at the top, multiple viewing page area 218, that appears and preferably moves like a film, and provides viewing of multiple consecutive or non-consecutive pages. Advantageously, this user interface is selectable and/or customizable by the user, as illustrated below in connection with this figure and FIG. 23A and FIG. 23C.

FIG. 23C is an illustration of another user selectable interface for image viewing. In FIG. 23C, user interface 200" for image viewing includes viewing frame 202", with single viewing area 204". Viewing area 204" includes at the top right, previous page activator 208" and at the bottom left next page indicator 212". Viewing area 204" also includes at the left area document tools 210", and at the bottom status indicator 214". Viewing area thus provides a user interface to view a document that appears like a bound or more traditional book. Advantageously, this user interface is selectable and/or customizable by the user, as illustrated below in connection with this figure and FIGS. 23A–23B.

Figure 24:
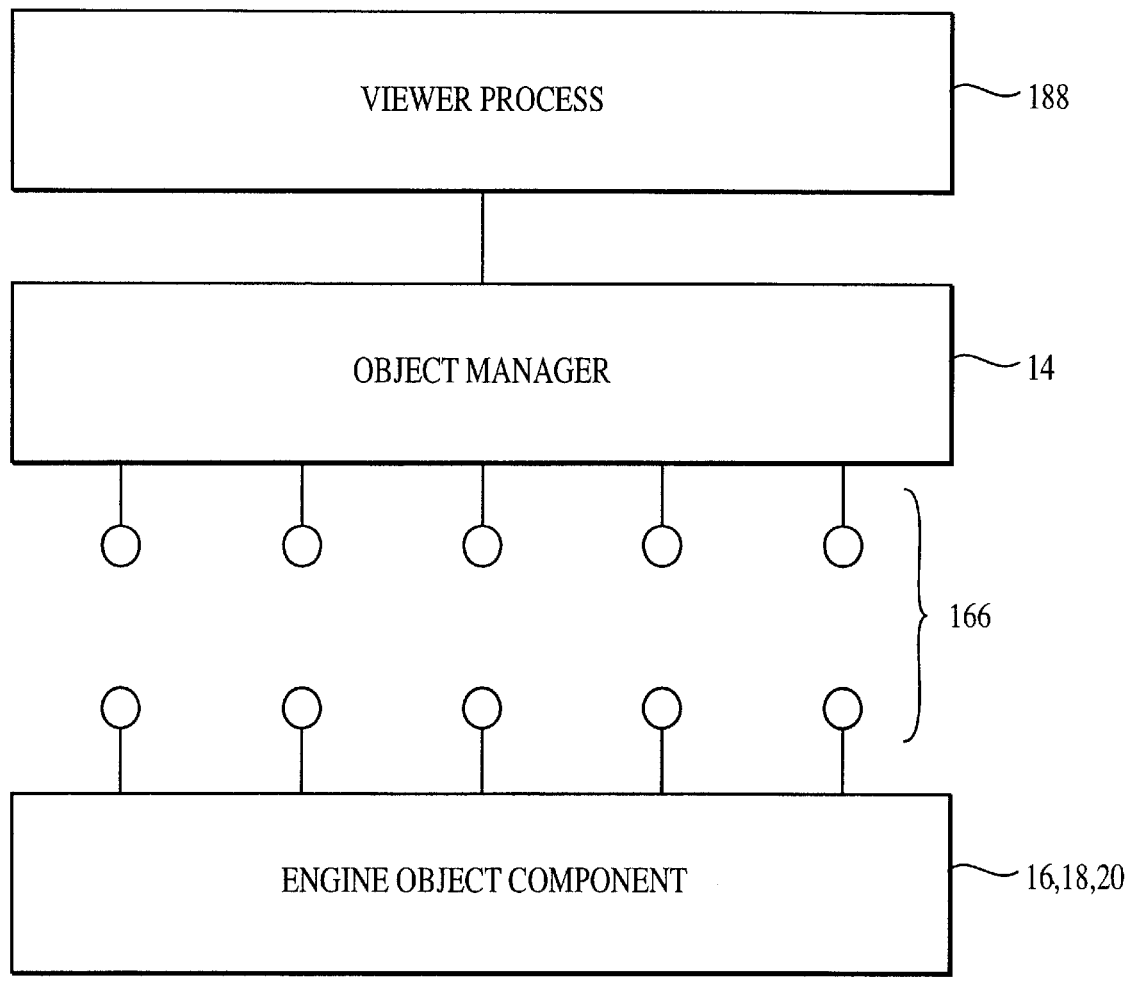
FIG. 24 is an illustration of a stand-alone and/or distributed environment or architecture for image viewer in client server and/or intranet operating environments.

FIG. 24 is an illustration of a stand-alone and/or distributed environment or architecture for image viewer in client server and/or intranet operating environments. The architecture in FIG. 24 provides the capability to perform the viewer process off-line. That is, the viewer process 188 provides an added feature on top of the object manager layer 14. As described above, object manager layer 14 is essentially an interface, and the viewer process 188 is an application that leverages the object manager layer 14.

The advantage of the viewer process 188 being built on the object manager layer 14, which is built on top of the engine object layer 16, 18, 20, is that the viewer process can offset its processing capabilities anywhere in a distributed environment. It can have the processing occur at the local station, on a server, and the like, as described below in detail. Significantly, the object manager and the engine object component are independent to provide a distributed environment for using the present invention. Rather than communicate within the same technology between the object manager and the engine object, the object manager and the engine object component communicate with each other in binary mode, via, for example, standard distributed component object module (DCOM) communication.

As illustrated in FIG. 24, object manager 14 communicates with engine object component 16, 18, 20 via DCOM specification 166. Other types of component communication may also be utilized that provide the capability of a distributed component interaction. Object manager 14 is also respectively connectable to viewer process 188.

Thus, the engine object component and the object manager can leverage current protocols to not only communicate on the same machine, but also on different machines such as a client server and/or intranet and/or Internet environment. The object manager and/or viewer process can be placed on one machine, and the engine object component on another machine and have distributed processing, what is otherwise called thin client processing, distributed processing, wide area intranet processing.

What this allows the present invention to do is to put the object manager on the thin client, who would accept the request from the user, for example, to perform the viewer process. The actual request is handled or processed by the engine object component which generally resides on the server. The engine object component contains the horse power, or the processing power to process the request.

The engine object layer is generally located in the same or substantially same location as where the core technology or engine itself is being stored. Alternatively, the engine object layer and the engine may be optionally located in a distributed environment on different machines, servers, and the like.

Figure 25:
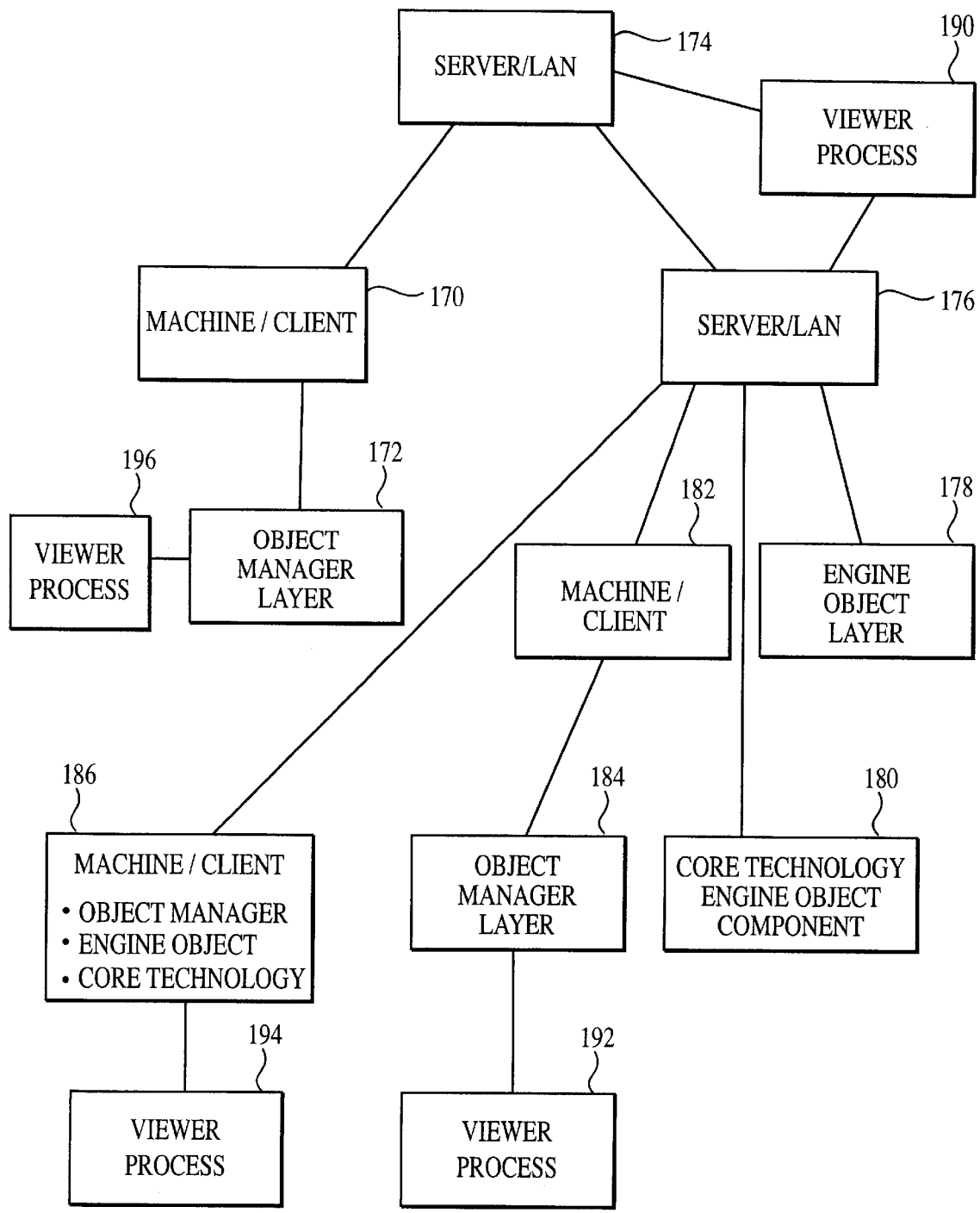
FIG. 25 is a detailed illustration of a stand-alone and/or distributed environment or architecture for image viewer in client server and/or intranet operating environments.

FIG. 25 is a detailed illustration of a stand-alone and/or distributed environment or architecture for image viewer in client server and/or intranet operating environments. In FIG. 25, client 170 includes object manager layer 172 with viewer process 192. Client 170 executes the core technology 180, via accessing engine object layer 178 managed/stored on server 176, and communicated via server 174. Viewer process 190 is also optionally available to either or both servers 174, 176.

Client 182, located on the same server 176 as core technology 180 and engine object layer 178, may also be used to execute the core technology 180 and/or viewer process 192 via object manager layer 184. In this instance, the client 182 with the object manager layer 184 is located on the same server 176 as the engine object layer 178. In addition, since the present invention utilizes a communication protocol between components, for example, DCOM, that allows a client to also include both the engine object component layer, viewer process 194 and the object manager layer on the same machine 186, as well as the core technology.

Further, since the object manager is formatted or constructed of a client technology, the object manager can sit in a standard browser. This means that anyone that has an Internet browser, i.e., anyone that has access to the world wide web (WEB) can actually access the core engine technology and/or viewer process. Thus, by structuring the architecture of the present invention as described herein, users automatically become Internet, intranet and/or WEB enabled.

The present invention also transforms the core technology and/or viewer process from essentially client based technology into a client server and/or a thin client technology. This makes the core technology high level and/or viewer process accessible, thereby transforming any core technology and/or viewer process into client server, or hidden client technology. The browser is located on the client, and the browser leverages the object manager. Accordingly, the browser optionally contains the object manager, and the object manager makes requests over, for example, the Internet, local network, and the like via a server, to the engine object. The server would be either a web server or a LAN server.

The present invention also advantageously provides the ability to have the client and the server, in a distributed environment as discussed above, or on the same machine locally. The present invention utilizes the DCOM communication protocol defining the communication protocol between the object manager and the engine object component. Accordingly, since DCOM can work on the same machine as well as in a distributed environment, DCOM does not necessitate that the engine object or the object manager component be on two separate machines.

Figure 26:
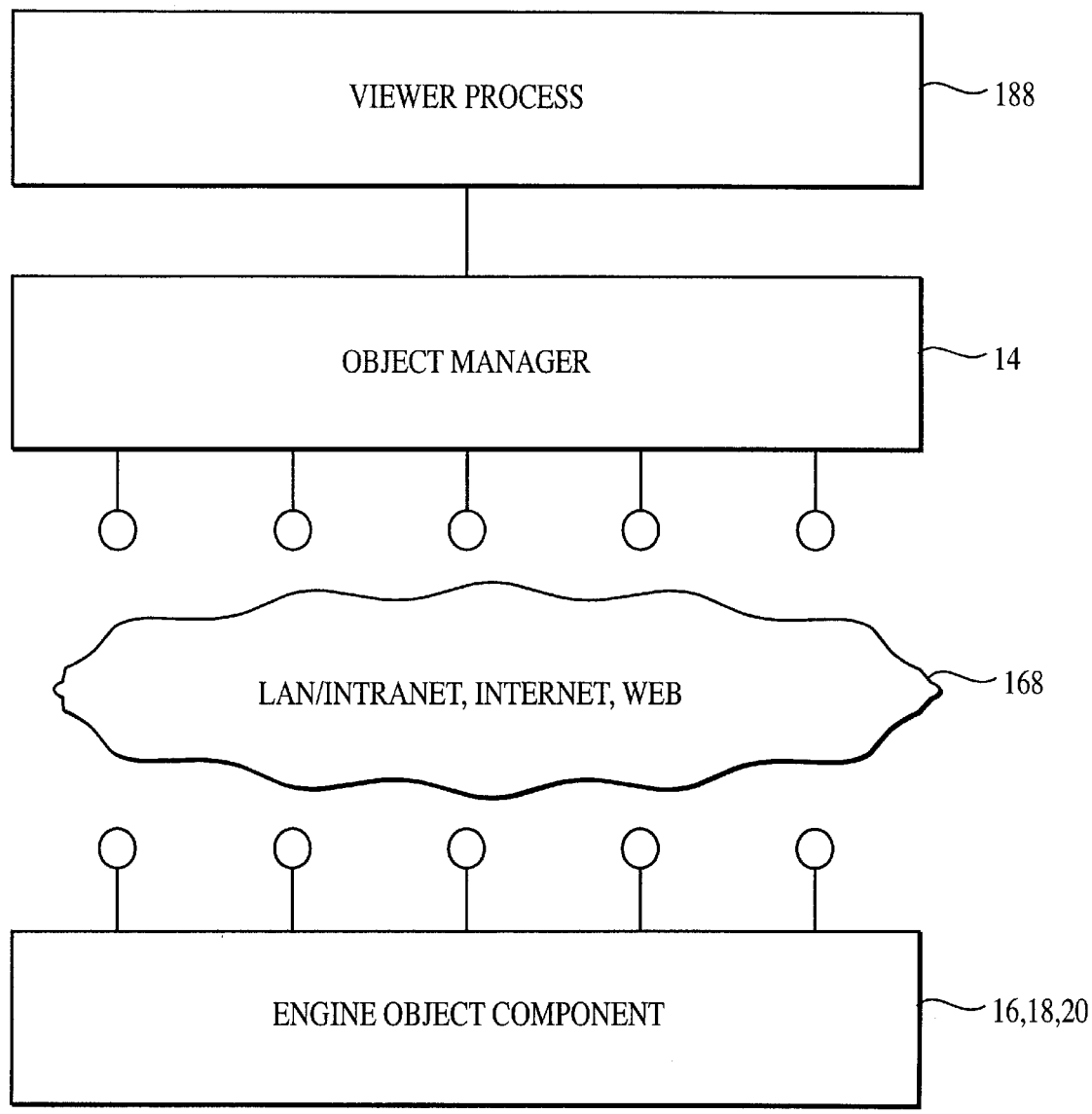
FIG. 26 is an illustration of a stand-alone and/or distributed environment or architecture for image viewer in network environments, such as the Internet.

FIG. 26 is an illustration of a stand-alone and/or distributed environment or architecture for image viewer in network environments, such as the Internet. As illustrated in FIG. 21, object manager 14 communicates with engine object component 16, 18, 20 via DCOM specification and a networking environment, such as the Internet, intranet, and the like 168. In addition, object manager layer 14 also advantageously communications with viewer process 188a. Other types of component communication may also be utilized that provide the capability of a distributed component interaction over a networking environment.

Figure 27:
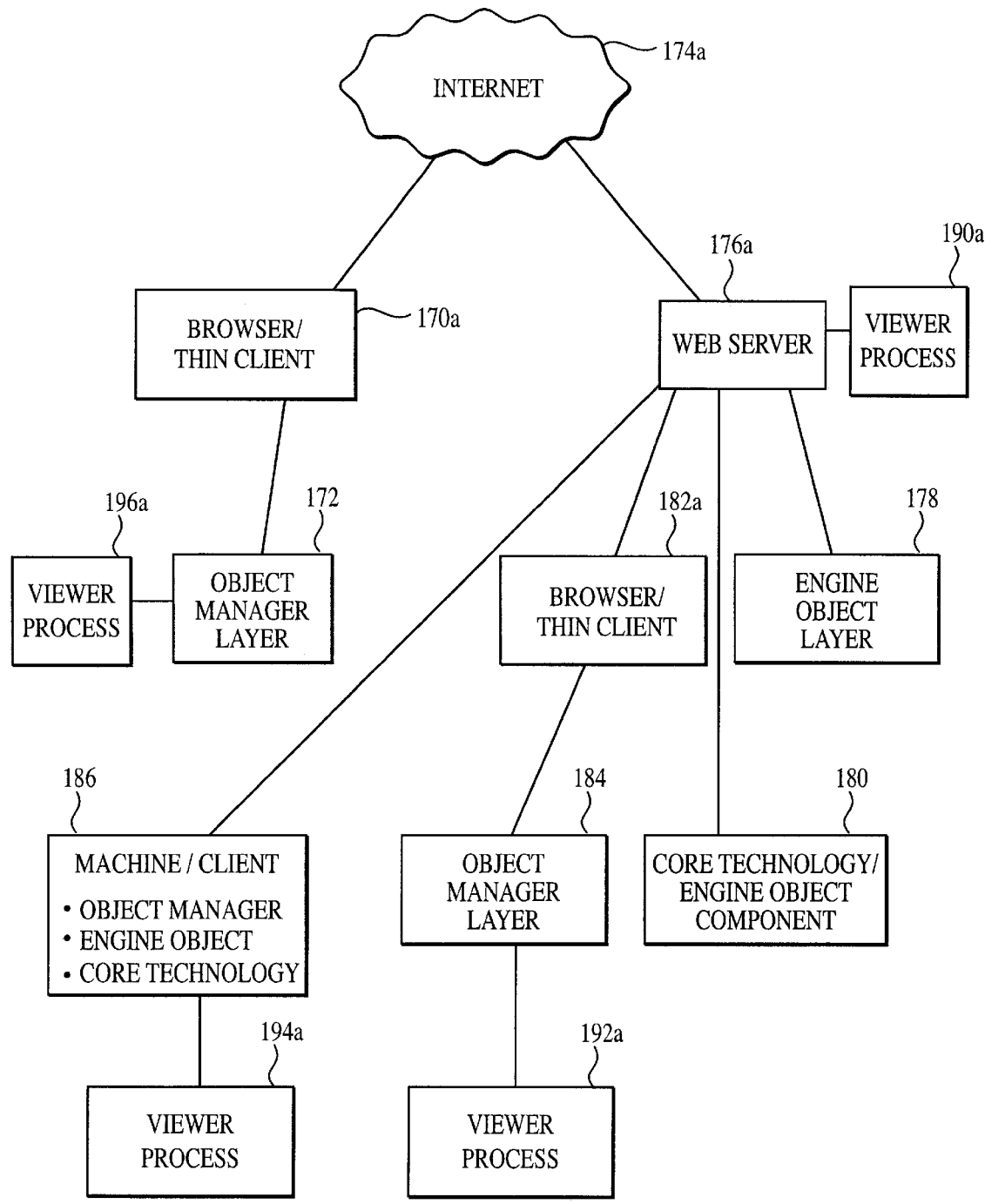
FIG. 27 is a detailed illustration of a stand-alone and/or distributed environment or architecture for image viewer in the Internet environment.

FIG. 27 is a detailed illustration of a stand-alone and/or distributed environment or architecture for image viewer in the Internet environment. In FIG. 27, client 170 includes object manager layer 172. Browser/thin client 170a executes the core technology 180 and/or viewer process 192a, via accessing engine object layer 178 managed/stored on web server 176a, and communicated via the Internet 174a. Viewer process 190 is also optionally available to web server 176a.

Browser/thin client 182a, located on the same web server 176a as core technology 180, viewer process 192a and engine object layer 178, may also be used to execute the core technology 180 via object manager layer 184. In this instance, the browser/thin client 182a with the object manager layer 184 is located on the same web server 176a as the engine object layer 178. In addition, since the present invention utilizes a communication protocol between components, for example, DCOM, that allows a client to also include both the engine object component layer and the object manager layer on the same machine 186, as well as the core technology and viewer process.

The purpose of the Virtual Copier ("VC") aspect of the present invention is to enable a typical PC user to add electronic paper processing to their existing business process. VC is an extension of the concept we understand as copying. In its simplest form it extends the notion of copying from a process that involves paper going through a conventional copier device, to a process that involves paper being scanned from a device at one location and copied to a device at another location. In its more sophisticated form, VC can copy paper from a device at one location directly into a business application residing on a network or on the Internet, or visa versa. The VC invention is software that manages paper so that it can be electronically and seamlessly copied in and out of devices and business applications (such as Microsoft Office, Microsoft Exchange, Lotus Notes) with an optional single-step Go operation. The VC software can reside on a PC, LAN/WAN server, digital device (such as a digital copier), or on a web server to be accessed over the Internet.

Virtual Copier is designed to solve the corporate paper problem by enabling existing web-based and client-server applications to manage paper as part of their solution. Virtual Copier links the familiar and universal world of paper and digital devices to web-based and client-server applications. The result is that the automated business processes become the primary storage of paper in electronic form. Information that is typically managed and processed in paper form is "copied" into the system and managed by the business processes with which users are accustomed, which is made possible by using Virtual Copier. Simple extensions of Virtual Copier support seamless electronic outsourcing of paper processing and archival services over the web.

Virtual Copier is a unique combination of an intuitive application built on an open component architecture that delivers a simple innovation: provide paper processing to existing Intranet and client-server business processes without any fuss. Whether it is an office clerk that needs to easily copy a report from a desktop scanner to the company's Intranet-networked copier, or an accounting software integrator that wants to embed paper processing, Virtual Copier offers a simple solution. To the office clerk Virtual Copier is a document imaging application packaged in the familiar setting of an office copier. To the integrator, the underlying open architecture of Virtual Copier offers a simple integration path for embedding paper processing into its client-server or web-based software solution.

Although managing paper manually is one of the great problems facing corporations, there has been little innovation in enabling those workers to eliminate the need to continuously work with paper manually. Much of the problem stems from the complexity of traditional document management systems, which require days of training and months to become familiar with the system in order to be proficient. Virtual Copier was designed to be as simple as a copier to operate, and yet still provide the complete capability of integrating paper with existing business applications. By simplifying the interface and underlying software infrastructure, VC can manage paper in electronic form as easily as is currently done in physical form.

VC extends the notion of a copier, which simply replicates the image of an original document onto another piece of paper using a single GO or START button, to do a similar operation in software so that the image gets seamlessly replicated into other devices or applications or the Internet.

Figure 28:
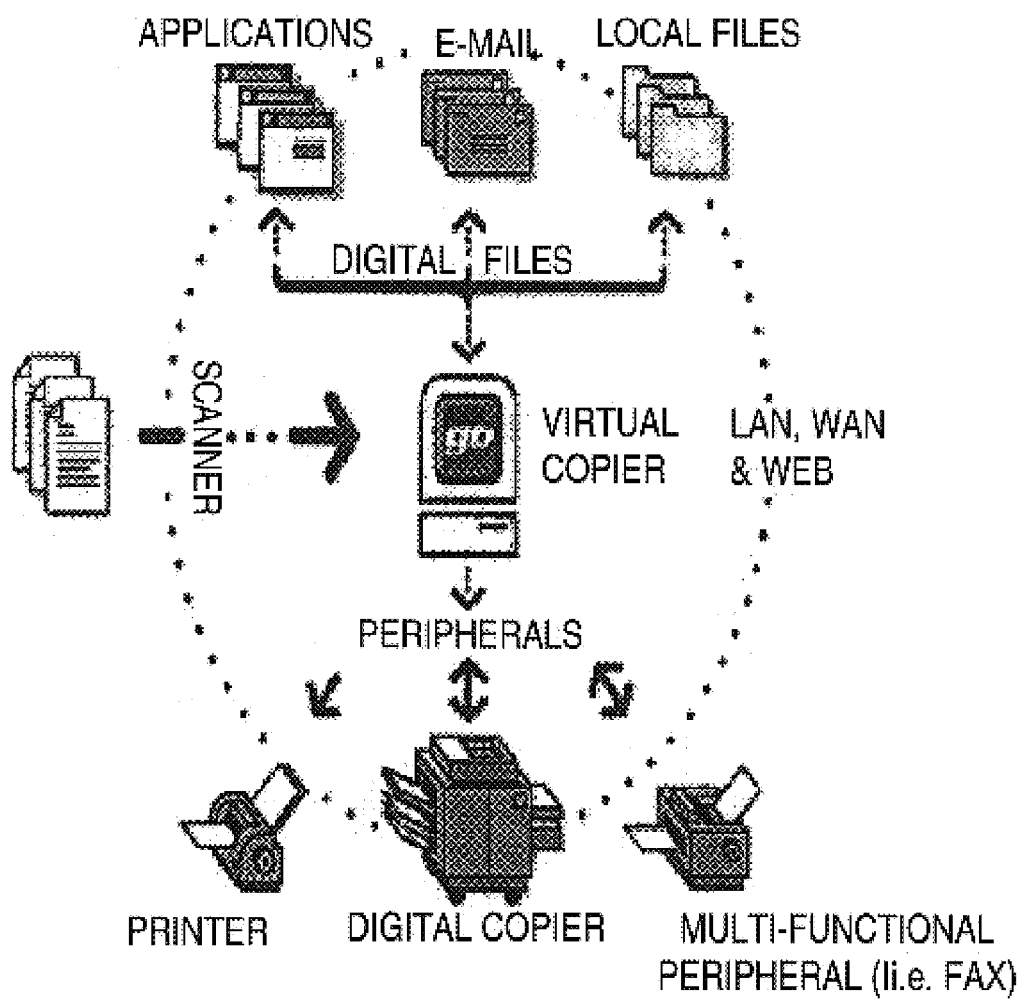
FIGS. 28 and 29 are illustrations of the interface of the Virtual Copier (VC) embodiment of the present invention with a Go button much like a physical copier.
Figure 29:
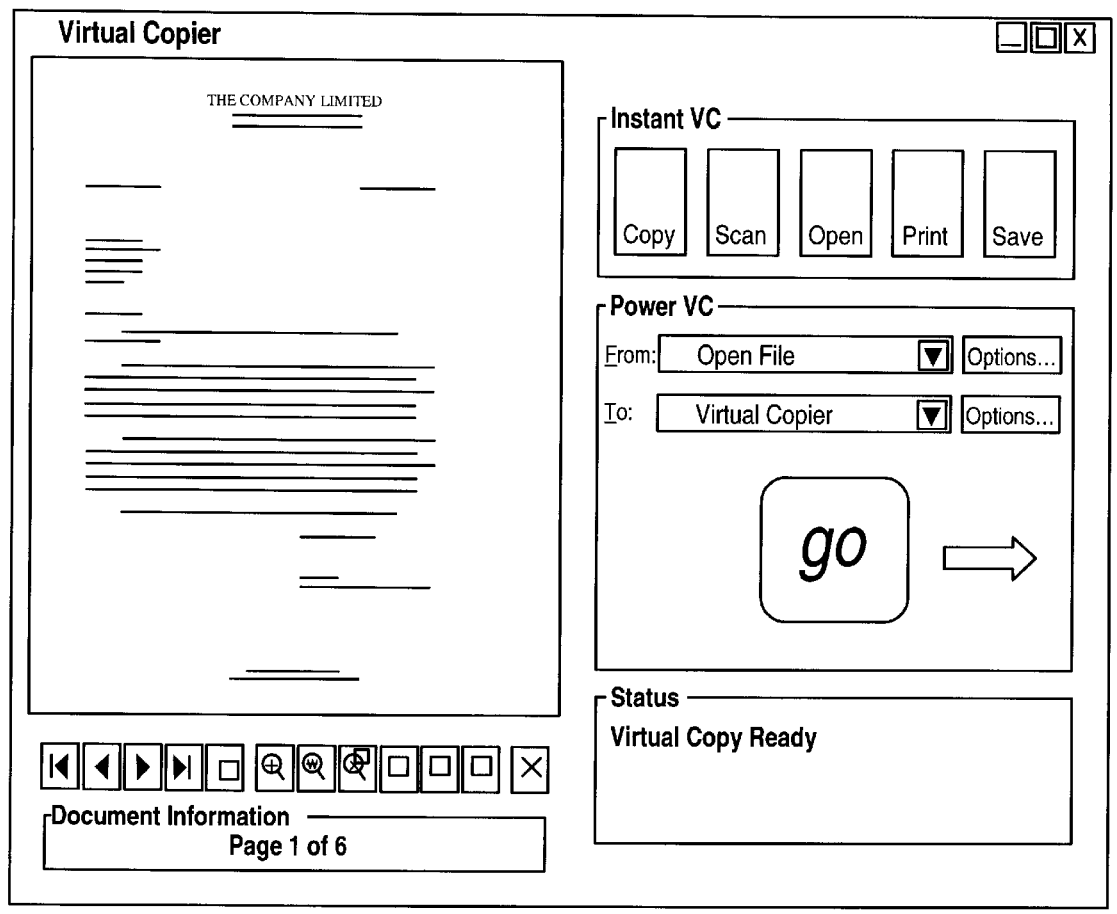

An example of this is the actual implementation of Virtual Copier as a consumer product. As shown in FIGS. 28 and 29, the interface of the consumer product called Virtual Copier has a Go button much like a physical copier. This GO button can copy paper, whether physical or electronic, from one device and or application to another device and/or application.

Figure 30:
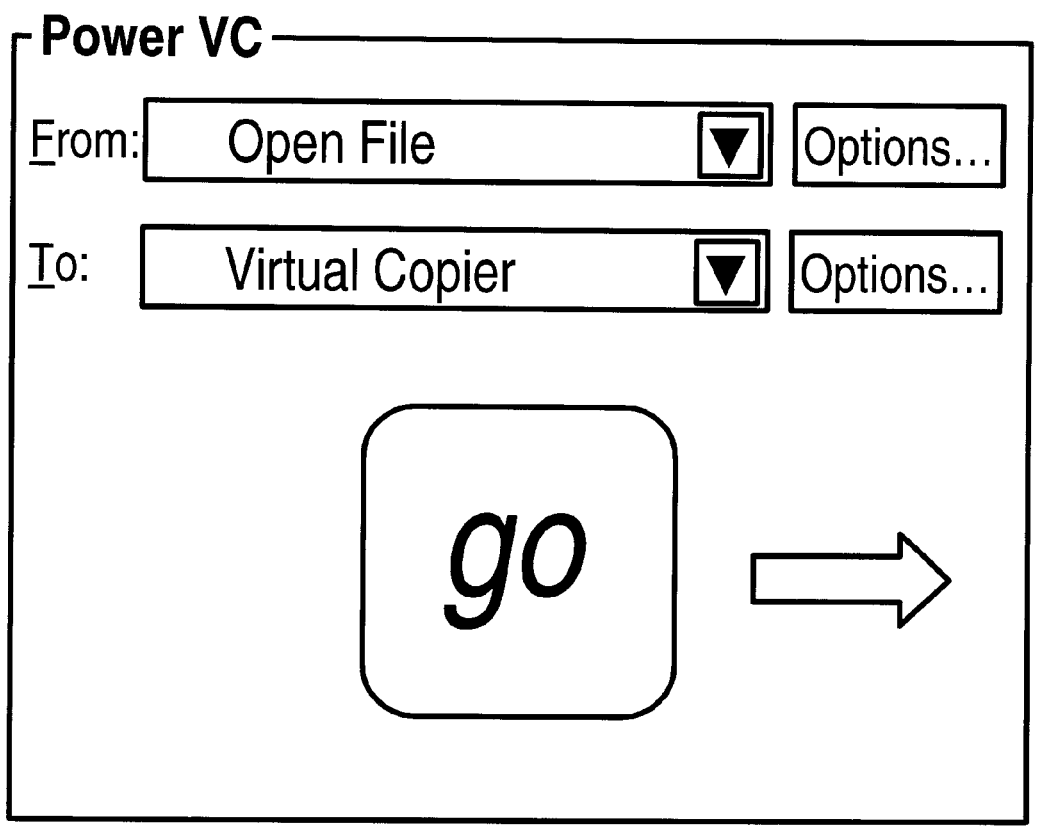
FIG. 30 is an illustration of the sequence used with Virtual Copier with just the Power VC portion of the main Virtual Copier window.

What makes Virtual Copier as simple as its physical counterpart in at least one embodiment is the fact that it replicates the identical motions that a user who is making a copy using a physical photocopier goes through. When a user photocopies a document, he/she selects where they want to copy from (i.e. the sheet feeder), where the user wants to copy to (i.e. 6 copies collated and stapled) and then presses a GO button to actually carry out the photocopy process. With Virtual Copier the process feels familiar because the sequence is the same as illustrated in FIG. 30 with just the Power VC portion of the main Virtual Copier window.

The power of Virtual Copier is the fact that the From can be a physical device (e.g. digital copier, fax or scanner) or an application (e.g. Lotus Notes, Microsoft Exchange, the Internet, or an electronic filing system). The To can also be a physical device (e.g. a fax, digital copier, or printer) or an application (e.g. Lotus Notes, Microsoft Exchange, the Internet, or an electronic filing system). Even though paper is being copied electronically from devices to applications, from applications to devices, from devices to devices, or from applications to applications, the user simply has one sequence to execute: select From, select To, and then press GO. Virtual Copier will accomplish all translations between device and applications automatically and seamlessly.

Another reason that paper is still a major corporate issue is that traditional document management systems require that a company invest in a whole new system just to store electronic images. Although this is the only way that document management systems have been designed and delivered, it is in fact highly inefficient. Most companies already manage information about physical documents in some form of software applications.

For example, accounting systems have long been used to maintain information about invoices and bills that arrive into a company from outside sources as physical pieces of paper. When an invoice arrives, its information is keyed into the accounting software, where balances are maintained and accounts payable information is coordinated. Yet the original invoice is stored manually, and every time that a request is made for a copy of the signed invoice, someone manually retrieves the invoice from a physical filing cabinet. Accounting systems, like most business applications, typically have no way of maintaining an electronic copy of the physical invoice, and adding a document management system to an accounting system is cumbersome, costly, and difficult to maintain, and even more difficult to coordinate.

Virtual Copier solves this problem in at least one embodiment by copying paper directly into the existing accounting system. Simply adding a To item in the Virtual Copier window enables a user to copy paper directly into the appropriate accounting record of the existing accounting system. This requires no retraining (users who are trained on the accounting system will still use the accounting system in the same way), requires no document management system (the electronic copy of the document is actually being maintained by the accounting system itself), there is no coordination between two systems (Virtual Copier embeds the invoice with the appropriate accounting record), and it is simple (one Go button).

What is true with regard to the example above of an accounting system is true of most other business applications. The power of Virtual Copier is that it can turn an information system into a document management system by adding support for electronic paper directly into the existing business application, whether it is a client, server-based, or web-based system.

Virtual Copier enables corporations to perform sophisticated document imaging with their existing Web-based and client-server applications through a user interface that is as familiar as the office copier. Virtual Copier can be used out-of-the-box as a standalone application to copy, scan, fax, or print images using existing digital devices within corporate environments or across the web. With the extensions, as described below, Virtual Copier can be integrated into Web-based and client server applications, such as ERP or accounting systems, to eliminate paper from existing business processes and legacy applications. Virtual Copier can also be used to support seamless access to document image processing and archival over the web since, in at least one embodiment, the VC interface is implemented as a software application.

VC is architected as an application that delivers end-user functionality while remaining open to third-parties extensions. For example, VC can be viewed as a copier. Like a copier, VC takes paper in, and produces paper going out. The only difference is that VC does not distinguish between electronic and physical paper.

To accommodate third-party extensions, VC is divided into five essential modules. Each module is a counterpart to an aspect that is found on a conventional copier. Based on the modular design of VC, each aspect of VC can be independently extended, offering much greater flexibility than conventional copiers.

Figure 31:
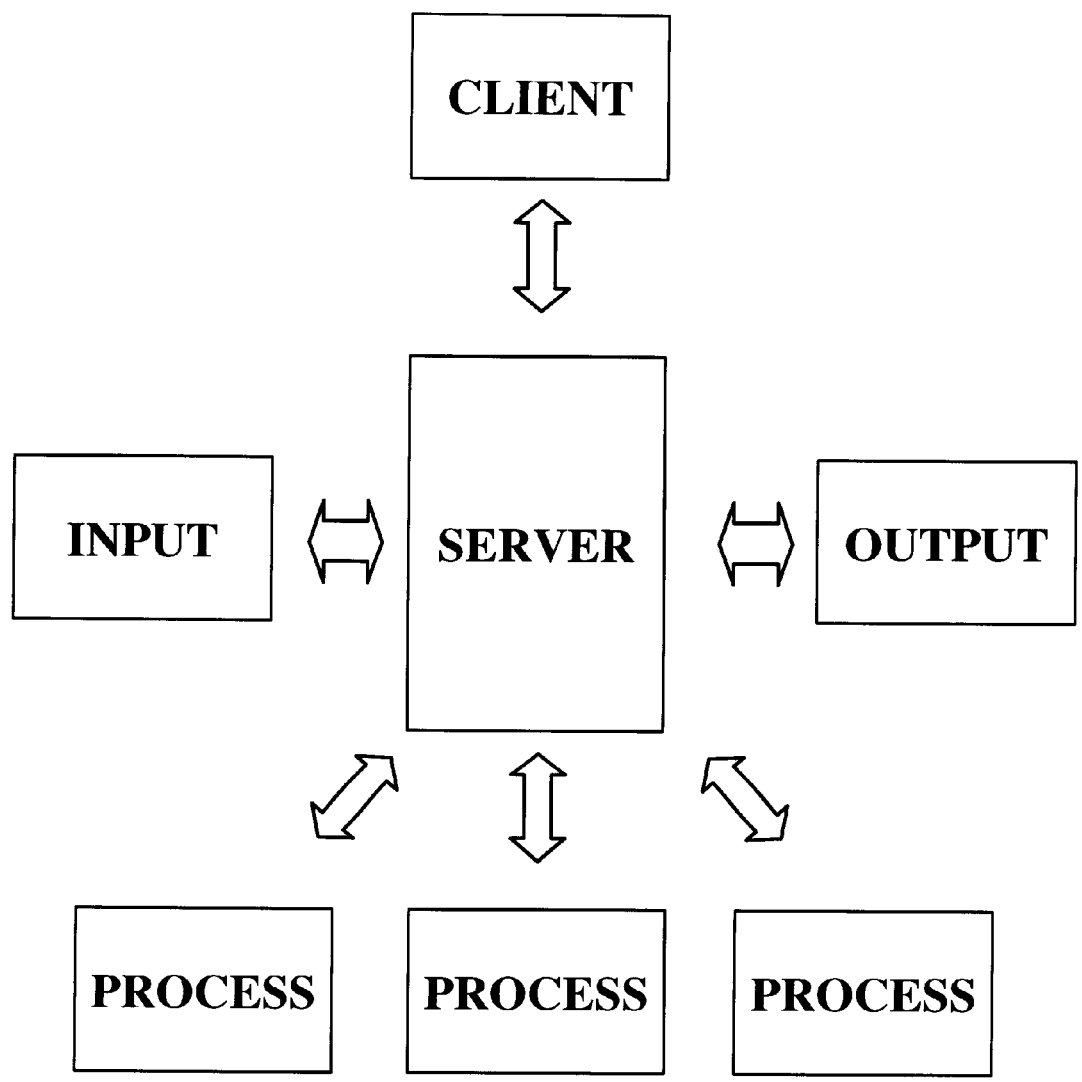
FIG. 31 is an illustration of the five core modules of VC.

The five core modules of VC illustrated in FIG. 31 are:

Input Module—The Input Module manages paper or electronic paper entering VC. This module manages imaging devices to input paper through scanners, MFPs, or the new breed of digital copiers. The Input Module also manages reading electronic paper from third-party or proprietary applications. The counterpart to VC's Input Module on a conventional copier is the scanner subsystem.

Output Module—The Output Module manages paper or electronic paper exiting VC. Like the Input Module, this module manages imaging devices to output paper to standard Windows printers, specialty image printers, MFPs, or the new breed of digital copiers. The Output Module also manages writing electronic paper to third-party or proprietary applications. The counterpart to VC's Output Module on a conventional copier is the printer or fax subsystem.

Process Module—The Process Module applies processing to the electronic paper as it is being copied. Examples of a process are OCR and ICR. The Process Module can also apply non-imaging functionality as well, such as workflow or other relevant tie-ins to the electronic paper as it is being copied. One of the advantages of VC over conventional copiers is that multiple processes can be applied to a single virtual copy. The counterpart to VC's Process Module on a conventional copier is the controller.

Client Module—The Client Module presents the electronic paper as it is being copied, and any relevant information related to the input or output functions. For example, if the Output Module is directed to a printer, then the Client Module might present the finishing capabilities; if the Output Module is directed to Goldmine, then the Client Module might present the target contact record to which the document is being copied. The counterpart to VC's Client Module on a conventional copier is the panel.

Server Module—Unlike conventional copiers, VC's Server Module is a unique subsystem that can communicate with the other modules as well as third-party applications. The Server Module is what makes VC a far more powerful concept than simply an application that can control a scanner and a printer to mimic a copier. The Server Module can be used to combine third-party applications with the new breed of digital imaging devices to create unique and custom virtual copier solutions. A virtual copier can be created with VC by combining a scanner with a printer; or by combining a scanner with an application; or by combing an application with an image printer. In each case VC is dynamically creating a custom virtual copier, with a complete understanding of how paper flows from the source to its destination. There is no counterpart to VC's Server Module on a conventional copier.

One of the primary design goals of VC is to make it simple to integrate VC with third-party applications. There are two options to integrating VC into a third-party application: running VC as an external service, or embedding VC as an underlying service.

Figure 32:
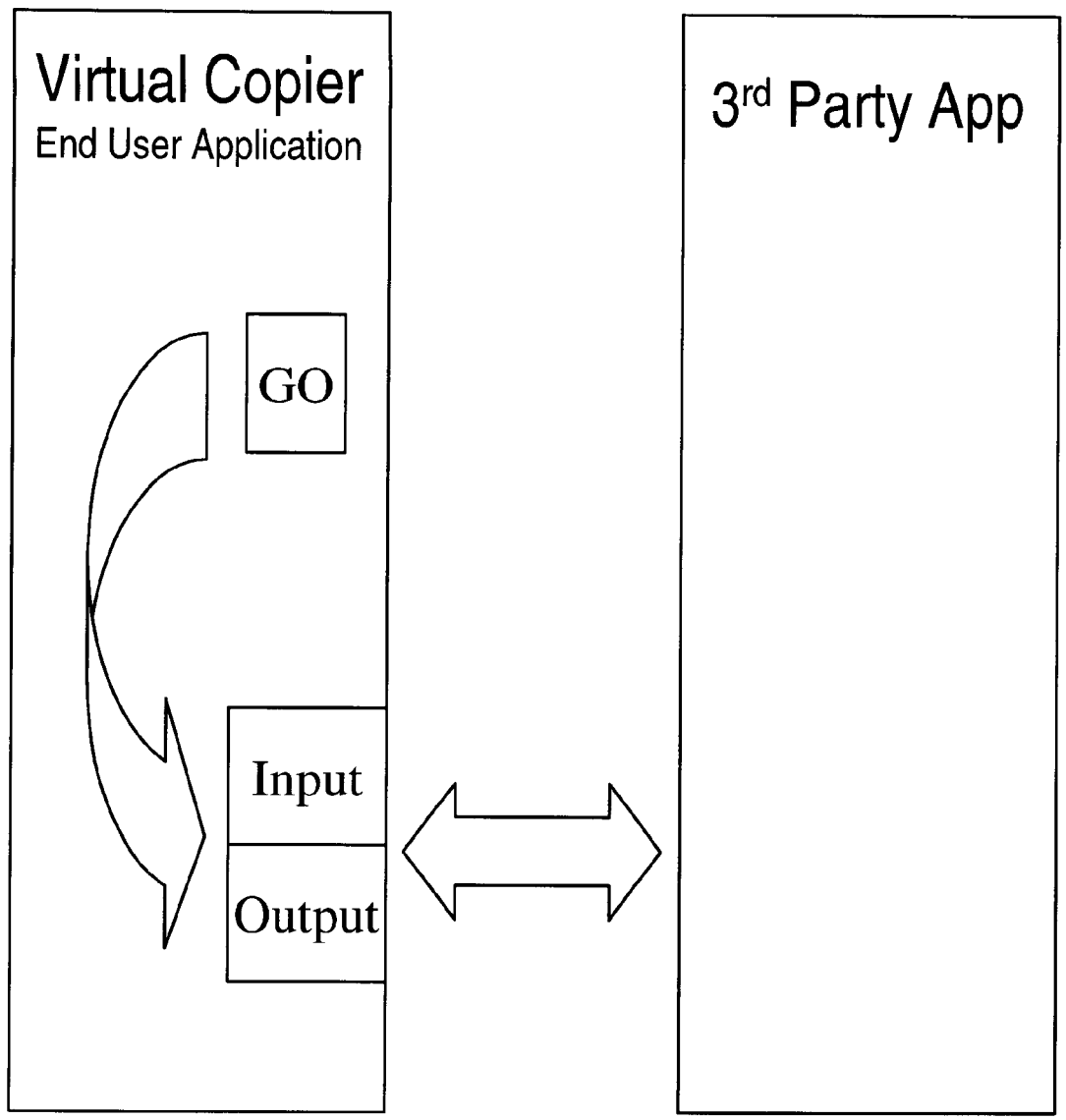
FIG. 32 is an illustration of VC recognizing that the third-party application is running, and intelligently copying paper to and from that application.

VC is in one embodiment and optionally a standalone application that enables a user to scan (copy) paper from a device to a third-party application, and to print (copy) the reference of an image document from a third-party application to a printing device. VC does not require the third-party application to be aware that VC is operating. Rather, VC recognizes that the third-party application is running, and it intelligently copies paper to and from that application as illustrated in FIG. 32.

In this scenario the user is interacting with VC's Client Module in order to execute a copy operation to and from the third-party application. There does not have to be any changes made to the third-party application, not even to its interface, in order for VC to operate. The user of VC only knows that to copy to and from the third-party application, a custom Input and Output Module must be selected, and the Go button is pressed.

In order to support copying to and from a third-party application, VC must be able to support extensions that understand each third-party application. This is accomplished through the Input and Output Modules. The Client, Server, and even Process Modules remain independent across third-party applications. However, in order to support outputting to a third-party application, an Output Module is developed that is unique to that third-party application. Likewise, an Input Module is developed that is unique to a third-party application in order to support reading images from that application.

It is the optional Input and Output Modules that render VC extendable. For each third-party application there is a unique pair of Input and Output Modules that understand the third-party application, and how to copy images to and from that application. Each Input and Output Module registers itself to the Windows registry so that the Server Module knows how to find them. In this way Virtual Copier can grow indefinitely, to support any number of third-party applications.

The significant point is that the Input and Output Modules have their own interface, and can be developed independently from any other module. As long as the Input and Output Module conform to the API specified in this document it will plug-and-play with VC. VC will be able to mix and match the custom Input and Output Module with its standard and other custom Input and Output Modules.

Figure 33:
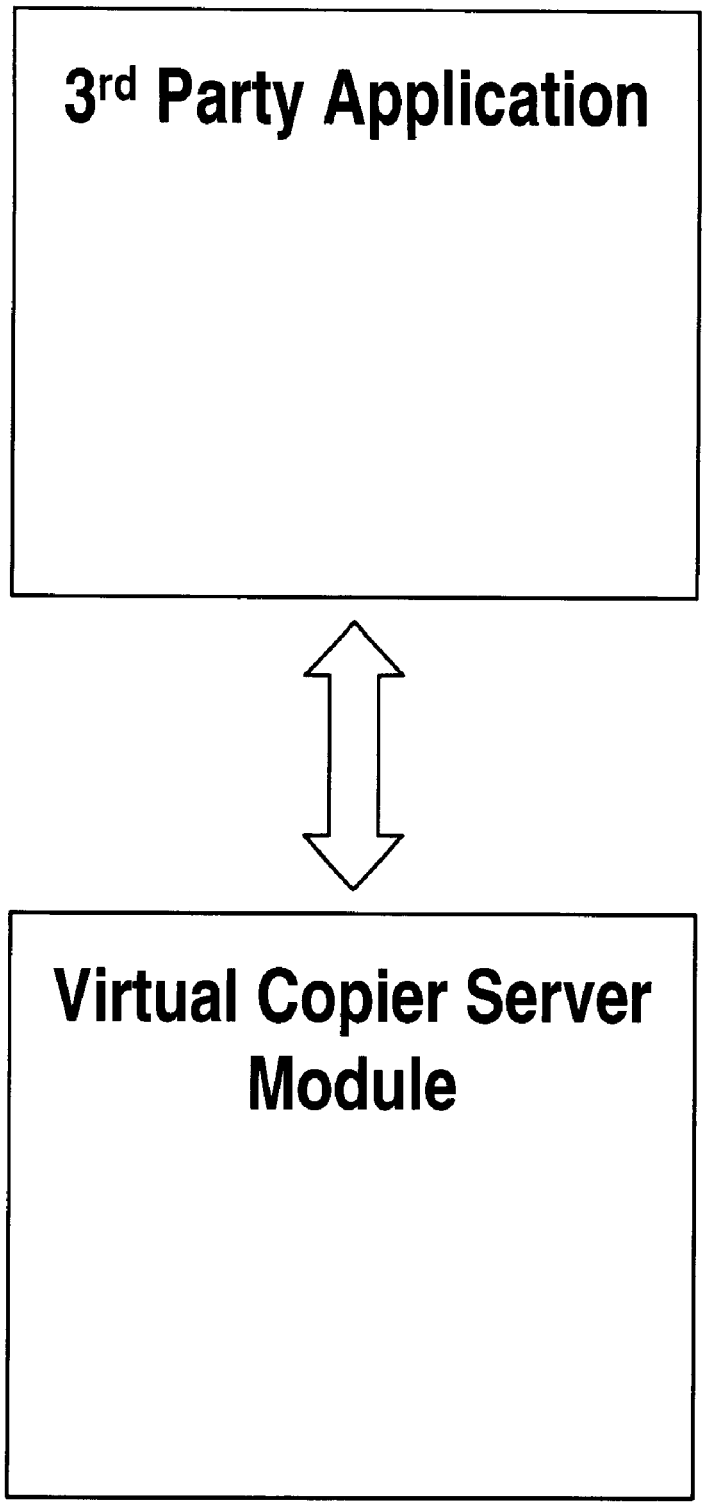
FIG. 33 is an illustration of a button that can be placed on a third-party application that launches VC in the background.

A third-party application can also use the services of VC without its user interface. That is, a third-party application can embed VC's functionality and provide its own interface to its functionality. For example, rather than have VC as a separate application, a special button can be placed on a third-party application that launches VC in the background as illustrated in FIG. 33.

VC is designed so that the Server Module can run independently from the Client Module. All the core functionality, including communicating with the Input, Output, and Process Modules, are performed directly by the Server Module. The Client Module is generally simply an interface to the Server Module. Therefore, all the services of the Server Module can be made available in the background to a third-party application without the need for an interface. The third-party application can in fact become the user's interface to VC.

In order to support VC operating in the background a third-party application merely has to communicate with the Server Module directly, as described later in this document. The Server Module, as all modules in VC, support COM-based interfaces for simple and direct support from all major Windows development environments.

At the heart of VC is the Server Module. A virtual copy operation can only be initiated using the Server Module. The Server Module coordinates the activities of the various modules while maintaining the information regarding the current process and document. It also collects and passes information from one module to another regarding the document and process. Events and an API are used to control the modules and their interaction with each other as well as with the Server Module.

The following are the main functions of the Server Module:

Enable Virtual Copy Operation—The Server Module provides simple methods to initiate, cancel, and reset VC. The API is designed to imitate the simplicity of using a conventional copier.

Maintain List of Available Modules—The Windows registry contains the list of available Input, Output, and Process Modules that can be used with VC. The Server Modules reads this list on startup, and maintains it in the Modules object that can be accessed by the other modules. Although each module can read this information directly from the registry, it is preferable to use the Modules object. All information regarding the available modules can be found in the Modules object.

Maintain the Currently Active Modules—The Server Module maintains the current Input, Output, and Process Modules that are being used for the current virtual copy operation. This is maintained in the Program object. This information can also be saved to disk in a Process Template file.

Maintain Complete Document Information—The Server Module maintains all the information regarding the current file being copied. This is maintained in the VDocument object. This information can also be saved to disk in a Document Template file.

Figure 34:
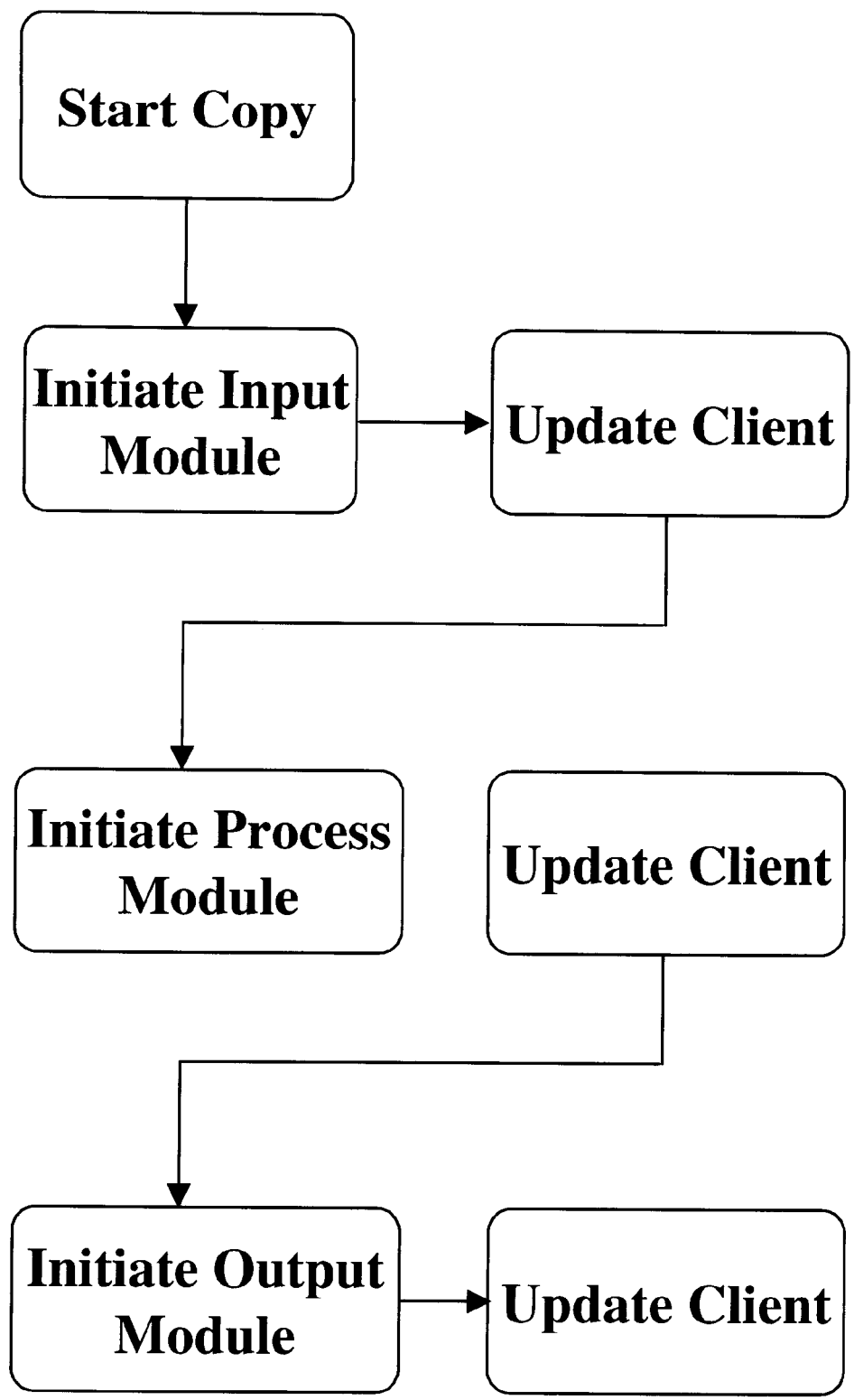
FIG. 34 is an illustration of the VC logic flow.
Figure 35:
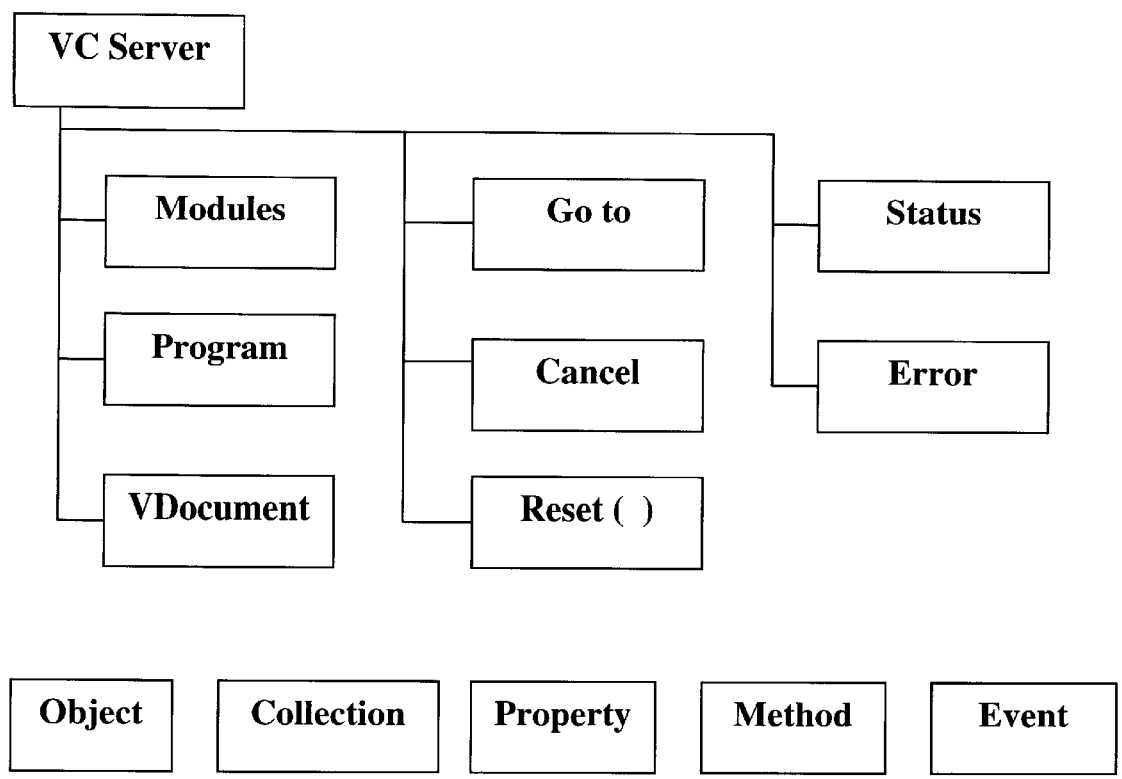
FIG. 35 is an illustration of VC updating its Client Module as well as the results of each Module acting on the document.

As with other design elements of VC, the VC logic flow illustrated in FIG. 34 parallels the basic logic flow of a conventional copier. In a conventional copier, paper is pulled into the copier, processed, and output. Likewise, in VC the Server Module initiates the Input Module, Process Module, and Output Module in that sequence. Unlike a conventional copier which does not have the ability to update its panel, VC updates its Client Module as well as the results of each Module acting on the document as illustrated in FIG. 35.

All actions to create, process, and write images are the responsibility of the Input, Process, and Output Modules respectively. The Server Module is a scheduler of activities, providing the information and initiating the modules at the appropriate time in the virtual copy operation. The Server Module manages the other Modules. It does not know about the internal workings of the modules, nor the contents of the information being copied. The Server Module API is sufficiently rich to maintain all the information necessary for a basic virtual copy operation.

The Server Module API is divided, for example, into the following COM-based interfaces:

Modules Object—This object maintains the list of available Input, Output, and Process Modules Program Object—This object maintains the currently selected Input, Output, and Process Modules VDocument Object—This object maintains the information regarding the current document that is being copied VC Methods—These methods are used to initiate, cancel, and reset VC VC Events—These events are used to provide feedback to the Client Module The purpose of the Modules object is to provide the Client Module with the full list of available Input, Output, and Process Modules that is available to the user. The Client Module can obtain the user-readable names for each module, as well as its icon and other key information. The Modules object is primarily used to seed list or combo boxes that provide the end-user with a choice of modules from which to select.

Figure 36:
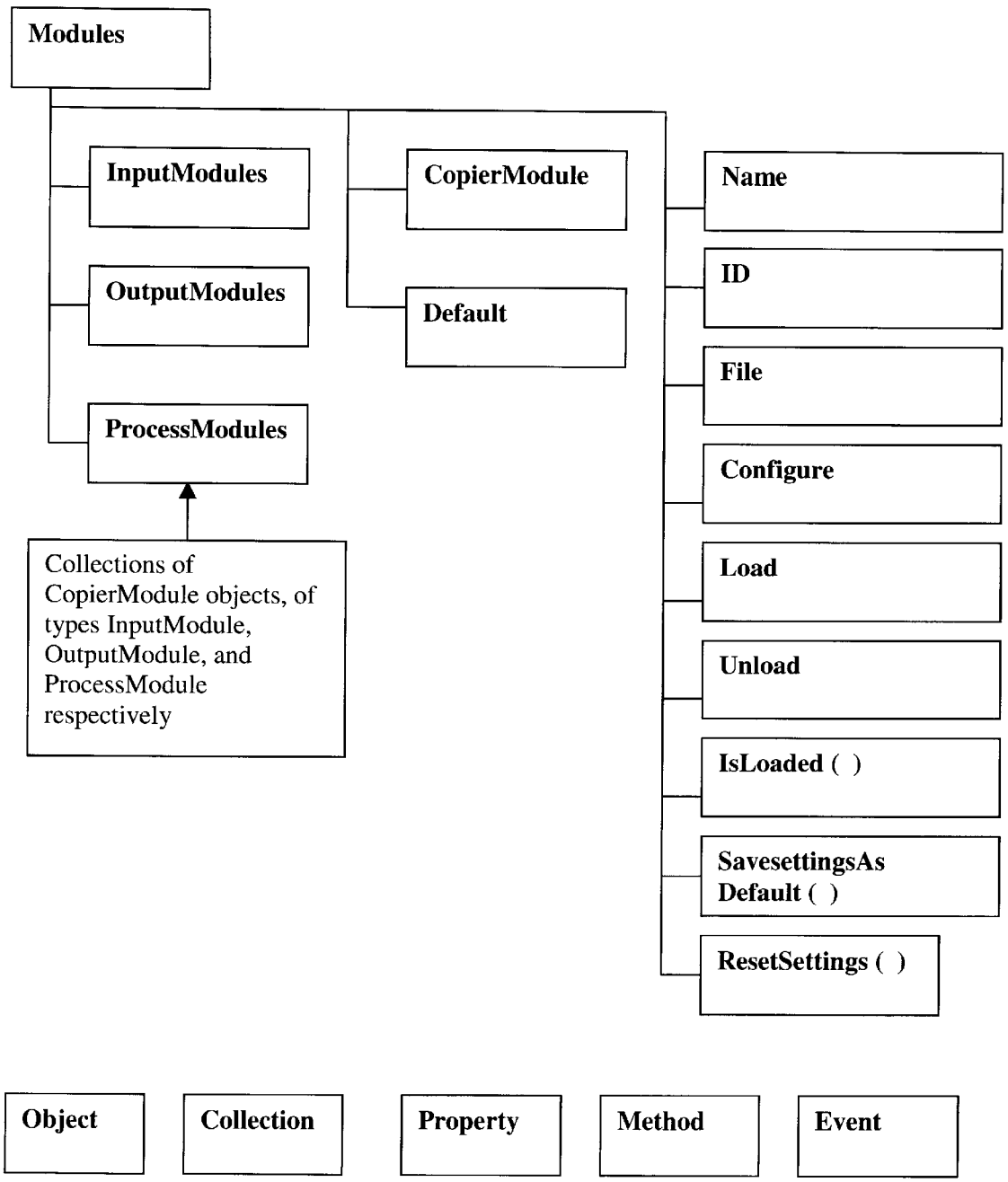
FIG. 36 is an illustration of the structure of the Modules Object.

In a preferred embodiment, the Modules Object has, for example, the following structure illustrated in FIG. 36, however, alternative structures and/or functionality may optionally be used for this object and/or other objects used in the present invention:

| Name | Configure |
|---|---|
| Type | Method |
| Format | .Configure( ) |
| Description | The Configure method causes the module to prompt the user for configuration information. Each module maintains its own configuration dialog, and therefore may look different than other modules. |
| Sample Name | VCopier.InputModules(1).Configure( ) |
| Name | Default |
| Type | Property; Object of type InputModule, OutputModule, or ProcessModule |
| Format | .Default - Read Only |
| Description | The Default property identifies the default module that the Server Module will use at startup or if no other module is identified. |
| Sample Name | MyInputModule = VCopier.InputModules.Default |
| Name | ID |
| Type | Property; BSTR |
| Format | .ID- Read Only |
| Description | The ID property identifies the ProgID of a module. The ProgID can be used to derive other information about the module, including its Icon. |
| Sample Name | ModuleName = VCopier.InputModules(1).ID |
| Name | File |
| Type | Property; BSTR |
| Format | .File-Read Only |
| Description | The File property identifies the full pathname of the physical file of a module. |
| Sample Name | FileName = VCopier.InputModules(1).File |
| Name | InputModule, OutputModule, ProcessModule |
| Type | Object |
| Format | .InputModule, .OutputModule, .ProcessModule-Read Only |
| Description | The InputModule, OutputModule and ProcessModule are the individual objects maintains by the InputModules, OutputModules, and ProcessModules collections respectively. Each one of these objects has the following elements: Name ID File Configure The Name property is BSTR that is the user-readable name of the module. The ID is a BSTR that represents the ProgId of the module. The File property is a BSTR that is the full pathname of the module. The Configure method prompts the user with a dialog for configuring that module. |
| Sample Name | MyInputModule = VCopier.InputModules(2) |
| Type | InputModules, OutputModules, ProcessModules Collection of InputModule, OutputModule, and ProcessModule objects respectively |
| Format | .InputModules, .OutputModules, .ProcessModules-Read Only |
| Description | The InputModules, OutputModules, and ProcessModules collections maintain the list of available modules for each category. Each collection maintain the following information: InputModule/OutputModule/ProcessModule Default |

-continued

| | |
|---|---|
| | The first element is the individual module in the collection of modules that are available to VC. The Default object is the default module that VC uses at startup. The Server Module maintains these collections under the Modules object. |
| Sample Name | MyInputModule = VCopier.InputModules(2) |
| Name | IsLoaded |
| Type | Method, Boolean |
| Format | .IsLoaded( ) |
| Description | The IsLoaded method returns True if the module is loaded into memory, and False if it is not. |
| Sample Name | ModuleName = VCopier.InputModules(1).IsLoaded |
| Name | Load |
| Type | Method |
| Format | .Load( ) |
| Description | The Load method manually loads the module into memory. Once a module is loaded in VC it remains in memory until it is specifically unloaded using the Unload method, or the program exits. |
| Sample Name | ModuleName = VCopier.InputModules(1).Load |
| Name | Name |
| Type | Property, BSTR |
| Format | .Name-Read Only |
| Description | The Name property identifies the user-readable name of a module. This name can be used in a list box for a user to select the module. |
| Sample Name | ModuleName = VCopier.InputModules(1).Name |
| Name | ResetSettings |
| Type | Method |
| Format | .ResetSettings( ) |
| Description | The ResetSettings method returns the settings of the module back to its original state when the VC first called it. A user can change the settings of a module when it is configured. This method is used to role back changes made bu a user during the VC session. To save the settings between sessions, use the SaveSettingsAsDefault method. |
| Sample | ModuleName = VCopier.InputModules(1).ResetSettings( ) |
| Name | SaveSettingsAsDefault |
| Type | Method |
| Format | .SaveSettingsAsDefault( ) |
| Description | The SaveSettingsAsDefault method save any changes to the settingst the user has done during the session to disk so that they become the new settinsg. |
| Sample | ModuleName = VCopier.InputModules(1).ResetSettings( ) |
| Name | Unload |
| Type | Method |
| Format | .UnLoad( ) |
| Description | The Unload method manually unloads the module from memory. Once a module is loaded in VC it remains in memory until it is specifically unloaded using the Unload method, or the program exits. |
| Sample | ModuleName = VCopier.InputModules(1).Unload( ) |

Figure 37:
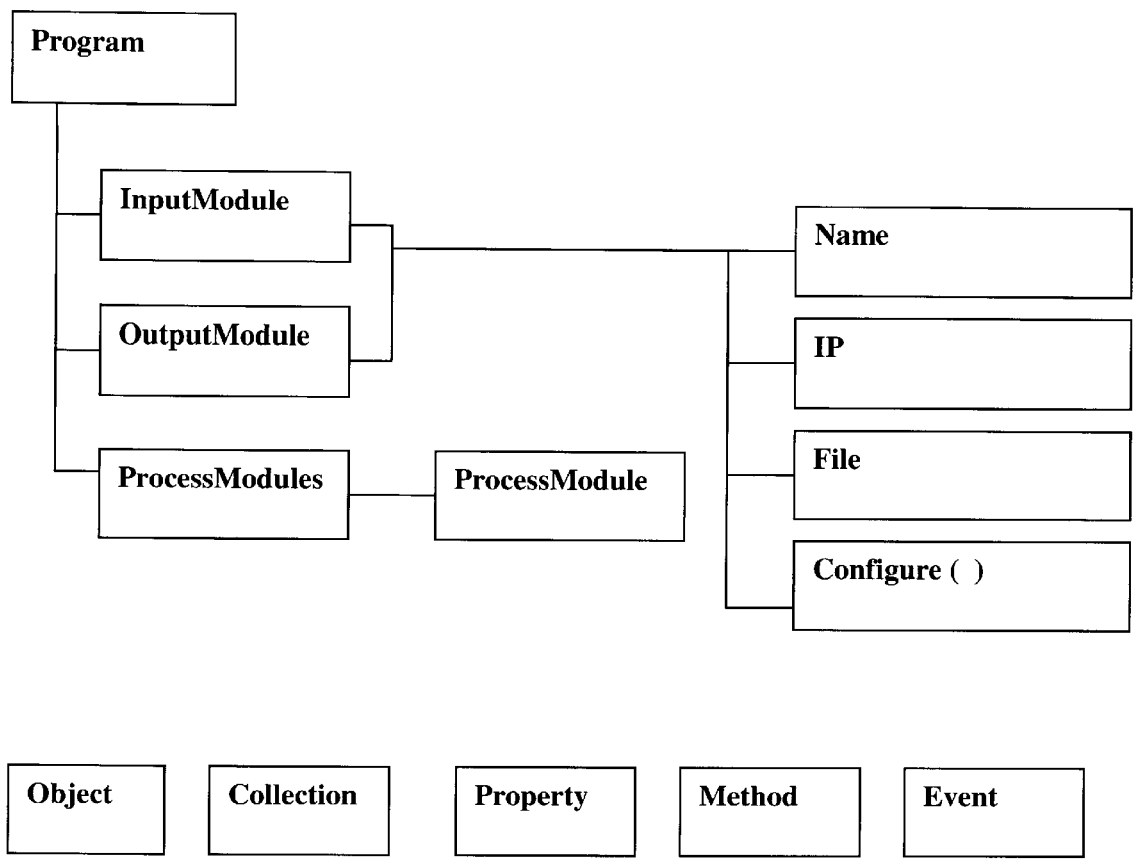
FIG. 37 is an illustration of the structure of the Program Object.

The Program Object maintains the currently selected Input, Output, and Process Modules. It is generally set by the Client Module based on input from a user. However, in applications that do not have a user interface the program object can be used to directly set the modules to run VC. The Program Object has the following structure illustrated in FIG. 37.

Figure 38:
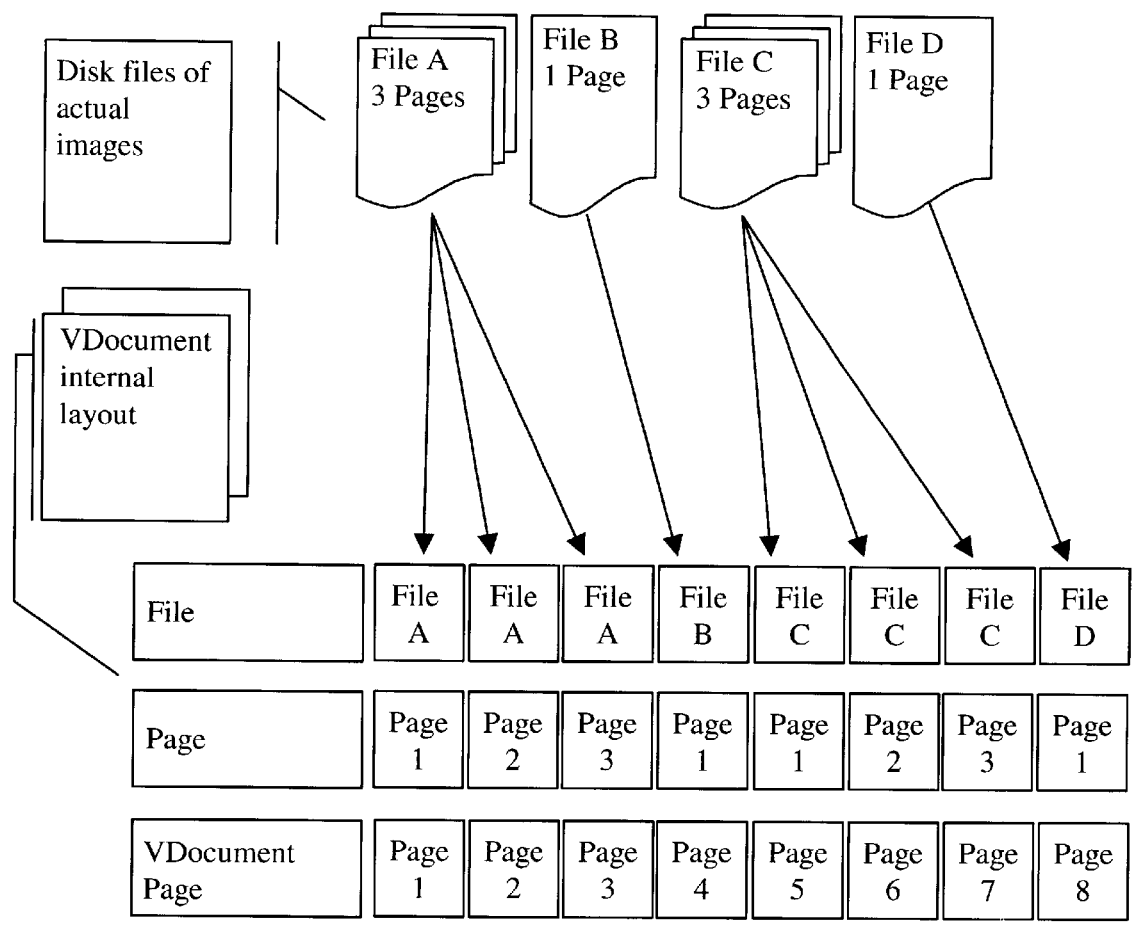
FIG. 38 is an illustration of the internal VDocument mapping to physical files.

All elements of the Program Object are defined in the Modules Object section. The VDocument Object maintains information about the current document being copied. The VDocument represents a virtual document rather than a physical one. It is designed to allow the flexible management of multi-image files that together constitute an document. The internal VDocument maps to physical files as illustrated in FIG. 38.

Figure 39:
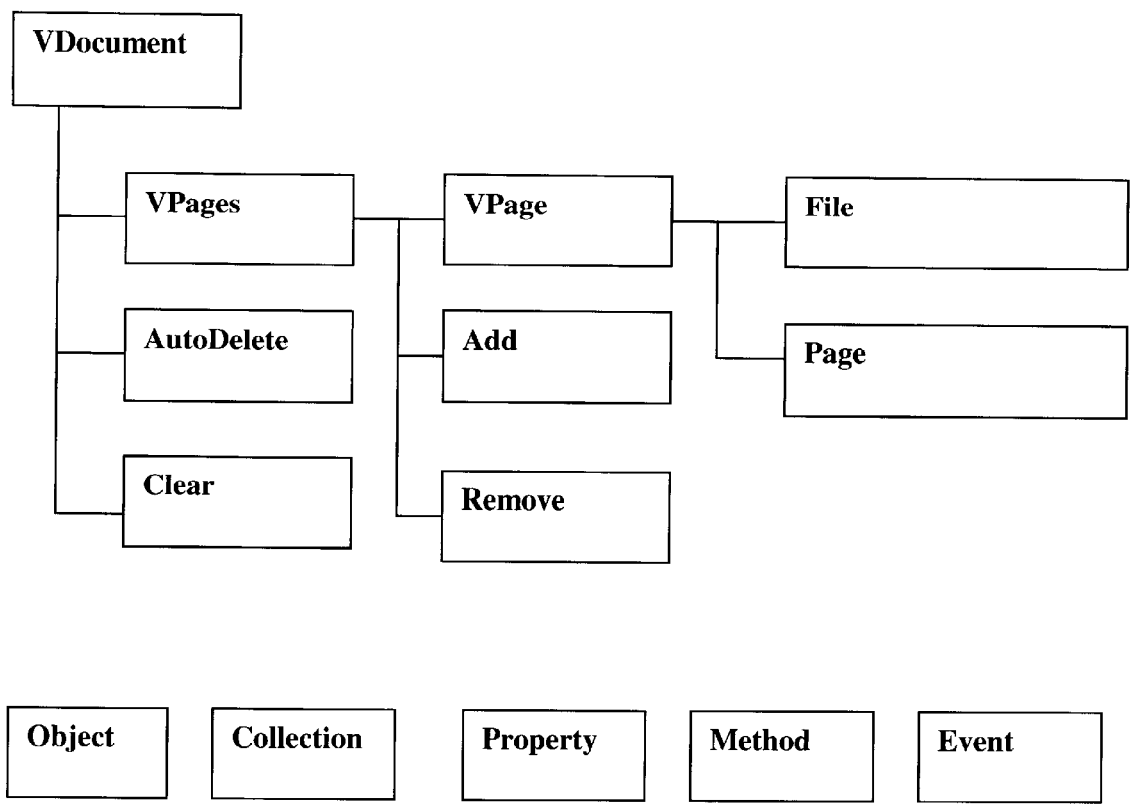
FIG. 39 is an illustration of the VDocument Object.

The VDocument Object calculates the total number of pages of all the files associated with it, and lays out each page of each document in a single virtual document. As the figure illustrates, if 4 files contain a total of 8 pages, then VDocument considers this an 8 page document. If the 6$^{th}$ page is requested, VDocument will return the second page of File C in the above figure. This enables VDocument to handle single page files that together constitute a document (as is the case with many of the new digital copiers), or a single multi-page image file, or any combination of the two. The VDocument Object is illustrated in FIG. 39 and below.

| Name | Add |
|---|---|
| Type | Method |
| Format | .Add(BSTR File, Long Page) |
| Description | The Add method is used to add a page to the VPages collection. The two arguments File and Page represent the disk file and the page number to associate with the new page in VPages. One page of one file is added at a time using this method. |
| Sample | VDocument.Add(FileA, 2) |
| Name | AutoDelete |
| Type | Property, Boolean |
| Format | .AutoDelete |
| Description | The AutoDelete property lets the Server Module know whether to delete the files once the virtual copy operation is completed. When set to True the Server Module will delete the physical disk files maintained in Vdocument either before the next virtual copy operation, or when VC is shut down. When set to False Vdocument is cleared of its contents between virtual copy operations, but the actual files are not deleted from the disk. In general if the VDocument object points to existing files then AutoDelete should be set to False. If the VDocument object points to temporary files, then AutoDelete should be set to True so that the disk files are cleaned up (i.e. deleted) by the Server Module. By default AutoDelete is set to False. |
| Sample | VCopier.VDocument.AutoDelete = True |
| Name | Clear |
| Type | Method |
| Format | .Clear( ) |
| Description | The Clear method is used to empty the contents of the Vdocument object. The VPages object is emptied and the reference to files are deleted in conformance with the AutoDelete property. |
| Sample | VDocument.Clear( ) |
| Name | File |
| Type | Property, BSTR |
| Format | .File |
| Description | The File property of the VPage object points to the disk file that contains the image associated with the VPage page. |
| Sample | MyFile = VDocument.VPages(2).File |
| Name | Page |
| Type | Property, Long |
| Format | .Page |
| Description | The Page property of the VPage object points to the image offset into the disk file that contains the image associated with the VPage page. |
| Sample | MyPage = VDocument.VPages(2).Page |
| Name | Remove |
| Type | Method |
| Format | .Remove( ) |
| Description | The Remove method is used to remove a page from the VPages collection. The single argument Index is the offset page into the VPages collection. |
| Sample | VDocument.VPages(2).Remove( ) |
| Name | Vpage |
| Type | Object |
| Format | .Vpage |
| Description | Each VPage object represents a single virtual page in the VDocument object. Each VPage object contains the name of the file that contains its virtual page in the .File propety, and a .Page property which is the page offset in the image file. |
| Sample | MyPage = VCopier.VPages(2) |
| Name | Vpages |
| Type | Collection of Page objects |
| Format | .Vpages |
| Description | The VPages collection contains one VPage object per virtual page. Each page of each image file that is tracked by VDocument is considered a unique page, and its information is maintained by a VPage object. |
| Sample | MyPage = VCopier.VPages(2) |

The Server Module supports simple methods that accomplish the basic copier functionality of go, cancel, and reset. The Server Modules has the following structure:

| Name | Cancel |
|---|---|
| Type | Method |
| Format | .Cancel( ) |
| Description | The Cancel method is used to cancel the currently running virtual copy operation. The Cancel method can only be used once the Go method is called and prior to its completion. |
| Sample | VCopier.Cancel( ) |
| Name | Go |
| Type | Method |
| Format | .Go( ) |
| Description | The Go method is used to initiate a virtual copy operation. It calls the modules in the following sequence: Program.InputModule, Program.ProcessModules, and then Program.OutputModule. The virtual copy operation can be cancelled prior to its completion by calling the Cancel method. |
| Sample | VCopier.Go( ) |
| Name | Reset |
| Type | Method |
| Format | .Reset( ) |
| Description | The Reset method is used to clear the contents of the Program object. After calling the Reset method VC is considered to have no assigned Input and Output modules selected. The modules that are reset are not unloaded from memory. |
| Sample | VCopier.Reset( ) |

The are two events that the Server Module supports: Error and Status. The Error event is generated anytime any of the Modules produce an error condition. The Status event is generated when information needs to be transferred between the IOP or Server Modules and the Client Module.

Figure 40:
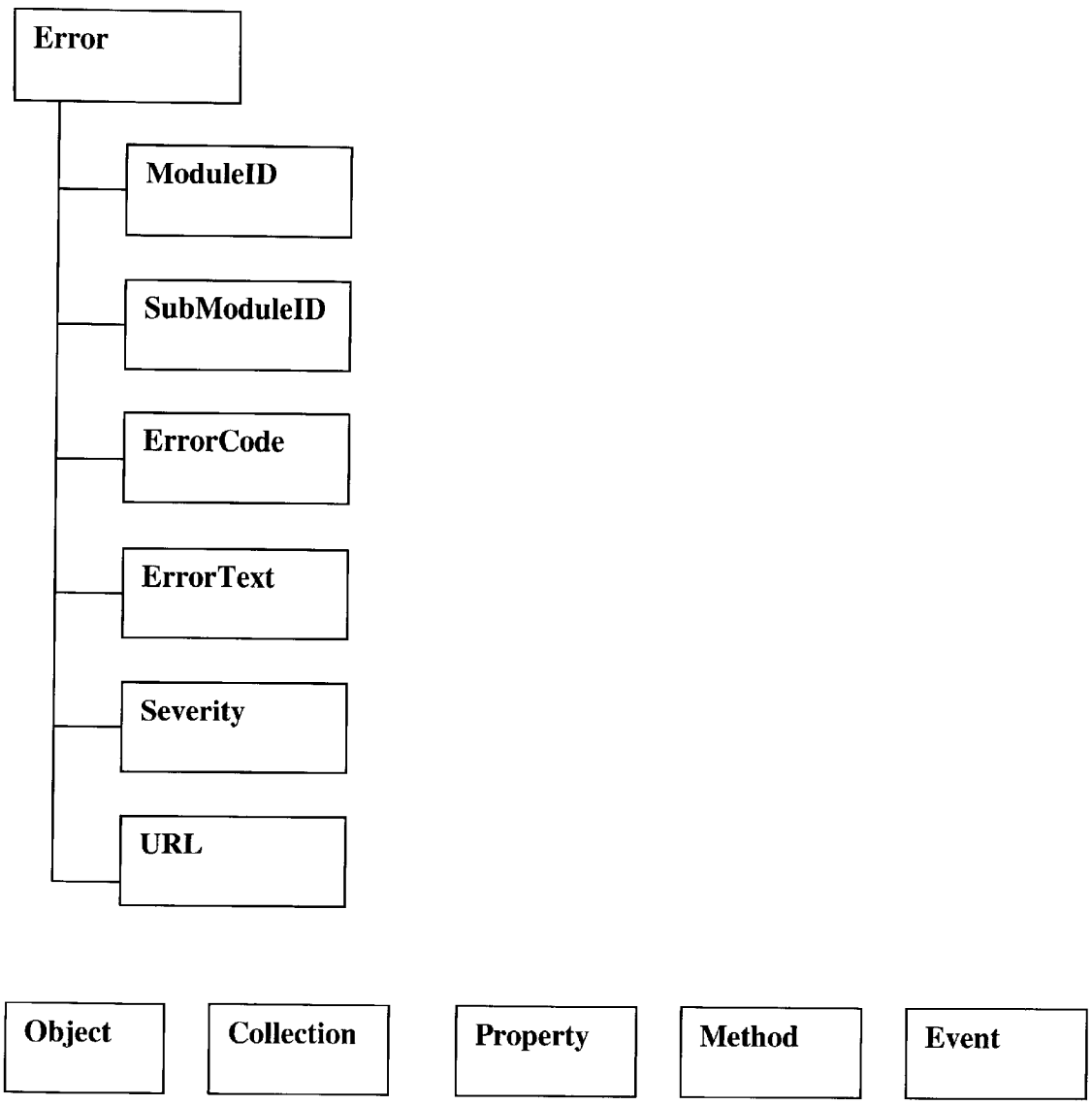
FIGS. 40 and 41 are illustrations of two events that the Server Module supports: Error and Status, the Error event being generated anytime any of the Modules produce an error condition, and the Status event being generated when information needs to be transferred between the IOP or Server Modules and the Client Module.
Figure 41:
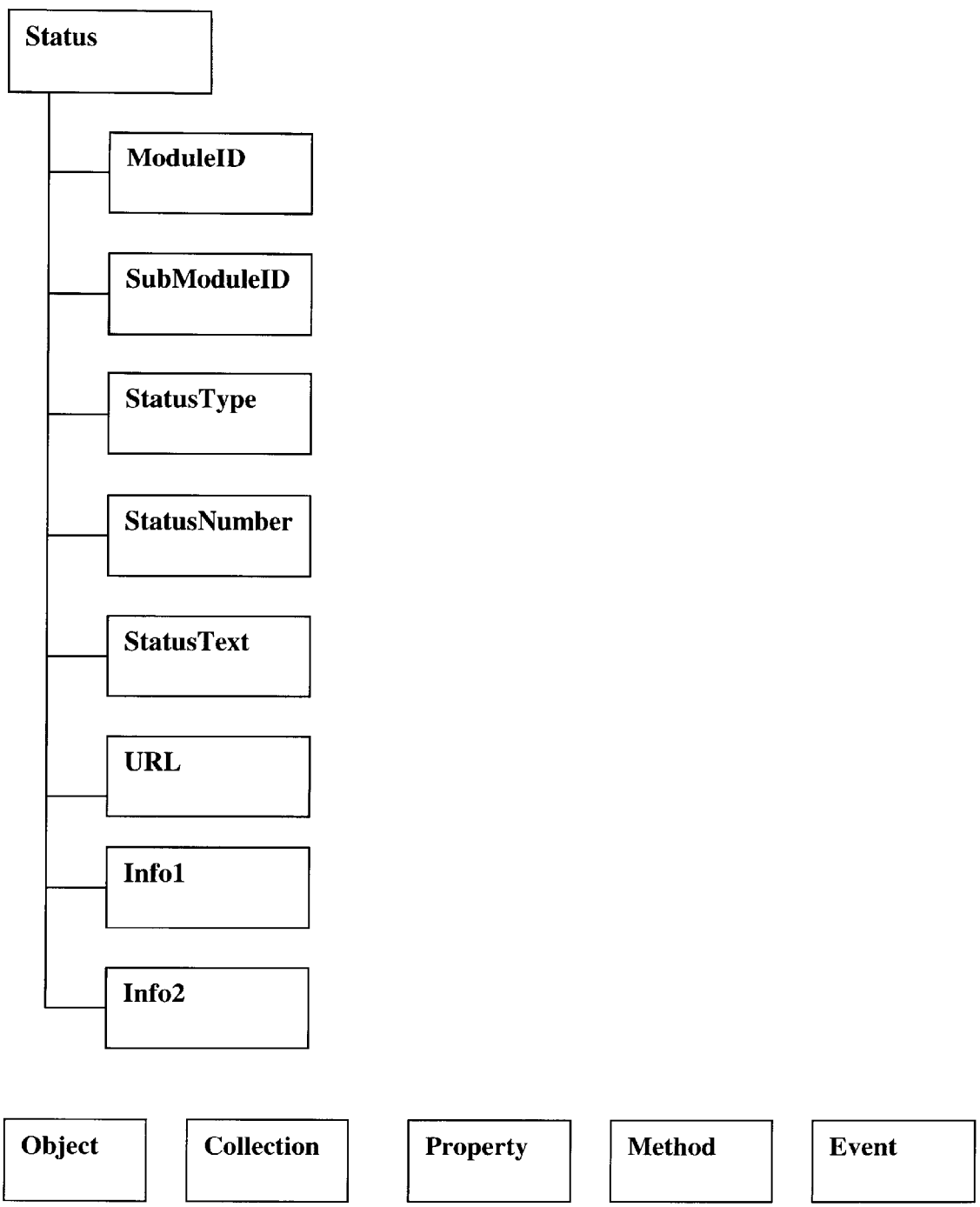

The following are details for each event, illustrated in FIGS. 40 and 41 and below.

| Name | Error |
|---|---|
| Type | Event |
| Format | .Error( . . . ) |
| Description | The Error event is triggered whenever there is an error by one of the modules. The error can be trapped and displayed or processed by the Client Module. |
| Sample Name | ErrorCode |
| Type | Argument, Long |
| Format | .ErrorCode |
| Description | The ErrorCode argument of the Error event identifies the actual error code. There are no predefined error codes for all modules. Each module produces its own set of error codes. |
| Sample Name | ErrorText |
| Type | Argument, BSTR |
| Format | .ErrorText |

-continued

| | |
|---|---|
| Description | The ErrorText argument of the Error event identifies the actual error text. There are no predefined error texts for all modules. Each module produces its own text for its error codes. |
| Sample Name | ModuleID |
| Type | Argument, BSTR |
| Format | .ModuleID |
| Description | The ModuleID argument of the Error event identifies the source of the error condition. The ModuleID is defined as the version-dependent ProgID. |
| Sample Name | Severity |
| Type | Argument, Long |
| Format | .Severity |
| Description | The Severity argument of the Error event identifies the level of error condition. The following levels are currently implemented:<br>1-Severe<br>2-Warning |
| Sample Name | SubModuleID |
| Type | Argument, BSTR |
| Format | .SubModuleID |
| Description | The SubModuleID argument of the Error event identifies the secondary source of the error condition. The SubModuleID can defined as the version-dependent ProgID, or any other value determined by the Module that generates the error condition. |
| Sample Name | URL |
| Type | Argument, BSTR |
| Format | .URL |
| Description | The URL argument of the Error event identifies the URL address (web site, HTML file, or resource file URL), that contains the HTML representation of the error condition. The information presented can be more dynamic as well as formatted than the ErrorText argument. |
| Sample Name | Info1, Info2 |
| Type | Argument, Variant |
| Format | .Info1, .Info2 |
| Description | The Info1 and Info2 arguments of the Status event are placeholders for additional information that needs to be supplied with specific status numbers. |
| Sample Name | Status |
| Type | Evenet |
| Format | .Status( . . . ) |
| Description | The Status event is trigerred by any of the modules when there is information that needs to be relayed to the user or the Client Module. |
| Sample Name | StatusNumber |
| Type | Argument, Long |
| Format | .StatusNumber |
| Description | The StatusNumber argument of the Status event identifies the actual status code. The values between 1 and 1000 are private and cannot be generated by an IOP Module for private use. Any other status numbers are open for private IOP Module use. |
| Sample Name | StatusText |
| Type | Argument, BSTR |
| Format | .StatusText |
| Description | The StatusText argument of the Status event identifies the actual status text. |
| Sample Name | StatusType |
| Type | Argument, BSTR |
| Format | .StatusType |
| Description | The StatusType argument of the Status event identifies the type of status. |

-continued

1 - Informational
2 - Instruction
Sample

Figure 42:
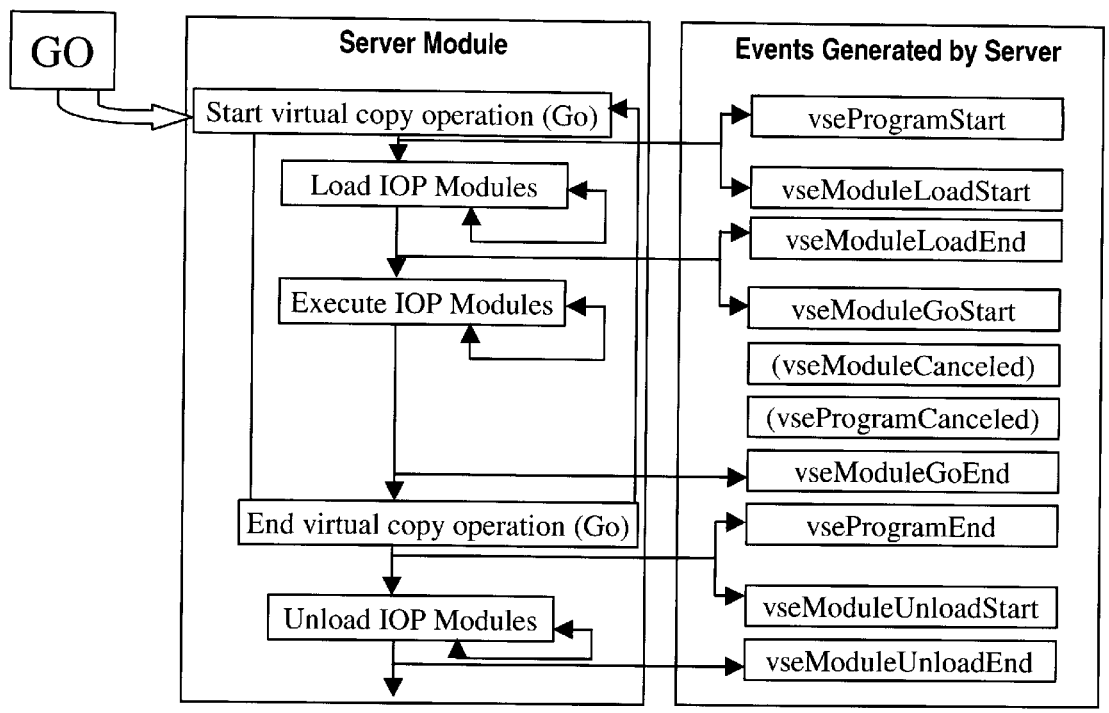
FIG. 42 is an illustration of a general workflow of the events that are generated that manage the flow of modules and user interaction with the Server Module.

The Server Module broadcasts the Status event to the Client Module. There are standard status events that the Server Module generates which the Client Module can rely on. These are the events that manage the flow of modules and user interaction with the Server Module. The following is a general workflow of the events that are generated is illustrated in FIG. 42.

| StatusNumber | StatusText | Description |
|---|---|---|
| | VseModuleCanceled | The IOP Module canceled the operation by setting the Cancel argument in the Feedback.Error or Feedback.Status methods to True |
| | VseModuleConfigureEnd | The IOP Module has completed presenting its configuration dialog |
| | VseModuleConfigureStart | The IOP Module has started presenting its configuration dialog |
| | VseModuleGoEnd | The IOP Module has ended executing |
| | VseModuleGoStart | The IOP Module has started executing |
| | VseModuleLoadEnd | The IOP Module has completed loading |
| | VseModuleLoadStart | The IOP Module has started loading |
| | VseModuleUnloadEnd | The IOP Module has completed unloading |
| | VseModuleUnloadStart | The IOP Module has started unloading |
| | VseProgramCanceled | The Server Module has canceled executing (using the .Cancel method) |
| | VseProgramEnd | The Server Module has ended executing |
| | VseProgramStart | The Server Module has started executing a Go operation |

The Client Module presents to the user information regarding the copy process, and initiates the virtual copy through the Server Module. The Client Module can be a GUI that Imagination Software develops, or a third-party application that directly communicates with the Server Module. The goal of the Client Module is to capture sufficient information and pass that information along to the Server Module in order to initiate a single virtual copy.

Figure 43:
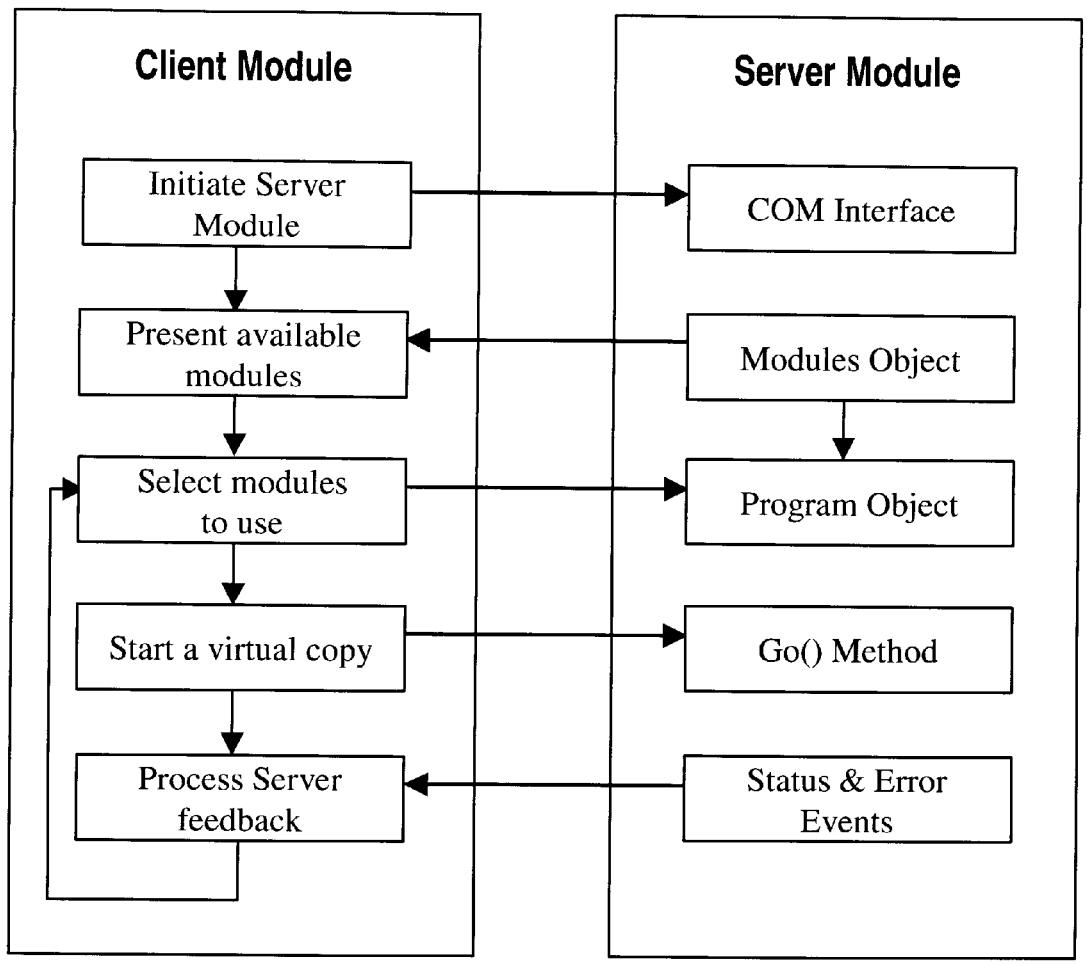
FIG. 43 is an illustration of the general logic flow of the Client Module.

The Client Module follows the following general logic flow illustrated in FIG. 43. The first step for the Client Module is to determine that the Server Module exists, and to successfully launch the Server Module. This is done using a standard COM interface.

If the Client Module is a GUI then it can present icons and the names of all the available Input, Output, and Process Modules for the user to select. The Client Module does not need to know any information about these modules. All names and ProdId's are available from the Server Module API using the Modules Object.

If the user selects a new Input or Output module, the Client Module updates the appropriate Program.InputModule, Program.OutputModule, or Program. Process Modules object available on the Server Module.

At any time the Client Module can initiate the Go method of the Server Module. This is a synchronous process—once the Go method is initiated the only way to stop it is to call the Cancel method. Only one Go method can be called at a time, and it must run to completion before another one is called.

During the virtual copy, the Server Module will send back Status and Error events that should be processed and displayed (if there is a GUI) by the Client Module. The only requirement for a Client Module is that it at least substantially conforms to the interface described in the Server Module section. The architecture described in this section, and its associated sample source code, is designed to facilitate development of Client Modules by third parties. It should be used as a guide for developing a Client Module—it is not the only way a Client Module can be designed.

Figure 44:
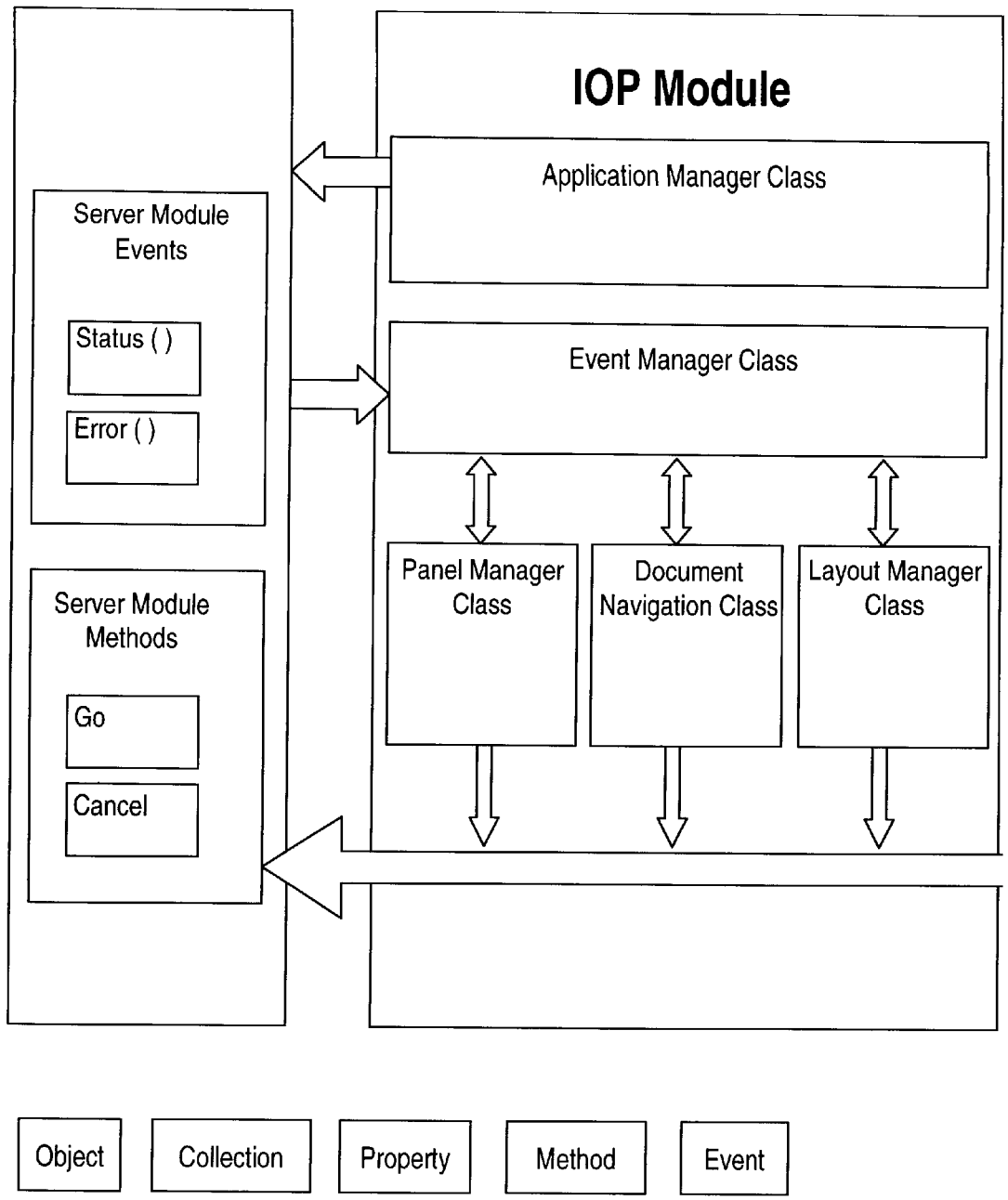
FIG. 44 is an illustration of the basic Client architecture.

The internal architecture described below is generally independent from the interface requirements for a Client Module. The Client interface must be implemented regardless of whether or not the Client is designed with the architecture described in this section. The basic Client architecture is illustrated in FIG. 44.

The Input, Process, and Output ("IOP") Modules extend VC by enabling specialized hardware and software to interact with VC. Each IOP Module understands the input, output, or processing capabilities of a specific technology, as well as how to communicate with the Server Module. In this way an IOP Module can read or write images to and from any device or software application while still being managed by the Server Module. To the user of VC, interacting with any device or software application is the same.

The IOP Modules share a common API to facilitate communication with each other, with the Server Module, as well as with third-party programs. The interface is based on COM. Both the Server Module as well as third-party applications can communicate with the Input, Process, and Output Modules using the specified COM interface. Additionally, third-party vendors can create their own versions of the Input, Process, and Output Modules as long as they conform to the specified COM interface.

The following are the main functions of the Input, Process, and Output ("IOP") Modules:

Respond to Server Module Go( ) Method—The Server Module calls the other modules using a COM-based Go( ) method. All necessary information regarding the virtual copy operation is passed along using arguments of the Go( ) method. The IOP module can then handle its internal operation independent of any other module.

Generate Status & Error Feedback—The IOP module should let the Server Module know its progress, error conditions, or any other useful process or userbased information.

Initiate Communication With the Server Module—The IOP Module can at any time initiate communication with the Server Module to provide new information. This enables the IOP Module to pole the device or software application that it is linked to, and convey that information back to the Server Module.

Figure 45:
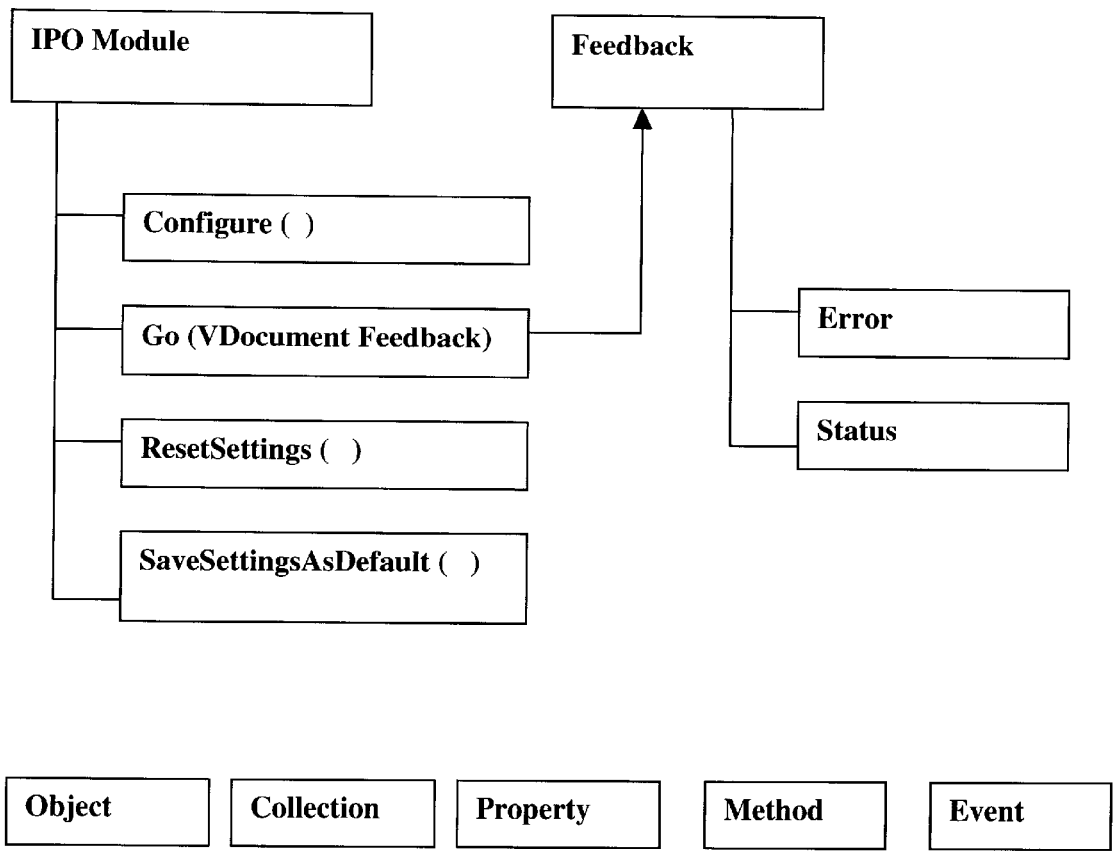
FIG. 45 is an illustration of the API for the Input, Process, and Output Modules that are made simple so that third-party vendors can create their own custom versions of these modules with relative ease.

The API for the Input, Process, and Output Modules are deliberately made simple so that third-party vendors can create their own custom versions of these modules with relative ease. The API, illustrated in FIG. 45, consists of the following COM-based interface:

Go(VDocument, Feedback)—This is the single method that initiates a module to complete its phase of the virtual copy. The Go( ) method is called by the Server Module when it is ready to execute the functionality of the module. The two parameters are the VDocument object, which contains the information about the current document being copied. The module can update the VDocument with additional images, as is typical of an Input Module, or simply read and process the document, as is typical of an Output Module. The second parameter is a Feedback object, which contains the two events that the IOP module can generate back to the Server Module.

| | |
|---|---|
| Name | Configure |
| Type | Method |
| Format | .Configure( ) |
| Description | The Configure method causes the module to prompt the user for configuration information. Each module maintains its own configuration dialog, and therefore may look different than other modules. |
| Sample | MyInputModule.Configure( ) |
| Name | Go |
| Type | Method |
| Format | .Go(VDocument, Feedback) |
| Description | The Go method is called by the Server Module to initiate the IOP module to execute its part of the virtual copy operation. The Vdocument Object is passed along as an argument so that the IOP module can add to or read the current document that is being processed. Refer to the Server Module section for a complete description of the VDocument object. The second parameter of the Go method is a Feedback object. The Feedback object enables the IOP module to send status and error updates back to the Server Module. These events are also described in the Server Module section. |
| Sample | IOP.Go(VDocument, Feedback) |
| Name | ResetSettings |
| Type | Method |
| Format | .ResetSettings( ) |
| Description | The ResetSettings method returns the settings of the module back to its original state when it was first called. A user can change the settings of a module when it is configured. This method is used to role back changes made by a user during the VC session. To save the settings between sessions, use the SaveSettingsAsDeafult method. |
| Sample | MyInputModule.ResetSettings( ) |
| Name | SaveSettingsAsDefauft |
| Type | Method |
| Format | .SaveSettingsAsDefault( ) |
| Description | The SaveSettingsAsDefault method save any changes to the settings the user has done during this session to disk so that they become the new settings. |
| Sample | MyInputModule.ResetSettings( ) |

Figure 46:
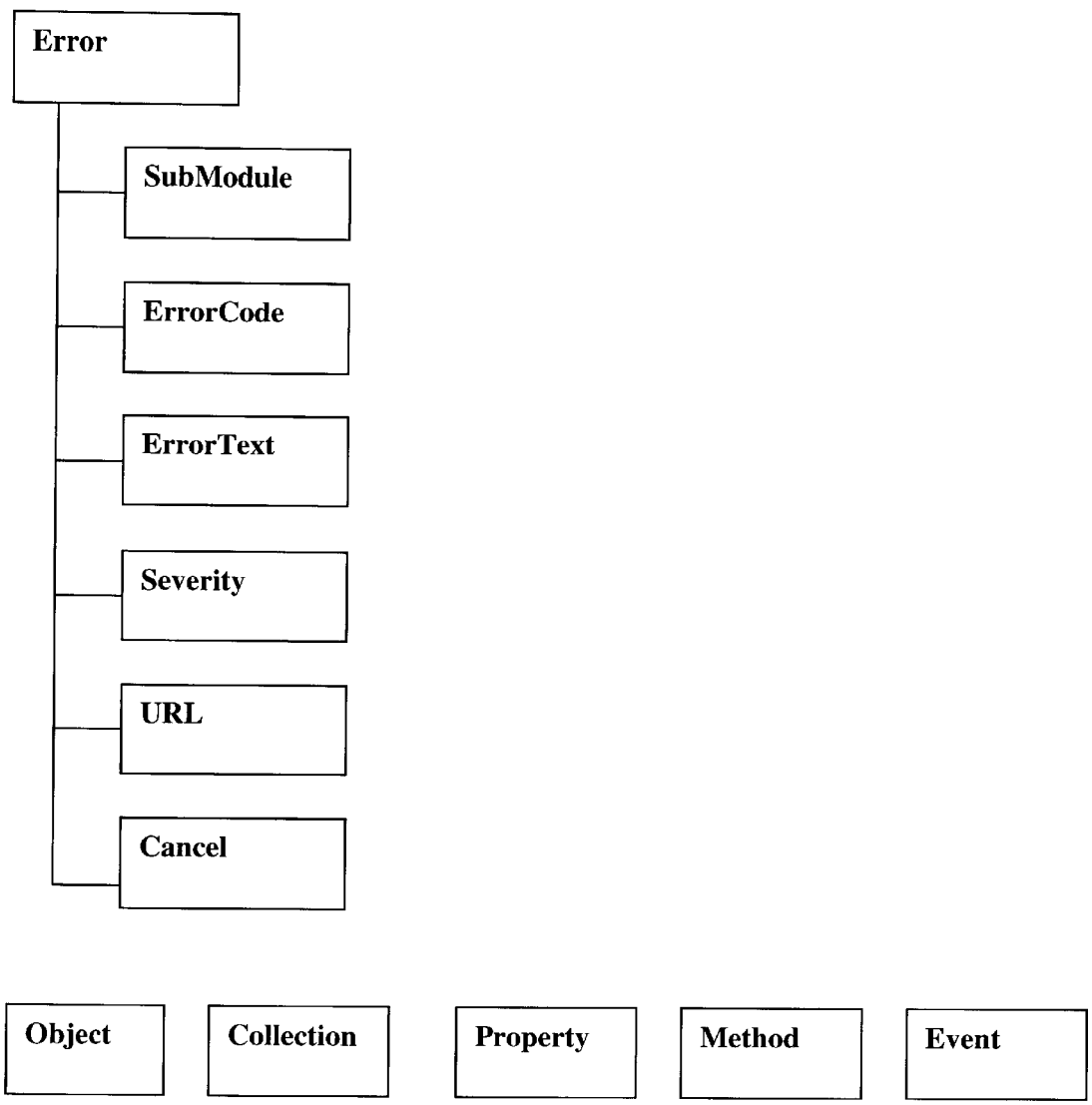
FIGS. 46–47 are illustrations of the Feedback object used to communicate between the IOP and the Server Module.
Figure 47:
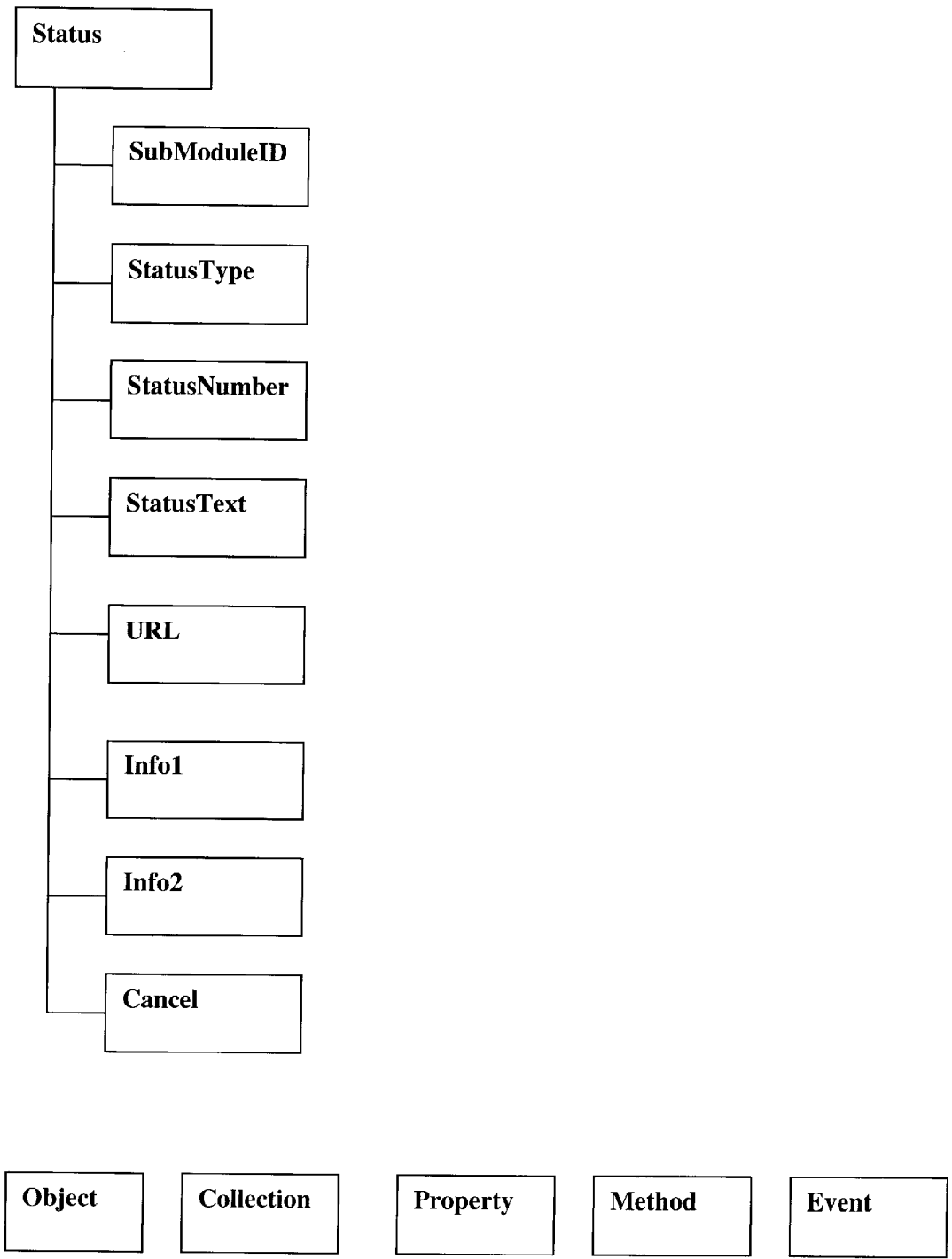

The Feedback object illustrated in FIGS. 46–47 is used to communicate between the IOP and the Server Module. The Feedback object supports two methods that are used like events. The purpose of this mechanism is to limit the communication between the IOP and the Server Module to just those objects presented to the IOP Module by the Server Module through the Go method. In this way the IOP Module is handed all the information it needs to execute its part of a copy operation.

The Feedback object contains two methods: Error and Status. The Error event is used to respond back to the Server Module all error conditions. The Status method is used to communicate back to the Server Module all information updates, such as progress.

The following are details for each of these methods:

| | |
|---|---|
| Name | Cancel |
| Type | Argument, Boolean Reference |
| Format | .Cancel |
| Description | The Cancel argument of the Error method is used to establish whether the Server Module will continue with the virtual copy operation once this IOP is completed. If set to True then the Server Module will not continue its cirtual copy operation. The Server Module will wait until the IOP Module returns on its own. The Server Module does not shut down the IOP Module. |
| Sample | |
| Name | Error |
| Type | Method |
| Format | .Error( . . . ) |
| Description | The Error event is triggered whenever there is an error by one of the modules. The error can be trapped and displayed or processed by the Client Module. |
| Sample | |
| Name | ErrorCode |
| Type | Argument, Long |
| Format | .ErrorCode |
| Description | The ErrorCode argument of the Error event identifies the actual error code. There are no predefined error codes for all modules. Each module produces its own set of error codes. |
| Sample | |
| Name | ErrorText |
| Type | Argument, BSTR |
| Format | .ErrorText |
| Description | The ErrorText argument of the Error event identifies the actual error text. There are no predefined error texts for all modules. Each module produces its own text for its error codes. |
| Sample | |
| Name | Severity |
| Type | Argument, Long |
| Format | .Severity |
| Description | The Severity argument of the Error event identifies the level of error condition. The following levels are currently implemented:<br>1 - Severe<br>2 - Warning |
| Sample | |
| Name | SubModuleID |
| Type | Argument, BSTR |
| Format | .SubModuleID |
| Description | The SubModuleID argument of the Error event identifies the secondary source of the error condition. The SubModuleID can defined as the version-dependent ProgID, or any other value determined by the Module that generates the error condition. |
| Sample | |
| Name | URL |
| Type | Argument, BSTR |
| Format | .URL |
| Description | The URL argument of the Error event identifies the URL address (web site, HTML file, or resource file URL), that contains the HTML representation of the error condition. The information presented can be more dynamic as well as formatted than the ErrorText argument. |
| Sample | |
| Name | StatusText |
| Type | Argument, BSTR |
| Format | .StatusText |
| Description | The StatusText argument of the Status event identifies the actual status text. |
| Sample | |
| Name | StatusType |
| Type | Argument, BSTR |
| Format | .StatusType |
| Description | The StatusType argument of the Status event identifies the type of status.<br>1 - Informational<br>2 - Instruction |
| Sample | |

The only requirement for an IOP Module is that it substantially conforms to the interface described earlier. The architecture described in this section, and its associated sample source code, is designed to facilitate development of IOP Modules by third parties. It should be used as a guide for developing an IOP Module—it is not the only way an IOP Module can be designed.

Figure 48:
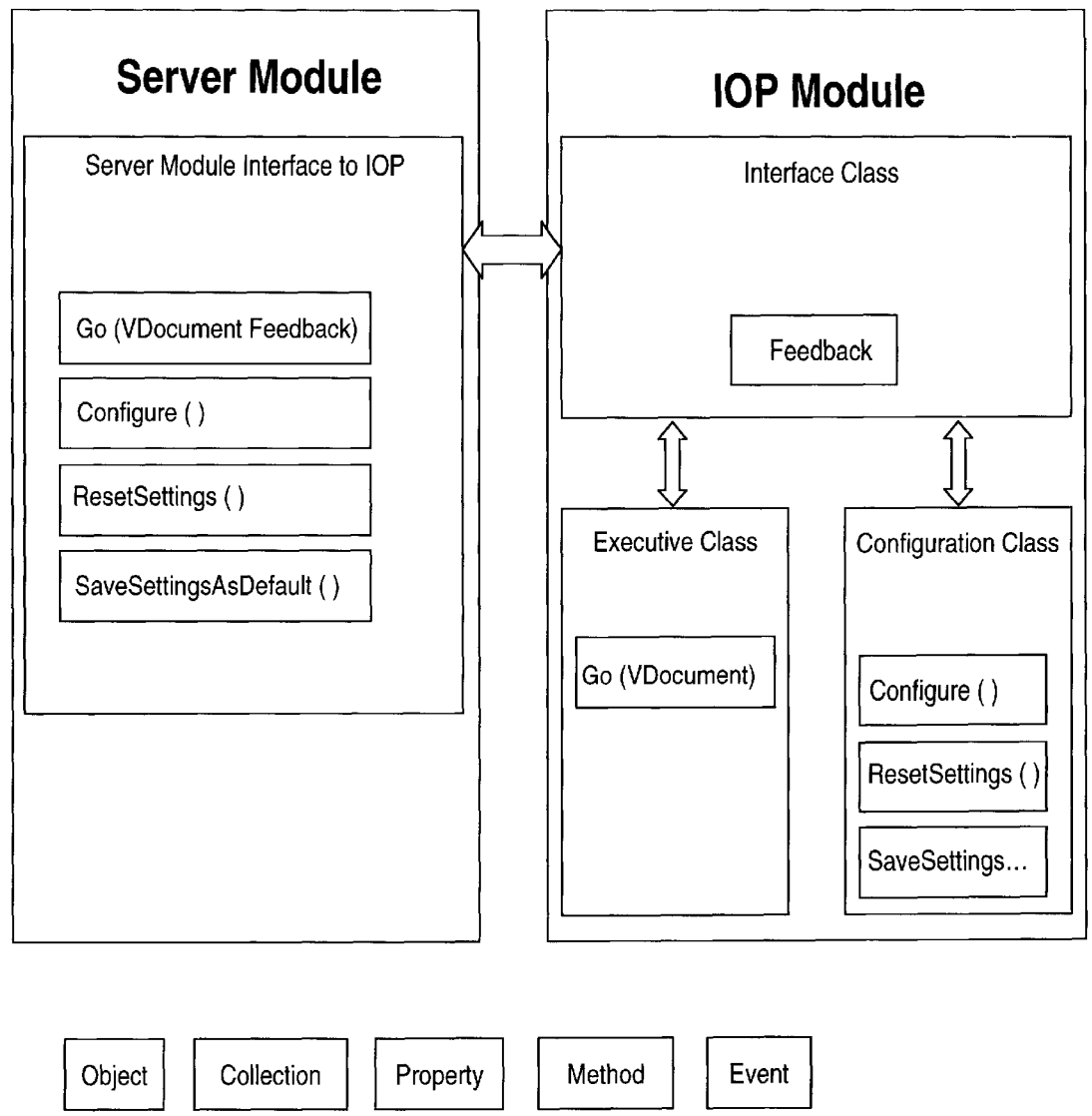
FIG. 48 is an illustration of the basic IOP architecture.

The internal architecture described below is independent from the interface requirements for an IOP. The IOP interface must be implemented regardless of whether or not the IOP is designed with the architecture described in this section. The basic IOP architecture is illustrated in FIG. 48.

The IOP Module has a fixed set of features that it needs to perform:
  Interface with the Server Module
  Execute its operation when its Go( ) method is called
  Respond to requests by the Server Module to configure its settings Although any IOP Module that meets the IOP API requirements specified earlier will function properly, the proposed architecture simplifies the development of IOP Modules and ensures greater flexibility.

The internal Interface class has two purposes:
  Communicate with the Server Module
  Marshall requests to, from, and between the Execute and Configuration classes In order to communication with the Server Module the Interface class must support the COM protocol. All modules within VC communicate via COM. This class should be created with the exact API specified earlier. Additionally, the Interface class should maintain the Feedback object passed in by the Server Module's Go method. This way all communication to the Feedback object will be handled by the Interface class, rather than by the Execute or Configuration classes.

The primary purpose of the Execute class is to execute the Go method when it is called by the Server Module. This is the core functionality of the IOP Module. Each IOP Module will have its own mechanism for executing its part of a virtual copy operation.

Any configuration information is assumed to have been passed to the Execute class by the time it is being called. Since the Execute class does not directly communicate with the Configuration class, any information that needs to be shared between the two classes must be coordinated by the Interface class.

The Configuration class maintains all the configuration data necessary for the IOP Module to operate. This includes responding to the Server Module to:
  Prompt the user with a Configuration dialog
  Save the current configuration information to persistent storage
  Restoring the last saved configuration information from persistent storage Since the IOP Module is entirely responsible for these activities, any programming method that accomplishes these tasks is legitimate.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, while the above discussion has separated the various functions into separate layers of functionality, the layers may be combined, physically and/or logically, and various functions may be combined together. While combining various functions into same or common layers may make implementation details more cumbersome, nevertheless, the functions described herein may still be accomplished to advantageously provide some or all of the benefits of the invention described herein.

Further, as indicated herein, the present invention may be used to automate and/or manually expedite the migration of a program specific Application Programmer Interface from an original state into a generic interface by building an object for each engine. The object advantageously provides substantially uniform access to the engine and engine settings associated with the engine. The present invention amy be applied across a broad range of programming languages that utilize similar concepts as described herein.

I claim:

1. A computer data management system including at least one of an electronic image, graphics and document management system capable of transmitting at least one of an electronic image, electronic graphics and electronic document to a plurality of external destinations including one or more of external devices and applications responsively connectable at least one of locally and via the Internet, comprising:

at least one memory storing a plurality of interface protocols for interfacing and communicating;

at least one processor responsively connectable to said at least one memory, and implementing the plurality of interface protocols as a software application for interfacing and communicating with the plurality of external destinations including the one or more of the external devices and applications, wherein said software application comprises at least one of:

at least one input module managing data comprising at least one of paper and electronic paper input to the computer data management system, and managing at least one imaging device to input the data through at least one of a scanner and a digital copier, and managing the electronic paper from at least one third-party software applications; and at least one module communicable with said at least one input, output, client, and process modules and external applications, and capable of dynamically combining the external applications with at least one of digital capturing devices and digital imaging devices.

2. A computer data management system according to claim 1, wherein the one or more of the external devices and applications include a printer, a facsimile, and a scanner.

3. A computer data management system according to claim 1, wherein the computer data management system includes the capability to integrate an image using software so that the image gets seamlessly replicated and transmitted to at least one of other devices and applications, and via the Internet.

4. A computer data management system according to claim 1, wherein the computer data management system includes the capability to integrate the electronic images into a destination application without the need to modify the destination application.

5. A computer data management system according to claim 1, wherein the computer data management system includes an interface that enables copying images between physical devices, applications, and the Internet using a single "GO" operation.

6. A computer data management system according to claim 1, wherein the computer data management system includes the capability of adding at least one of electronic document and paper processing with a single programming step.

7. A computer data management system according to claim 1, wherein the software application comprises:

at least one output module managing the data output from the computer data management system, managing at least one imaging device to output the data to at least one of a standard Windows printer, an image printer, and a digital copier, and managing the output of the data to the third-party software application;

at least one process module applying at least one data processing to the data comprising the at least one of the paper and the electronic paper as it is being copied, applying additional functionality including at least one of workflow and processing functionality to the data comprising the at least one of paper and electronic paper as it is being copied, and applying multiple processes to a single virtual copy; and at least one client module presenting the data comprising the at least one of paper and electronic paper as it is being copied, and information related to at least one of the input and output functions.

8. A computer data management system according to claim 1, wherein the one or more of the external devices and applications integrates the computer data management system into an external application via one of running the computer data management system, as an external service and embedding the computer data management system as an embedded service.

9. A computer data management system according to claim 7, wherein the server module includes:

enable virtual copy operation means for initiating, canceling, and resetting said computer data management system;

maintain list of available module means for maintaining a registry containing a list of said input, output, and process modules that can be used in said computer data management system, said list being read on startup, and maintaining another copy of said list in a modules object accessible by said input, output, client, process and server modules;

maintain currently active modules means for maintaining said input, output, and process modules currently being used for a current computer data management system copy operation in a program object, and saving the currently active modules in a process template file; and maintain complete document information means for maintaining information regarding a current file being copied, and saving the information in a document template file.

10. A computer data management system according to claim 7, wherein the server module includes at least one server module application programmer interface (API).

11. A computer data management system according to claim 10, wherein the at least one server module application programmer interface (API) comprises the following COM-based interfaces:

at least one modules object maintaining a first list of available input, output, and process modules;

at least one program object maintaining a second list of currently selected input, output, and process modules;

at least one document object maintaining information regarding a current document being copied;

at least one system management method object used to initiate, cancel, and reset said computer data management system;

at least one system management event object used to provide feedback to the Client Module.

12. A computer data management system including at least one of an electronic image, graphics and document management system capable of transmitting at least one of an electronic image, electronic graphics and electronic document to a plurality of external destinations including one or more of external devices and applications responsively connectable at least one of locally and via the Internet, wherein the system comprises:

(a) single function copy operation linking devices, applications and the internet including at least one a go operation, a single function paper copy between devices and software applications, and a single function paper copy between software applications and devices;

(b) a one step programming method to add paper support to electronic business processes including at least one of a one step method of supporting paper within electronic business process application optionally including legacy systems with no or minimal reprogramming of the electronic business process application, a method of recreating a module oriented copier in software;

(c) a copier interface implemented as software application including at least one of a virtual copier interface method of presenting to a user an operation of at least one of copying files and electronic images, at least one of to and from, at least one of digital imaging devices and software applications, in a substantially single step, and presenting users with direct access to at least one of tutorial and options from a main application window.

13. A computer data management system including a server module comprising:

enable virtual copy operation means for initiating, canceling, and resetting said computer data management system;

maintain list of available module means for maintaining a registry containing a list of said input, output, and process modules that can be used in said computer data management system, said list being read on startup, and maintaining another copy of said list in a modules object accessible by said input, output, client, process and server modules;

maintain currently active modules means for maintaining said input, output, and process modules currently being used for a current computer data management system copy operation in a program object, and saving the currently active modules in a process template file; and maintain complete document information means for maintaining information regarding a current file being copied, and saving the information in a document template file.

14. A computer data management system including at least one of an electronic image, graphics and document management system capable of transmitting at least one of an electronic image, electronic graphics and electronic document to a plurality of external destinations including one or more of external devices and applications responsively connectable at least one of locally and via the Internet, comprising:

at least one memory storing a plurality of interface protocols for interfacing and communicating;

at least one processor responsively connectable to said at least one memory, and implementing at least one interface protocol as at least one software application for interfacing and communicating with the plurality of external destinations including the one or more of the external devices and applications, wherein said at least one software application comprises at least one of:

at least one input module managing data comprising at least one of paper and electronic paper input to the computer data management system, and managing at least one imaging device to input the data through at least one of a scanner and a digital copier, and managing the electronic paper from at least one third-party software applications; and at least one module communicable with said at least one input, output, client, and process modules and external applications, and capable of dynamically combining the external applications with at least one of digital capturing devices and digital imaging devices.

15. A computer data management system including at least one of an electronic image, graphics and document management system capable of transmitting at least one of an electronic image, electronic graphics and electronic document to a plurality of external destinations including one or more of external devices and applications responsively connectable at least one of locally and via the Internet, wherein the system comprises:

(a) single function copy operation linking devices, applications and the internet including at least one of a function paper copy between devices and software applications, and a function paper copy between software applications and devices; and (b) a copier interface implemented as software application including at least one of a copier interface method of presenting to a user an operation of at least one of copying files and electronic images, at least one of to and from, at least one of digital imaging devices and software applications, and presenting users with direct access to at least one of tutorial and options from an application window.

* * * * *